United States Patent
Goldberg et al.

(10) Patent No.: US 7,561,723 B2
(45) Date of Patent: Jul. 14, 2009

(54) OBTAINING PERSON-SPECIFIC IMAGES IN A PUBLIC VENUE

(75) Inventors: David A. Goldberg, Boulder, CO (US); Martha B. Goldberg, Boulder, CO (US); Miriam D. Goldberg, New York, NY (US); Benjamin M. Goldberg, Fitchburg, WI (US)

(73) Assignee: Youfinder Intellectual Property Licensing Limited Liability Company, Budapest (HU)

( * ) Notice: Subject to any disclaimer, the term of this patent is extended or adjusted under 35 U.S.C. 154(b) by 202 days.

(21) Appl. No.: 10/544,556

(22) PCT Filed: Feb. 5, 2004

(86) PCT No.: PCT/US2004/003488

§ 371 (c)(1),
(2), (4) Date: Aug. 29, 2006

(87) PCT Pub. No.: WO2004/072897

PCT Pub. Date: Aug. 26, 2004

(65) Prior Publication Data

US 2007/0003113 A1    Jan. 4, 2007

Related U.S. Application Data

(63) Continuation of application No. 10/714,517, filed on Nov. 14, 2003, now Pat. No. 6,819,783, and a continuation-in-part of application No. 10/615,642, filed on Jul. 8, 2003, now abandoned, and a continuation-in-part of application No. 10/360,197, filed on Feb. 6, 2003, now abandoned.

(51) Int. Cl.
*G06K 9/00* (2006.01)

(52) U.S. Cl. .................... 382/115; 382/118

(58) Field of Classification Search ............. 382/115, 382/118, 159, 181, 209, 218, 224, 225, 305; 358/403; 707/5, 102, 104.1
See application file for complete search history.

(56) References Cited

U.S. PATENT DOCUMENTS 2,375,113 A    5/1945    Klammet et al.

(Continued)

FOREIGN PATENT DOCUMENTS

EP    0644032    3/1995

(Continued)

OTHER PUBLICATIONS

Kuchinsky, et al. "FotoFile: A consumer multimedia organization and retrieval system", ACM, pp. 496-503, 1999.*

(Continued)

*Primary Examiner*—Daniel G Mariam
(74) *Attorney, Agent, or Firm*—Sheridan Ross P.C.

(57) ABSTRACT

Collecting images of a patron in an entertainment venue is performed by facial recognition of the patron's face within the images, simplifying the storage and distribution of the images for a patron. In order to enhance the reliability of the facial recognition system, information about the patron that is not directly related to most facial recognition systems, including clothes, height, other associated people, use of glasses and jewelry, disposition of facial hair, and more, can be used. Some of the characteristics used can be specific to a particular date or event, and which will not be more generally characteristic of the patron. The facial recognition system can also be used to identify the patron requesting images to be collected. The present invention also relates to the use of facial recognition in sorting and collecting images from an electronically-stored image collection, enabling the easy retrieval of images that are related to a particular person or set of people.

24 Claims, 27 Drawing Sheets

U.S. PATENT DOCUMENTS

| | | | |
|---|---|---|---|
| 2,852,407 | A | 9/1958 | Wood, Jr. et al. |
| 2,944,586 | A | 7/1960 | Yanulis |
| 3,281,259 | A | 10/1966 | Lux et al. |
| 3,498,865 | A | 3/1970 | Paquin et al. |
| 3,551,199 | A | 12/1970 | Forster |
| 3,570,748 | A | 3/1971 | Coyle et al. |
| 3,911,173 | A | 10/1975 | Sprague, Jr. |
| 3,924,013 | A | 12/1975 | Kane |
| 3,944,453 | A | 3/1976 | Chudgar et al. |
| 4,082,854 | A | 4/1978 | Yamada et al. |
| 4,097,893 | A | 6/1978 | Camras |
| 4,234,624 | A | 11/1980 | Linderoth et al. |
| 4,390,387 | A | 6/1983 | Mahn |
| 4,484,971 | A | 11/1984 | Wang |
| 4,525,414 | A | 6/1985 | Ohya et al. |
| 4,528,219 | A | 7/1985 | Yamada et al. |
| 4,559,095 | A | 12/1985 | Babbin |
| 4,636,609 | A | 1/1987 | Nakamata |
| 4,644,127 | A | 2/1987 | La Rocca |
| 4,791,598 | A | 12/1988 | Liou et al. |
| 4,861,404 | A | 8/1989 | Neff |
| 4,902,378 | A | 2/1990 | Ouderkirk et al. |
| 4,916,532 | A | 4/1990 | Streck et al. |
| 4,931,125 | A | 6/1990 | Volkmann et al. |
| 4,936,938 | A | 6/1990 | Simpson et al. |
| 4,941,193 | A | 7/1990 | Barnsley et al. |
| 4,954,393 | A | 9/1990 | Jones |
| 4,979,133 | A | 12/1990 | Arima et al. |
| 4,991,205 | A | 2/1991 | Lemelson |
| 5,056,034 | A | 10/1991 | Rucki et al. |
| 5,132,922 | A | 7/1992 | Khan et al. |
| 5,164,992 | A | 11/1992 | Turk et al. |
| 5,189,130 | A | 2/1993 | Kageyama |
| 5,213,900 | A | 5/1993 | Friedrich |
| 5,321,396 | A | 6/1994 | Lamming et al. |
| 5,326,173 | A | 7/1994 | Evans et al. |
| 5,348,604 | A | 9/1994 | Neff |
| 5,363,504 | A | 11/1994 | Hasuo |
| 5,381,155 | A | 1/1995 | Gerber |
| 5,432,864 | A | 7/1995 | Lu et al. |
| 5,493,677 | A | 2/1996 | Balogh et al. |
| 5,549,943 | A | 8/1996 | Vicik |
| 5,550,928 | A | 8/1996 | Lu et al. |
| 5,554,984 | A | 9/1996 | Shigenaga et al. |
| 5,566,327 | A | 10/1996 | Sehr |
| 5,572,596 | A | 11/1996 | Wildes et al. |
| 5,576,838 | A | 11/1996 | Renie |
| 5,598,208 | A | 1/1997 | McClintock |
| 5,602,375 | A | 2/1997 | Sunahara et al. |
| 5,629,981 | A | 5/1997 | Nerlikar |
| 5,655,053 | A | 8/1997 | Renie |
| 5,666,215 | A | 9/1997 | Fredlund et al. |
| 5,680,223 | A | 10/1997 | Cooper et al. |
| 5,699,449 | A | 12/1997 | Javidi |
| 5,796,428 | A | 8/1998 | Matsumoto et al. |
| 5,802,208 | A | 9/1998 | Podilchuk et al. |
| 5,840,147 | A | 11/1998 | Grimm |
| 5,947,369 | A | 9/1999 | Frommer et al. |
| 6,108,437 | A | 8/2000 | Lin |
| 6,217,695 | B1 | 4/2001 | Goldberg et al. |
| 6,389,181 | B2 | 5/2002 | Shaffer et al. |
| 6,408,301 | B1 * | 6/2002 | Patton et al. ............. 707/102 |
| 6,430,307 | B1 | 8/2002 | Souma et al. |
| 6,526,158 | B1 | 2/2003 | Goldberg |
| 6,549,913 | B1 * | 4/2003 | Murakawa ............. 707/104.1 |
| 6,801,641 | B2 | 10/2004 | Eraslan |
| 6,819,783 | B2 | 11/2004 | Goldberg et al. |
| 6,985,887 | B1 * | 1/2006 | Sunstein et al. ............. 705/51 |
| 7,130,454 | B1 | 10/2006 | Berube et al. |
| 7,203,367 | B2 * | 4/2007 | Shniberg et al. ............. 382/224 |
| 2002/0049728 | A1 | 4/2002 | Kaku |
| 2002/0110264 | A1 * | 8/2002 | Sharoni et al. ............. 382/118 |
| 2003/0118216 | A1 | 6/2003 | Goldberg |
| 2004/0008872 | A1 | 1/2004 | Goldberg |

FOREIGN PATENT DOCUMENTS

| | | |
|---|---|---|
| JP | 2002-024229 | 4/2002 |
| WO | WO 95/24795 | 9/1995 |
| WO | WO 97/42793 | 11/1997 |
| WO | WO 98/10358 | 3/1998 |
| WO | WO 02/19137 | 3/2002 |

OTHER PUBLICATIONS

U.S. Appl. No. 09/712,879, filed Nov. 14, 2000, Goldberg.
International Search Report for International (PCT) Patent Application No. PCT/US97/15829, mailed Jan. 5, 1998 (4180-1-PCT).
International Preliminary Examination Report for International (PCT) Patent Application No. PCT/US97/15829, mailed Nov. 30, 1998 (4180-1-PCT).
International Search Report for International (PCT) Patent Application No. PCT/US97/07773, mailed Sep. 11, 1997 (4180-2-PCT).
Written Opinion for International (PCT) Patent Application No. PCT/US97/07773, mailed Apr. 15, 1998 (4180-2-PCT).
International Preliminary Examination Report for International (PCT) Patent Application No. PCT/US97/07773, mailed Sep. 16, 1998 (4180-2-PCT).
International Search Report for International (PCT) Patent Application No. PCT/US04/03488, mailed Sep. 13, 2004 (4180-4-PCT).
Written Opinion for International (PCT) Patent Application No. PCT/US04/03488, mailed Sep. 13, 2004 (4180-4-PCT).
International Preliminary Report on Patentability for International (PCT) Patent Application No. PCT/US04/03488, mailed Aug. 25, 2005 (4180-4-PCT).
International Search Report for International (PCT) Patent Application No. PCT/US06/06697, mailed Sep. 25, 2006 (4180-5-PCT).
Written Opinion for International (PCT) Patent Application No. PCT/US06/06697, mailed Sep. 25, 2006 (4180-5-PCT).
International Search Report for International (PCT) Patent Application No. PCT/US06/27323, mailed Apr. 10, 2007 (4180-6-PCT).
Written Opinion for International (PCT) Patent Application No. PCT/US06/27323, mailed Apr. 10, 2007 (4180-6-PCT).
Supplementary European Search Report for European Patent Application No. 97940915.8, completed Sep. 19, 2000 (4180-1-PEP).
Official Action for European Patent Application No. 97940915.8, mailed Apr. 11, 2003 (4180-1-PEP).
Official Action for European Patent Application No. 97940915.8, mailed Oct. 21, 2004 (4180-1-PEP).
Decision to Refuse a European Patent Application for European Patent Application No. 97940915.8, mailed Jul. 11, 2005 (4180-1-PEP).
Supplementary European Search Report for European Patent Application No. 97926416.5, mailed Aug. 25, 2000 (4180-2-PEP).
Official Action for U.S. Appl. No. 09/242,978, mailed Jun. 20, 2002 (4180-1-PUS).
Official Action for U.S. Appl. No. 10/615,642, mailed Aug. 26, 2004 (4180-1-PUS-CIP-CON).
Official Action for U.S. Appl. No. 09/187,446, mailed Jun. 23, 2000 (4180-2-PUS).

Official Action for U.S. Appl. No. 09/187,446, mailed Jun. 6, 2000 (4180-2-PUS).

Official Action for U.S. Appl. No. 09/187,446, mailed Mar. 21, 2000 (4180-2-PUS).

English translation for Official Action for Japanese Patent Application No. 2006-503384, issued Oct. 21, 2008, 2 pages (4180-4-PJP).

* cited by examiner

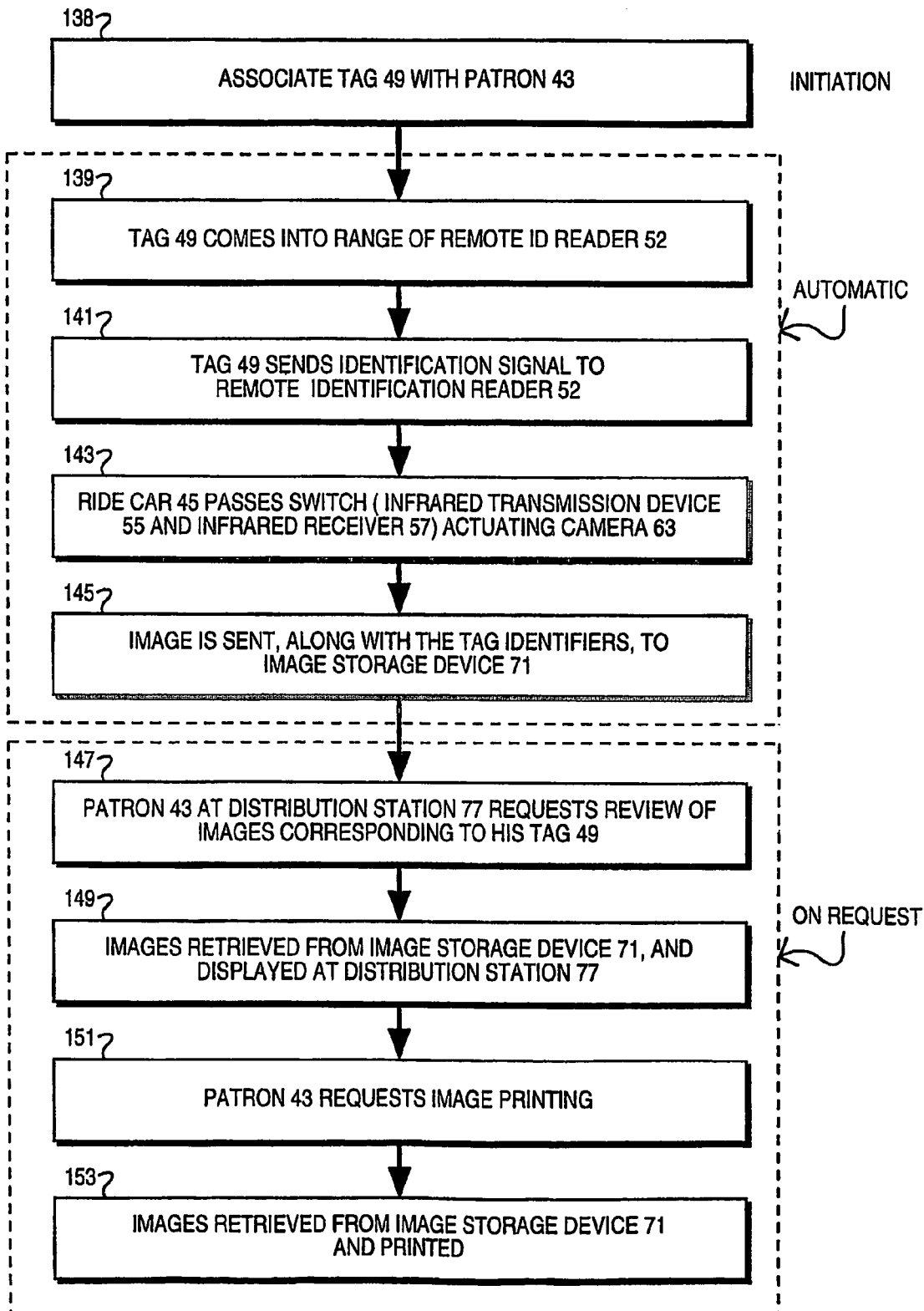

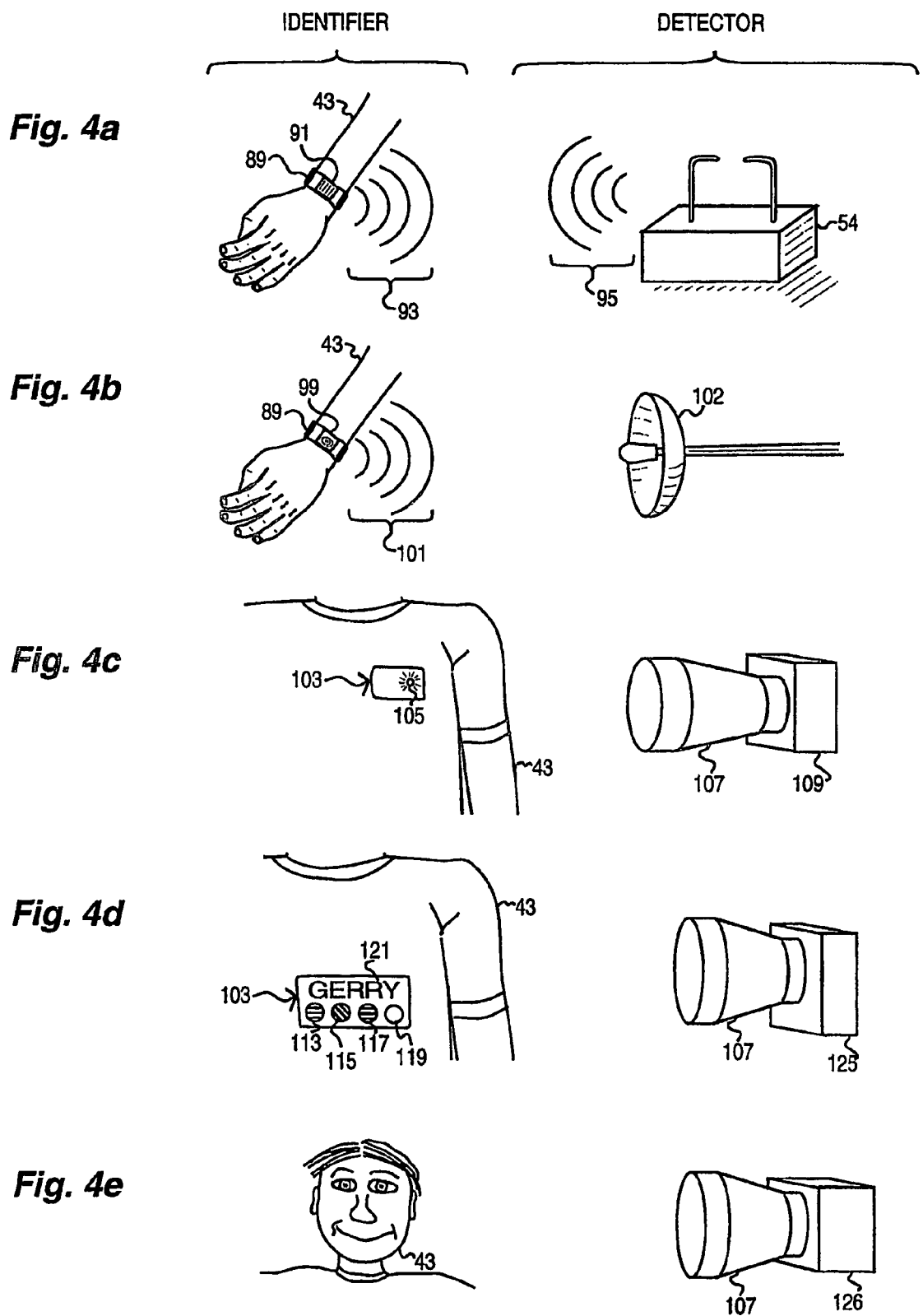

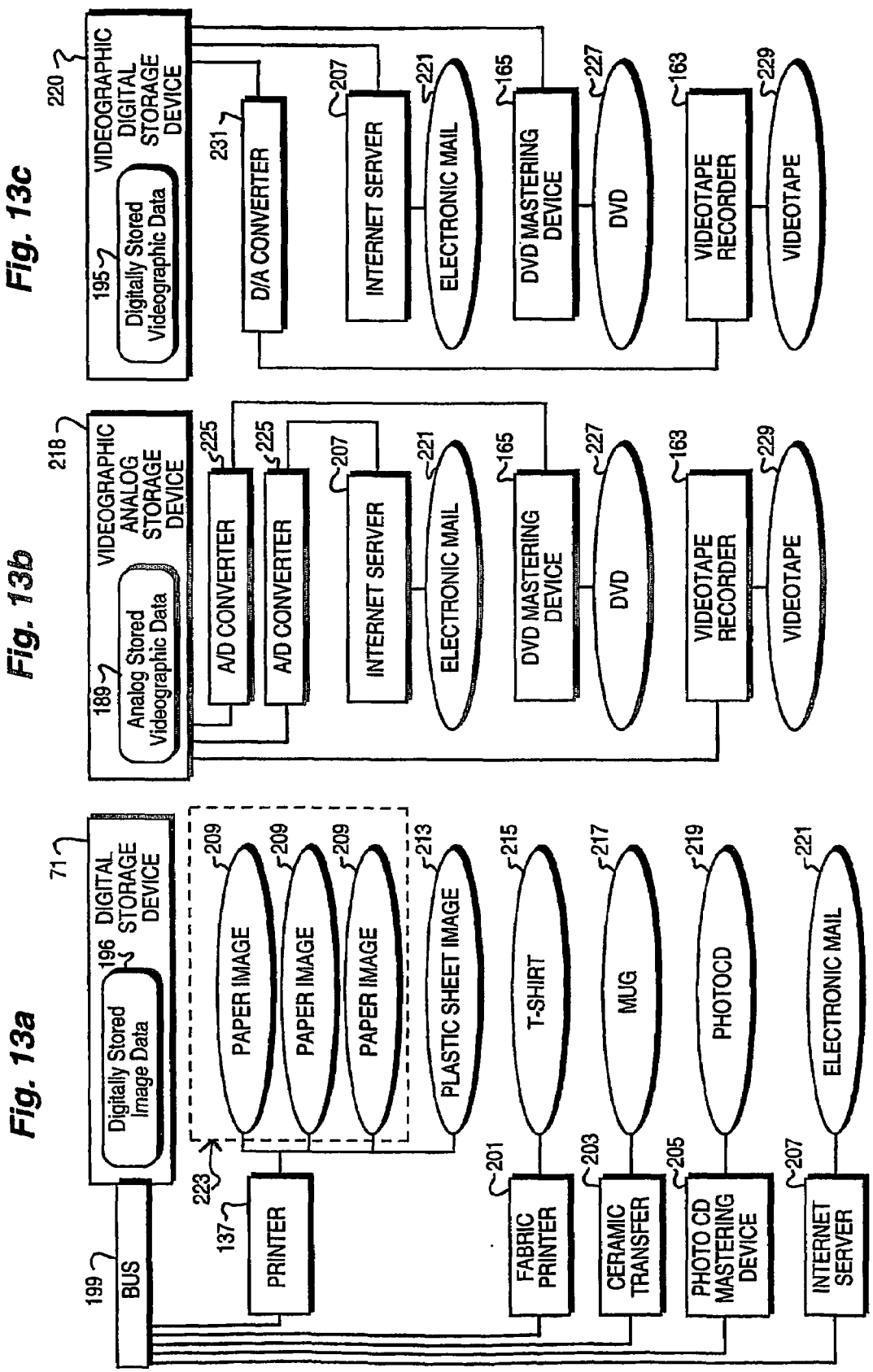

*Fig. 14a*
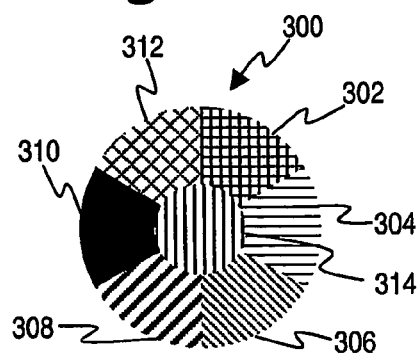
*Fig. 14b*
| | SECTOR | | |
|---|---|---|---|
| | 302 | 306 | 310 |
| RED | 255 | 127 | 0 |
| GREEN | 127 | 0 | 255 |
| BLUE | 0 | 255 | 127 |
*Fig. 14c*
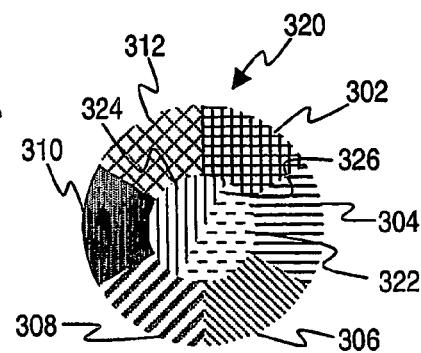
*Fig. 15*
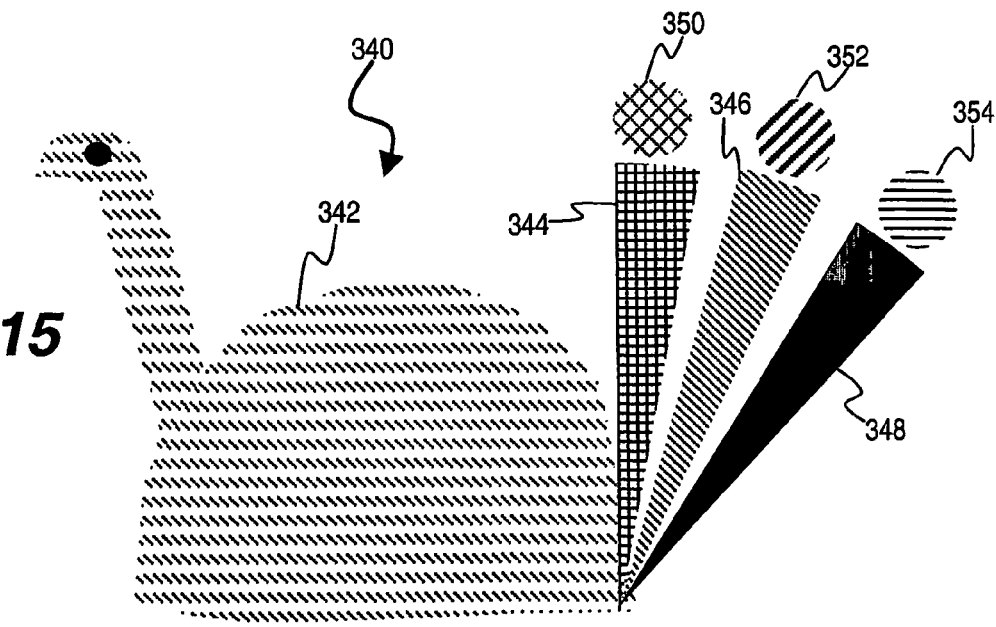

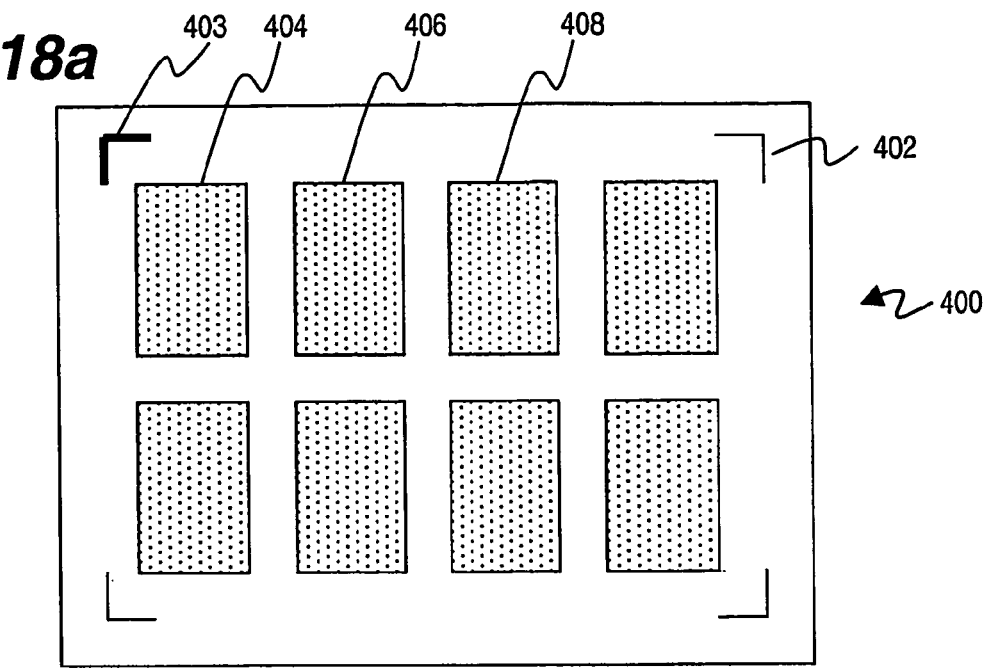
Fig. 18a
Fig. 21
| ERROR SECTOR VALUE 0 |
|---|
| { 0 0 0 } |
| { 0 127 255 } |
| { 127, 127, 127 } |
| ( 255 255 255 ) |
| ERROR SECTOR VALUE 127 |
|---|
| { 0 0 127 } |
| { 0 255 255 } |
| ( 127 127 255 ) |
| ERROR SECTOR VALUE 255 |
|---|
| { 0 0 255 } |
| { 0 127 127 } |
| ( 127 255 255 ) |
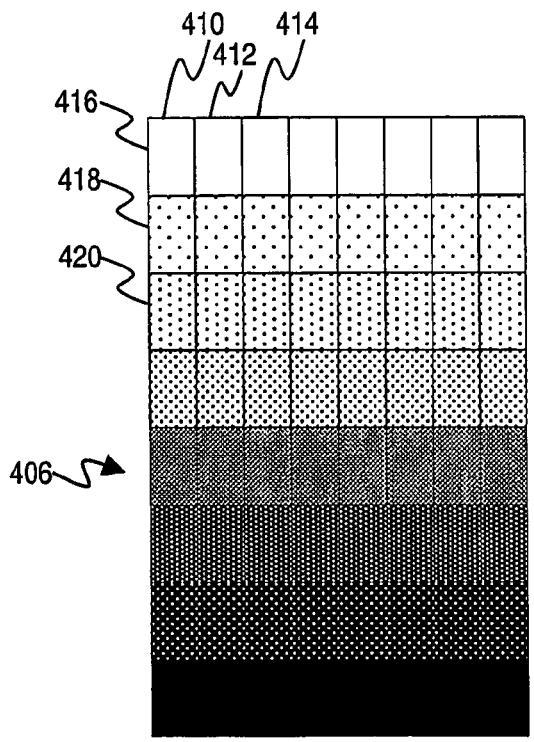
Fig. 18b

RELATIONAL DATABASE RECORD: 10462472

FIRST NAME: ALFRED
LAST NAME: NEWMAN
MAILING ADDRESS: 542 WHATME LANE
                 WORRY, IL 50328
FACIAL ID:    80 / AB / 62 / E7 /
              0D / 81 / B7 / 23 /
              A0 / 06 / F2 / 30 /
              7C / 3F / 11 / 2D
HEIGHT: 165 CM
EYEGLASSES: 80%
EYEGLASS COLOR: # 37B2E7
HAIR COLOR: # C2A330
HAIR COLOR CONFIDENCE: 34%
DATE OF REFERENCE: 12/15/01
SHIRT STYLE: PATTERN
SHIRT COLORS: # 842769
              # C207F1

Fig. 30

SEARCH FOR PICTURES

NUMBER OF PEOPLE IN PICTURE

☐ ANY NUMBER  ☐ 0  ☐ 1  ☒ 2  ☐ 3  ☐ 4 OR MORE

⦿ ORDER PICTURES BY <u>INCREASING</u> NUMBER OF PEOPLE

◯ ORDER PICTURES BY <u>DECREASING</u> NUMBER OF PEOPLE

☐ ORDER PICTURES BY <u>DECREASING</u> SIZE OF FACES

FIRST PERSON TO FIND

| PAMELA ▼ |

SECOND PERSON TO FIND

| BARBARA ▽ |
| BARBARA ▲ |
| BRENDA |
| BRIAN [A] |
| BRIAN [B] |
| BRIAN [C] |
| BRIAN [ALL] |
| COLIN ▼ |

[ SEARCH ]   [ CANCEL ]

OBTAINING PERSON-SPECIFIC IMAGES IN A PUBLIC VENUE

CROSS-REFERENCE TO RELATED APPLICATIONS

This application is a national-phase filing pursuant to 35 U.S.C. § 371 of PCT International Application PCT/US04/03488 filed Feb. 6, 2003, which is a continuation of application Ser. No. 10/714,517 filed Nov. 14, 2003 (now U.S. Pat. No. 6,819,783 issued Nov. 16, 2004); PCT International Application PCT/US04/03488 filed Feb. 6, 2003 is also a continuation-in-part of application Ser. No. 10/615,642 filed Jul. 8, 2003 (now abandoned); and PCT International Application PCT/US04/03488 filed Feb. 6, 2003 is also a continuation-in-part of application Ser. No. 10/360,197 filed Feb. 6, 2003 (now abandoned). The contents of each of the above identified applications are incorporated herein by reference.

TECHNICAL FIELD

The present invention relates to digital images of people in a public venue so that the images corresponding to a given person can be retrieved.

BACKGROUND

When patrons visit a large and varied entertainment setting, such as the theme parks Disney World or Six Flags Over Texas, they often wish to collect a permanent memento of their attendance. Often, this memento comprises photographs taken by the patron or those traveling with the patron. One difficulty with obtaining this type of photographic image is that suitable camera angles may be difficult or impossible for the patron to achieve. For instance, while on a roller coaster ride, picture taking is generally disallowed, requiring pictures to be taken from a distance. In addition, the patron may have difficulties obtaining pictures of himself, or the patron may not either have or remember or have the opportunity to use his picture taking equipment.

In order to compensate for these difficulties, provide patrons with suitable mementos, and to obtain additional sources of revenue, entertainment venues may take photographs for sale to the patron. These pictures may be staged pictures, as in "Old Time" photographs where the patron dresses in costume or places their head in a board cutout such that the patrons head is located just above the image of the body of a person in another context. Alternatively, a professional photographer may take a picture of the patron positioned next to an actor clothed in a costume of a well-known cartoon character. These staged pictures, however, present only a limited number of opportunities in which to obtain images of patrons, and furthermore these methods are generally unsuitable for the tens or hundreds of thousands of patrons who might visit a theme park in a single day.

In order to compensate for some of these difficulties, at some theme parks cameras are placed strategically within rides so as to capture each patron at a particular moment in the ride's course. For example, at Disneyland in California, a camera is located so as to photograph each load of riders on a water ride at the moment of maximum excitement. The photographs are arranged to be displayed to each participant as they exit the ride, in order to entice them to purchase the photographs as a keepsakes.

This method of taking pictures of patrons on rides has proven popular with patrons, but has a number of practical limitations that limit its usefulness and applicability. For example, after standing in line to participate in the ride, the patron must stand in another line to obtain their picture. Only one or a small number of images may be purchased by the patron at each ride. Importantly, the patron must remember a number corresponding to their picture in order to obtain their picture from among the multitude taken at the theme park each day. Thus, patrons must generally purchase their picture directly after their ride in order to be able to remember their number. This cumbersome and time-consuming process limits the number of images that each customer might obtain during the day. These limitations affect both the satisfaction of the patron and the revenues for the theme park.

It is to these problems and other problems that the present invention is directed.

SUMMARY OF THE PRESENT INVENTION

It is an object of the present invention to provide a means of facial recognition that provides fewer false positives and fewer false negatives. In order to accomplish this goal, information in addition to that normally analyzed in facial recognition is taken into account. Such additional information can include aspects of the person's hair and coloration, as well as jewelry and other worn objects, as well as clothing. Furthermore, information on people who tend to be in the same image with other specific people is collected, analyzed and stored. Because most of the images captured at an event are taken over a short period of time, the people in the images will tend to have the same additional information over the course of the event. Furthermore, people associated with other people (e.g. couples and family, school groups) will tend to be in the same images with one another, and the occurrence of one person will make it more like that another person of the same group is also in the image. Together, these analysis methods greatly increase the accuracy of facial recognition.

The present invention also relates to the use of facial recognition in sorting and collecting images from an electronically-stored photographic ensemble, enabling the easy retrieval of images that related to a particular person or set of people.

BRIEF DESCRIPTION OF THE DRAWINGS

FIG. 3 is a block schematic presenting a typical event flow for the person-specific imaging system depicted in FIG. 2.

FIGS. 4a through 4e are perspective views of identifiers and detectors for different remote identification systems that may be employed in the present invention.

FIG. 13a is a block schematic of a distribution system for single images that is part of a person specific imaging system incorporating different output devices.

FIG. 13b is a block schematic of a distribution system for videographic images stored as analog data that is part of a person-specific imaging system incorporating different output devices.

FIG. 13c is a block schematic of a distribution system for videographic images stored as digital data that is part of a person-specific imaging system incorporating the same output devices as shown in FIG. 13b.

FIG. 14a is a perspective view of a sectored colored identifier tag.

FIG. 14b is a table of colors to be used in a tag such as in FIG. 14a.

FIG. 14c is a perspective view of a sectored colored identifier tag with two internal sectors.

FIG. 15 is a perspective view of an identifier tag in which the colors hidden within a peacock design.

FIG. 18a is a perspective view of a standard color chart.

FIG. 18b is a perspective view of a box within the standard color chart of FIG. 18a.

FIG. 19 is a flow diagram for choosing colors from the standard color chart of FIG. 18a.

FIG. 21 is a table of identity sector colors giving rise to error sector values.

FIG. 30 is a user interface for searching an archival image collection, wherein the collection is electronically stored.

BEST MODES FOR CARRYING OUT THE INVENTION

Overview of the Steps

Figure 1:
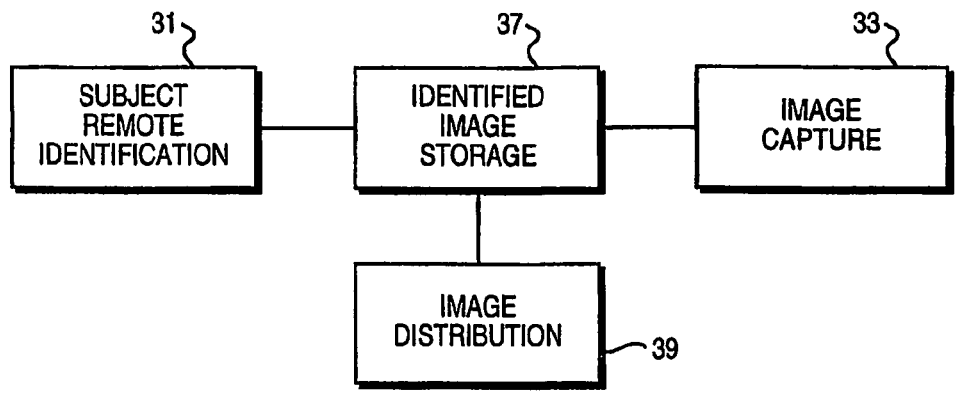
FIG. 1 is a functional block diagram of the method of the present invention.

An overview of the steps of the present invention is shown schematically in FIG. 1, a block diagram. A step of subject remote identification 31 comprises identifying the subject whose image is to be captured. A separate step of image capture 33 involves the electronic capture of an image, either digitally or in analog form. The subject identification and captured image are combined and placed in storage, either temporary or permanent, in an identified image storage step 37. Finally, the image is distributed, usually to the subject identified in the subject remote identification step 31, in an image distribution step 39.

As shown in FIG. 1, the steps of subject remote identification 31 and image capture 33 may be distinct from one another, and the outputs of these steps may feed separately into the step of identified image storage 37. The order and timing of the remote identification 31 and the image capture 33 may vary. Thus, the remote identification 31 may either precede, be coincident with, or follow the image capture 33.

The combination of the steps of subject remote identification 31 and the step of image capture 33 is of paramount importance in the present invention. By automatically establishing the identity of the subjects within a captured image with remote identification 31, images can be stored and then retrieved by individual theme park patrons without the need for human intervention or conscious interaction (such as remembering a number) to aid image distribution 39 to the proper patron. This removes a practical bottleneck in the distribution of images in a large public venue.

An Embodiment of the Present Invention

Figure 2:
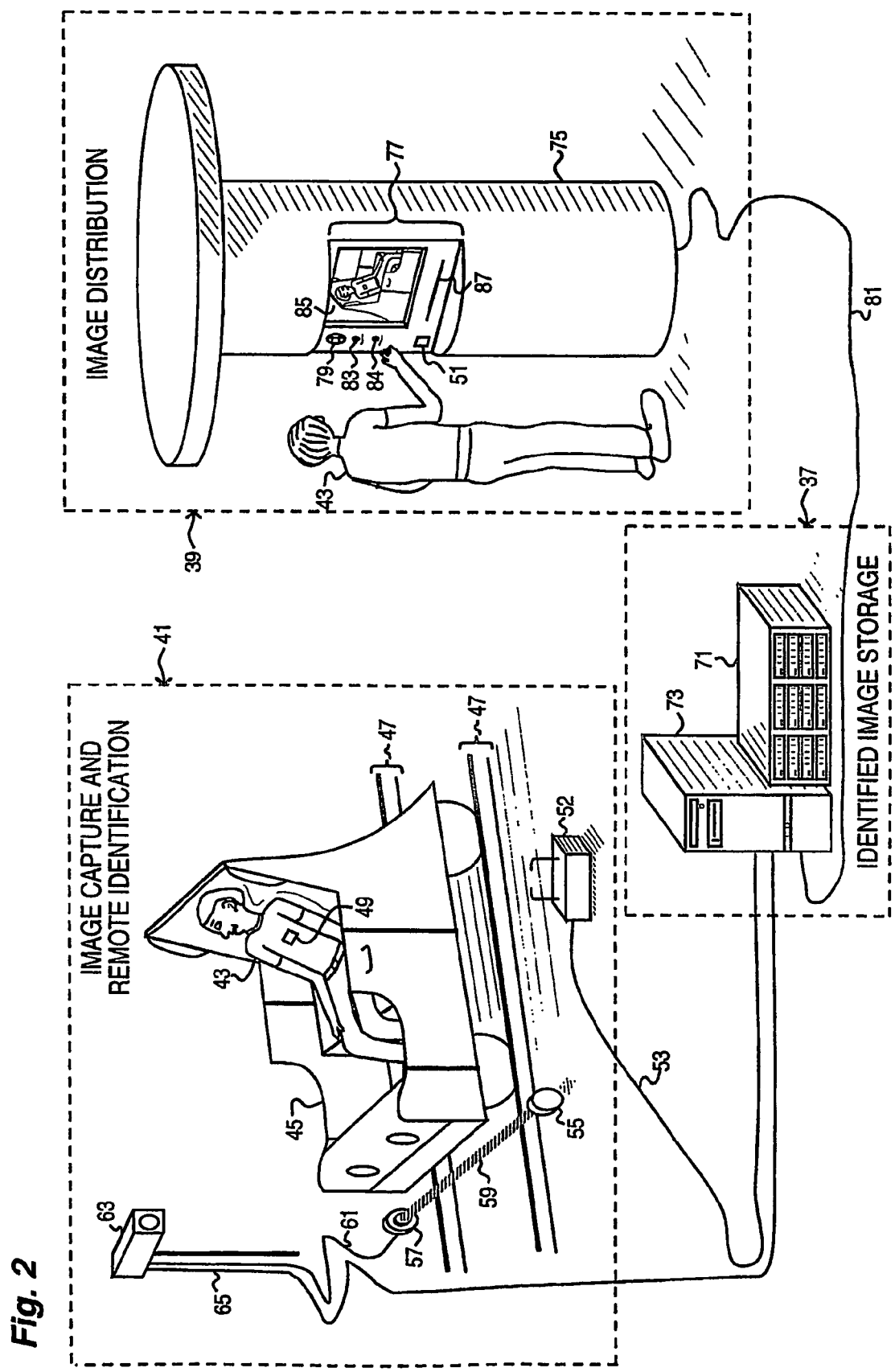
FIG. 2 is a perspective and schematic view of a person-specific imaging system in which images of theme park patrons on a ride are captured, classified and distributed to the patrons, utilizing the method shown in FIG. 1.

FIG. 2 is a perspective view, in which images of theme park patrons on a ride are captured, classified and distributed to the patrons. The steps of subject remote identification 31 and image capture 33 are combined into a combination image capture and remote identification step 41. A patron 43 rides in a theme park amusement car 45, which rides on a pair of rails 47. The patron is wearing a remote identification tag 49 affixed to his shirt. In response to a signal originating from a remote identification (ID) reader 52, the tag 49 transmits a signal that can be received and identified by remote ID reader 52 as the car 45 with patron 43 passes the remote ID reader 52. The identity of the patron 43 is transmitted through an identification transfer wire 53 to a storage controller 73, which stores to, and retrieves identified images from, an image storage device 71. The functioning of the remote ID tag 49 and the remote ID reader 52 may take many forms and will be described in more detail below.

An infrared light beam 59 is generated at an infrared transmission device 55, and is received by an infrared receiver 57. When the car 45 passes through the path of the infrared light beam 59, reception of the light beam 59 energy at receiver 57 is interrupted, and a signal is passed to a digital camera 63, causing the camera 63 to capture an image of the car 45 and its passenger patron 43. The digital image so captured by camera 63 is then transmitted to the storage controller 73 through an image transfer wire 65, from which it is then stored in image storage device 71.

The step of image distribution 39 is carried out at a kiosk 75 which incorporates a distribution station 77. The distribution station 77 incorporates a monitor 85 on which captured images are displayed for the patron 43 to review. An integral remote ID reader 51 is included to identify the patron 43, so as to determine which images are to be retrieved from the image storage device 71 through distribution cable 81. Interaction means are provided to the patron 43 to select and choose images by presentation of the images on a viewing screen 85. Chosen images may be printed in the workstation 77 and distributed to the patron through image distribution slot 87.

The interaction means may include a plurality of buttons 83 and 84 supplemented by a speaker 79 for communicating audible commands and assistance to the patron 43. In this case, the button 83 is labeled "YES" and the button 84 is labeled "NO". Depending on the nature of the queries presented on the screen, these buttons 83 and 84 can be used to either select images for purchase, or to select the format on which the images should be delivered. For example, the screen could present the query, "Would you like the pictures to be printed on paper?" and by pressing the button 83 or the button 84, the patron 43 would determine whether the images were printed on paper.

Many other possible user interfaces might be used, including ones with a larger number of buttons. Also, the buttons 83 and 84 might have labels programmably configurable, changing according to the question asked of the patron 43, so that instead of the query presented above, the query could be alternatively phrased, "On which surface would you like your pictures printed, paper or plastic?" and the user could respond by pressing the button 83 transiently labeled "PAPER" or by pressing the button 84 transiently labeled "PLASTIC."

Requests for images to be retrieved are sent back to the image storage device 71 and its controller 73 through distribution cable 81.

FIG. 3 is a block schematic presenting a summary typical event flow for the first embodiment, and may be read with reference to FIG. 2. In an initiation step 138, performed once, the tag 49 is given to the patron 43, establishing the association of the tag 49 with the patron 43. It may be that all subsequent steps of image capture and distribution will be linked solely with the physical association of the tag 49, so that the patron 43 can retrieve images as long as the patron 43 still has physical possession of the tag 49. However, in order to compensate for the possibility that the patron 43 will lose the tag 49, or that the images may be able to be retrieved at a time after the patron 43 no longer has possession of the tag 49, a record of the association of the tag 49 with the patron 43 will generally be made, and stored in a digital database. Then, images associated with the tag 49 can be automatically be associated with the corresponding patron 43.

In step 139, the remote ID identification tag 49 comes into range of the remote ID reader 52. In step 141, the tag 49 sending its identifying signal to the remote ID reader 52. The system now has information about the identity of the patron 43, as well as the patron's approximate location in the ride, due to the generally short transmission distance of the tag 49. Because the system also has knowledge about the locations of each car 45 in a ride, the system can now identify the patrons 43 to a particular car 45 in specific captured images.

In step 143, the car 45 carrying the patron 43 passes a switch (comprised in this case of the infrared transmission device 55, its infrared light beam 59, and the infrared receiver 57) and which actuates the camera 63. Because the switch indicates the instantaneous position of individual cars 45, and the location of patrons 43 in different cars 45 is known, then the identity of a particular patron 43 within the photographic image can be inferred.

In step 145, the image and patron identities, as well as potentially other relevant information, are sent over a communications network (in this case, comprising identification transfer wire 53 and image transfer wire 65) to the image storage device 71 (in this case, through storage controller 73), which stores the information on an easily retrievable medium, such as an array of hard drives. A patron 43 at a distribution station 77 who wishes to review the images taken of him interacts with the station 77 in step 147, initiating a command to the storage controller 73 to retrieve the images corresponding to one or more patrons from storage device 71. In step 149, those images are retrieved from the image storage device 71, and sent to the distribution station 77. The patron, in step 151, after reviewing the images, then processes requests for images to be printed. In step 153, the images are printed on paper or as a memento, and are delivered to the patron 43.

Steps 139, 141, 143, and 145 will be performed frequently for each patron 43, once for each image recorded, as they move through the entertainment venue and participate in various rides and activities. These steps will occur largely unknown to the client since they occur through automatic means. Steps 147, 149, 151 and 153, on the other hand, will be performed only on the one or more occasions that the patron 43 wishes to review the images or order prints.

The following sections describe the preceding steps in more detail, including a number of modifications of this preferred embodiment that are within the scope of the present invention.

The Step of Subject Remote Identification 31

Remote identification 31 requires identification at a distance, as opposed, for example, to a physical transfer of an identification card on which information on a magnetic stripe is read by a reader. Such physical transfer schemes require conscious action on the part of the patron, causing interruption in the entertainment experience and possible interference with crowd dynamics (e.g. slowing the speed of patrons moving through an entrance line). Remote identification, on the other hand, is automatic and can occur without the patron being aware of the process.

Examples of remote identification include radio frequency identification (RFID), LED transmission with photodetector detection, sonic transmitters and microphones, and visual identification means such as bar coding, facial recognition, iris scanning, and visual symbology coding. In these techniques, there is no physical contact between the object being identified and the mechanism which performs the identification. While some of these methods work at distances of a mile or more, most of these operate best in the ranges of inches to tens of feet, which is the proper distance for the present invention. It should be understood that remote identification as applied to this invention may involve relatively small distances on the order of less than a foot.

Remote identification methods generally involve at least two distinct elements, an identifier and a detector. The identifier is the characteristic by which the object to be identified is distinguished from other like objects. The identifier may be a characteristic intrinsic to the object to be identified, such as the physical size and placement of features on a face, where the identifier can be detected from a distance by an electronic or mechanical device. Alternatively, the identifier may be an extrinsic tag by which the object can be identified, such as a radio transmitter which transmits a unique code. The detector is the device that detects the identifier from a distance and interprets the identity of the object. The detector is matched in function to the form of the identifier. Thus, an identifier that incorporates a sonic signal transmission will be matched with a detector such as a microphone, and a visible identifier such as a bar code will be matched with either a digital camera, which detects reflected illumination, or a laser scanner, which both generates an illumination signal as well as detects the reflected light energy.

These extrinsic tags may take on a number of different physical forms, including wrist bracelets, necklaces and pendants, cards with pinning attachments to be worn on shirts, hats, or other garments, or with loops to be hung on belts. The manner in which the tags are pinned, carried or worn is, in general, not specific to a particular form of identifier, and many identifier types can be used with different physical forms.

It should be noted that at a particular time, each identifier is associated with a unique code. The identifiers will generally, though not necessarily, be reused by different patrons 43 over the useful lifetime of the identifier. Thus, either a method of writing a new code to a identifier must be available, or a database must be maintained which indicates which patron 43 is identified with which identifier on a specific date or at a specific time.

A number of different identifiers and their corresponding detectors, along with the techniques that govern their use, will be considered in the following sections, and are depicted in perspective views FIG. 4a through FIG. 4e.

Radio Frequency Identification (RFID)

Radio frequency identification (RFID), in overview, involves a mobile radio transmitter which is prompted to transmit a short digital identification signal (often between 32 to 128 bits) in response to an interrogation radio frequency signal. The mobile radio frequency transmitter generally signals either in the 30-500 kHz or 0.9 -3 GHz ranges. The RFID transmitter comes in two general forms—passive or active. In active RFID, a miniature battery or other source of power is packaged locally to the mobile transmitter. Generally, active RFID devices transmit over distances of feet to tens of feet, but these distances may sometimes range to thousands of feet.

Passive RFID, on the other hand, does not carry a local source of power, and thus its transmission range is limited by the amount of power from the interrogation device that can be reflected or accumulated by a receiver coil and associated circuitry located within in the transmitter. Passive RFID devices are often limited in transmission range from a couple of feet to 10 or more feet.

One embodiment of an RFID remote identification device is shown in FIG. 4a, a perspective diagram. In this case, the identifier involves a bracelet 89 that is worn by the person to be detected. The bracelet 89 incorporates an RFID tag 91, which both detects an interrogation signal 95 from an RFID reader 54, as well as transmits a digital identification radio signal 93 that is detected by the RFID reader 54. The RFID reader 54 comprises electronics which perform both the transmission of the interrogation signal 95 and the reception of the digital identification radio signal 93. The bracelet 89 could be alternatively chosen from a number of worn or carried accessories, including a necklace, a pin, a badge, a card, or a small figurine, with the limitation that it would need sufficient free volume and cross-sectional area to incorporate the RFID tag 91 components, including a radio receiver, transmitter, and possibly a battery (in the case of an active RFID transmitter).

The RFID tag 91 could be either a passive or an active RFID transmitter. If the tag 91 is an active RFID tag, it would also incorporate a source of power such as a battery.

The use of an interrogation means in the tag 91 is not required. For instance, the radio signal 93 could be continuously transmitted or transmitted in discrete and frequent bursts, rather than only in response to the interrogation signal 95. This mode of operation, however, would require an active RFID design and a more substantial power supply local to the RFID tag 91 to power this frequent transmission.

RFID is well-suited for this remote identification application because the tag 91 can be detected from all directions, and the signals are not limited by line of sight, but can be detected through a wide range of non-conducting materials.

There are a number of RFID transmitters and readers available on the market, including the i2 system from SCS Corp. (San Diego, Calif.) and the SAMsys system from SAMSys Technologies (Toronto, Ontario, Canada).

Sonic Transmitter

FIG. 4b is a perspective diagram of a sonic transmission remote identification system. This embodiment involves a worn or carried device as an identifier, in this case the bracelet 89, into which a sonic transmitter 99 is incorporated. The sonic transmitter 99 in this case includes a battery supply, and emits a digital sonic identification signal 101 at regular intervals. This signal 101 is detected and interpreted by a directional microphone 102.

It should be noted that the directional microphone 102 could be replaced by a microphone without directional preference. This scheme would depend solely on the proximity of the sonic transmitter 99 to the non-directional microphone, rather than being in the proper orientation. Furthermore, there are a number of different means of obtaining microphone directionality, including the use of parabolic dish collectors and noise-canceling microphones. The parabolic dish collector has the advantage of having a large collecting surface, increasing microphone sensitivity at a distance.

As with RFID, the sonic transmission system depicted in FIG. 4b could also include a sonic or radio frequency interrogation signal (similar to interrogation signal 95) sent from the directional microphone 102 to the sonic transmitter 99 to trigger the sonic transmitter 99, in which case the sonic transmitter 99 would need to incorporate a receiver for the interrogator signal.

Light Transmitter

FIG. 4c is a perspective diagram of a light transmission-based remote identification system. This embodiment involves as identifier a badge 103 which is worn on the outside clothing of the patron 43. Located on the badge 103 is a flashing light source 105, where the flashes are timed so as to incorporate a digital identification signal.

Detection is performed using a lens system 107 with an infrared (IR) detector 109. This IR detector may be either an array detector, such as a CCD (charge-coupled device) or CMOS (complimentary metal oxide semiconductor) camera, or may alternatively be a monolithic detector, such as an electronic device incorporating a photodiode or photoresistor. The lens system 107 confers directionality to the IR detector 109, and by capturing more light onto the detector 109, increases its sensitivity.

The light source 105 could incorporate an infrared or visible light emitting diode (LED). Because LEDs exhibit a strong directional preference in light emission, a light diffuser might be incorporated into the light source 105 so as to allow identification from a range of different orientations relative to the badge 103.

Optical Symbology

FIG. 4d is a perspective diagram of an optical symbology remote identification system. This embodiment uses as identifier a badge 103 on which a visible symbology is printed. In this case, the symbology comprises a set of 4 colored circles 113, 115, 117, and 119 in conjunction with a printed text string 121 ("GERRY"). As shown, circles 113 and 117 are the same color, circle 115 is a second color, and circle 119 is yet a third color.

The detector comprises the lens system 107 with a digital CCD camera 125. The arrangement of colored circles is imaged by the lens system 107 on the light capture array within the digital camera 125, and the sequence of colors assigned to the circles 113, 115, 117, and 119 would comprise a symbology providing identification. For example, each distinct color could indicate a distinct number, and the position of the circle would indicate the place in a composite, multi-digit number. For example, if each circle takes on one of eight colors, each circle could then represent an octal number (that is, a digit in a base eight numerical system). The four circles could then represent a four-digit octal number, representing 4096 possible identifiers, with each circle representing a different digit within the number. Note that this scheme, using colored symbologies, would require that the CCD camera 125 be a color discriminating camera.

Using a larger number of circles taking on one of two possible states (e.g. black and white), a binary numerical system could be used with a black and white CCD camera 125 instead. Alternatively, black and white patterns (e.g. clear versus horizontally striped versus vertically striped versus solid black) could be employed.

The printed text string 121 may provide additional identification. In this case, the text string 121 is interpreted from the image captured by the CCD camera 125 using optical character recognition (OCR). Many such OCR programs are commercially available, such as TIGER OCR from Cognitive Technology Corp. (Corte Madera, Calif.). As shown in FIG. 4d, more than one type of symbology may be simultaneously employed, providing support in case one of the symbologies is obscured or damaged.

There are a large number of different potential visible symbologies. Other examples include printed text, standard bar codes, or a bulls-eye arrangement of concentric circles where the presence or absence of each ring indicates a separate digit in a binary number. With a bar code or certain other symbologies, the lens 107 and camera 125 assembly could be replaced with a laser scanning mechanism as is frequently used in bar code scanners.

The identifier badge 103 and its incorporated symbology (in this case, circles 113, 115, 117, and 119, and the printed text 121) would need to be visible to the lens 107 and the camera 125 in order for detection and remote identification to succeed, as would also be required for the badge 103 of the light transmission remote identification of FIG. 4c. This places a constraint on the location of the badge 103, the orientation of the patron 43, and the requirement that the badge 103 not be obscured by clothing or other subjects. In contrast, the signals of the RFID and sonic identifiers depicted in FIGS. 4a and 4b need not be in direct line of sight of the corresponding detector.

Direct Subject Recognition

The previous embodiments of remote identification all required the use of identifiers such as bracelets or badges, that are extrinsic to the subject being identified. The subject itself can be viewed for intrinsic characteristics that would permit identification. These intrinsic identifiers, which must be detectable remotely, include facial recognition and iris recognition methods.

FIG. 4e is a perspective diagram of a facial recognition remote identification system. The identifier is the face of patron 43, which is detected using the lens system 107 along with a CMOS camera 126. The image of the face of patron 43 is analyzed for features particular to that face, including the distances between different features (such as eyes, base of the nose, and the center of the mouth), and more abstract metrics such as the eigenface and eigenfeature decomposition of the face (see U.S. Pat. No. 5,164,992 to Turk and Pentland). Alternatively, recognition of person-specific iris features can be performed (see U.S. Pat. No. 5,572,596 to Wildes, et. al.). It should be understood that the CCD camera 125 of FIG. 4d and the CMOS camera 126 of FIG. 4e are functionally similar to one another, and the CCD camera 125 could be used effectively in the direct subject recognition of FIG. 4e and conversely, the CMOS camera 126 could be effectively used in the optical symbology recognition process of FIG. 4d.

In the case where optical symbology and direct subject recognition are used in the step of subject remote identification 31, the images used for recognition may be the same images obtained in the step of image capture 33. Thus, the images obtained in image capture 33 may be stored, and then their contents examined for optical symbology or facial features in the subsequent step of subject remote identification 31. In this case, in reference to FIG. 1, the step of subject remote identification 31 would follow the step of image storage 37. Alternatively, the remote identification 31 may be performed on a separate image from the one stored for distribution, or the subject remote identification may be performed using the image obtained during image capture 33 prior to identified image storage 37.

It should be understood that the detector in each of the embodiments shown in FIGS. 4a through 4e may be supplemented with or require a digital computer in order to interpret the detected signals, and compensate for environmental noise.

The Step of Image Capture 33

The means of electronically-recording the photographic image will, in the preferred embodiment, be a digital camera 63, generally incorporating a charge-couple device (CCD) or a CMOS image recording chip to electronically record the photographic image. The camera will generally be located at a point at which clear, unimpeded photographic images can be recorded of the patron 43. A trigger mechanism can accompany the camera, by which the camera is caused to capture the image when the patron is within the field of view of the camera. For example, in FIG. 2, the camera 63 is caused to acquire an image when the car 45 carrying patron 43 interrupts an infrared light beam 59. It should be noted that other triggering means are possible, including an electrical switch mounted on the rails 47 along which the car 45 travels, so that the switch is physically acted on by the car 45 in such a way to set the switch temporarily into a different state (for example, the weight of the car 45 closing a contact, or an electronic switch that responds to a magnet mounted on the car 45).

The camera 63 may be either in close proximity or distant from the means of remote identification. It is only a requirement of the system that the subject of the image be identifiable, and the manner in which patrons 43 are placed in front of the camera 63 may determine the physical relationship of the camera 63 to the means of remote identification. For example, in FIG. 2, because the car 45 is constrained to the track 47, and presuming that this and other cars 45 along the track 47 cannot switch positions, knowing which patron 43 is in which car 45, and in addition, knowing which car 45 is within the field of view of the camera 63, allows one to know then which patron 43 is within the field of view of the camera 63. Thus, the means of remote identification and the camera 63 may be distantly located from each other.

However, in other circumstances, the means of remote identification and the camera 63 would need to be in close physical proximity. For example, if the entertainment venue were to be a nature trail, or a ride using a mechanized car 45 in which the car 45 speed and location relative to other cars 45 is variable or under the patron's 43 control, patrons 43 could proceed at different rates through the site, and their order within the venue might vary. In this case, having the means of remote identification and camera 63 in close physical proximity is necessary to properly match each photographic image with the proper patron 43.

The possibility of a substantial physical separation between the means of remote identification and the camera 63 is also valuable in those cases where the patron 43 velocity at the time of optimal image recording is so high as to preclude simple electronic or visual identification by the means of remote identification. This might occur, for example, in the case of a high-speed roller coaster. In such a case, the step of remote identification can take place when the patron 43 and ride transport are at rest or of sufficiently slow speed to facilitate identification.

In cases where the image is to be recorded while the image subject is not sufficiently illuminated by natural lighting, a source of additional, artificial illumination will be required. Such illumination may be either continuous, or may be a pulsed or strobe lamp, timed so as to provide proper illumination at the time of the image recording, perhaps in conjunction with a trigger mechanism such as that in FIG. 2, comprising the infrared transmission device 55, the receiver 57, and the infrared receiver 57.

In general, the camera 63 will record a color image of the patron 43 with an appropriate field of view to capture the patron 43. In certain cases, the field of view may be much larger than a single patron 43, in case the location of the patron 43 is not known with enough accuracy. In such cases, the field of view may encompass the area of uncertainty, and then other means may be used to locate the patron 43 within the frame. Such methods of identifying head locations within a larger frame are well-known in the art of machine-automated facial recognition. Alternatively, a single frame with a large field of view may include the images of many patrons 43. If each patron's 43 location is known with sufficient accuracy, a sub-frame within the single larger frame may be used as the image of a particular patron 43, and multiple individual patron 43 images could be collected from a single frame with a large field of view.

The Step of Identified Image Storage 37

Once camera 63 makes an electronic image of the patron 43, it is sent to the image storage device 71 via the storage controller 73. Because the image is captured electronically, it can generally be stored as a digital image. The preferred storage means would be a computer hard-disk array, which has the advantages of inexpensive cost, high-data throughput, and random-access storage and retrieval. Alternative storage means include magnetic tapes, volatile memory (RAM disks), and writable digital compact disks (CDs) or digital video disks/digital versatile disks (DVDs). While magnetic tape storage is relatively inexpensive, it has the disadvantage in that, as a sequential access storage means, there is no ability to randomly access the information on the tape, resulting in generally slow image retrieval. Volatile memory allows for the quickest storage and retrieval, but tends to be higher cost, and the information could be lost in the event of a power outage. Digital compact disks currently are unable to support multiple writing and erasing, however this is likely to be overcome in the coming years, and such technology may someday be useful for the implementation of this technology. The photographic images may be digitally "compressed" in order to decrease the amount of digital memory required to store the images, as well as to increase the image transmission and retrieval rates. Examples of such digital compression techniques include that of Discrete Cosine Transforms (DCTs) as used in JPEG and MPEG compressions (see for example, U.S. Pat. No. 4,791,598 to Lio, Sun and Wu) or fractal compressions (for example, U.S. Pat. No. 4,941,193 to Barnsley and Sloan). Each image is stored in conjunction with the corresponding patron identification, as well as other relevant information that might be of interest to the patron (e.g. date and time, name of ride, etc.).

FIG. 2 indicates that the image and the identification are separately transmitted to the storage device 71. However, if the image storage device 71 is distantly located from the camera 63 and the remote ID reader 52, it may be advantageous to have the image from the camera 63 and the identity from the remote ID reader 52 be transferred over the same wire, rather than over separate wires 65 and 53. In such a case, the image and identity signals would need to be digitally multiplexed.

Figure 5:
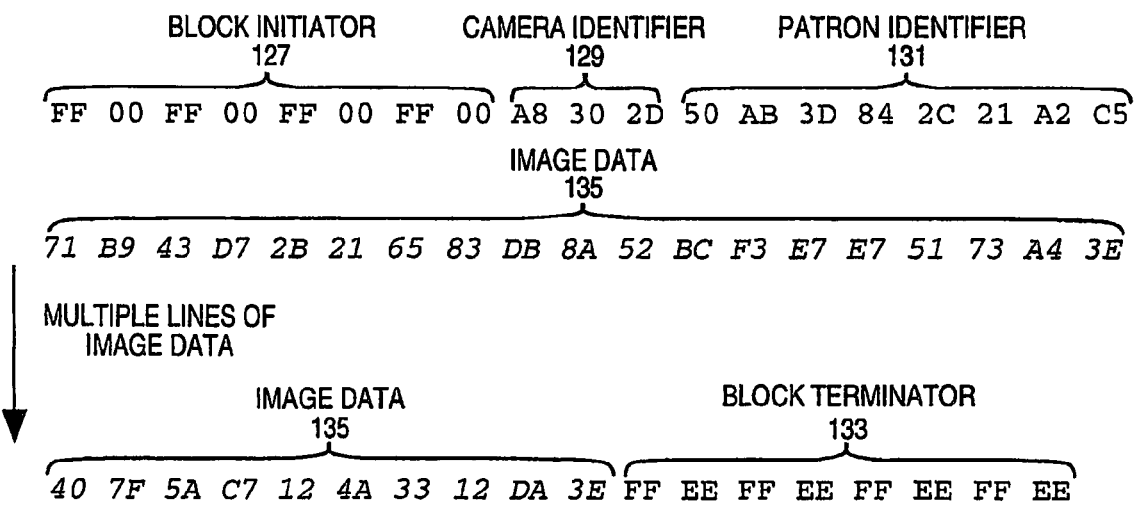
FIG. 5 is a logical schematic of a multiplexed digital signal comprising both identity and image information, for use in a person-specific imaging system where identity and image information are transmitted digitally on a common communications carrier.

FIG. 5 is a logical schematic of a multiplexed signal comprising both identity and image information suitable for transfer over a single transmission wire. Each alphanumeric is a hexadecimal block of digital information, wherein each hexadecimal pair represents a digital byte. A block initiator 127 signals the incoming identified image data stream, and comprises alternating FF and 00 bytes. A camera identifier 129 indicates the identity of the camera 63 from which the image was obtained. The camera identifier 129 would be of particular use when images from more than one camera 63 are stored in the same image storage device 71, thus identifying the camera 63, and therefore the corresponding ride, from which the image was obtained. The camera identifier 129 is followed by an 8-byte patron identifier 131, which represents the signal that was stored in the remote identification tag 49 and received by the remote ID reader 52 and is used to keep track of the patron in the image. This identifier 131 is then followed by a block of image data 135, which in general will be extensive, comprising thousands to millions of bytes of information, and is denoted in FIG. 5 as italicized text. The image data is followed by a block terminator 133, in this case comprising alternating FF and EE bytes (in hexadecimal notation) indicating the termination of the data. It should be understood that numerous alternatives are within the spirit of the present invention, and the order and constituents of each block represented in FIG. 5 may vary between embodiments. For example, the camera identifier 129 and the subject identifier 131 may be reversed in order, or placed at the end of the image data 135, rather than at the beginning. Additionally, a variety of different block initiators 127 and block terminators 133 may be used, or they may be omitted entirely. Also, the image data 135 may be raw digital image data, or it may be compressed using algorithms previously mentioned.

While the patron uses a single tag 49, remote ID reader 52 and cameras 63 are located at multiple fixed locations within the entertainment venue in order to capture a variety of images of the patron 43. It is also possible that a remote ID reader 52 and camera 63 could be mounted on a roving vehicle or carried by a photographer, which could take images of clients from a variety of locations. The storage of images will generally be at a single location or small number of locations. Thus, in general, multiple cameras 63 and remote ID readers 52 will communicate with a much smaller number of image storage devices 71.

The image can be sent from camera 63 to the image storage device 71 using standard digital communication technology. Because of the substantial size of the images to be sent, as well as their potentially large number, high-data transfer rates will be preferred. Such communication means could include many of the technologies in wide use in local area networks (LANs), including fiber optics and Ethernet. Alternatively, microwave or radio transmission means may be used. Examples of such wireless links are described in U.S. Pat. No. 4,097,893 to Camras and U.S. Pat. No. 4,916,532 to Streck et al. In certain venues, such as a public street, telephone lines might also be employed. At a single entertainment venue, multiple communication means could be employed simultaneously to link cameras 63 and remote ID readers 52 at different sites to the storage device 71.

The storage controller 73 is a digital computing device which governs the storage and retrieval of images from the image storage device 71. In general, images and identities will be received from image transfer wire 65 and identification transfer wire 53, respectively, at the storage controller 73. Alternatively, the storage controller 73 will extract the identity and related information from the image information if the data are multiplexed as in FIG. 5. The storage controller 73 will then place the images and information on the storage device 71 within a database structure that allows for easy search and retrieval of the image and data.

It should be understood that in general, there will be a number of locations at which images will be captured and subjects remotely identified. This information from multiple locations will in general be stored at only one or a few locations for later retrieval. Thus, there will frequently be multiple identification transfer wires 53 and image transfer wires 65 input to each storage controller 73.

In many amusement park rides or theme park activities, patrons are closely positioned, as in a roller coaster. Thus, each image captured by the methods of the present invention may contain images of more than one patron 43. In this case, the identifiers for each of the patrons within each frame will be stored along with the image. This storage is easily handled by most relational databases, in which the data for each image is associated with bi-directional pointers or links with each patron 43 registered on the system. This means of storage prevents the need to store the voluminous image data separately for each patron 43 represented in the single image.

Alternative Storage Architecture

As discussed above, the storage of images can be performed in association with the identifier of a particular patron. However, there may not be enough information within the image to unambiguously identify the patron. For example, with facial recognition, the patron may not have, prior to the image capture, registered with the system, and therefore the identity of the patron may not be possible until a later time. Furthermore, in facial recognition systems, as will be described later, information about a patron (e.g. who they are associated with in the venue) may accumulate over a period of time. Thus, it can be necessary or convenient to store quantitative information about the patrons represented within an image in association with the image, rather than the identifier of the patron.

Figure 28:
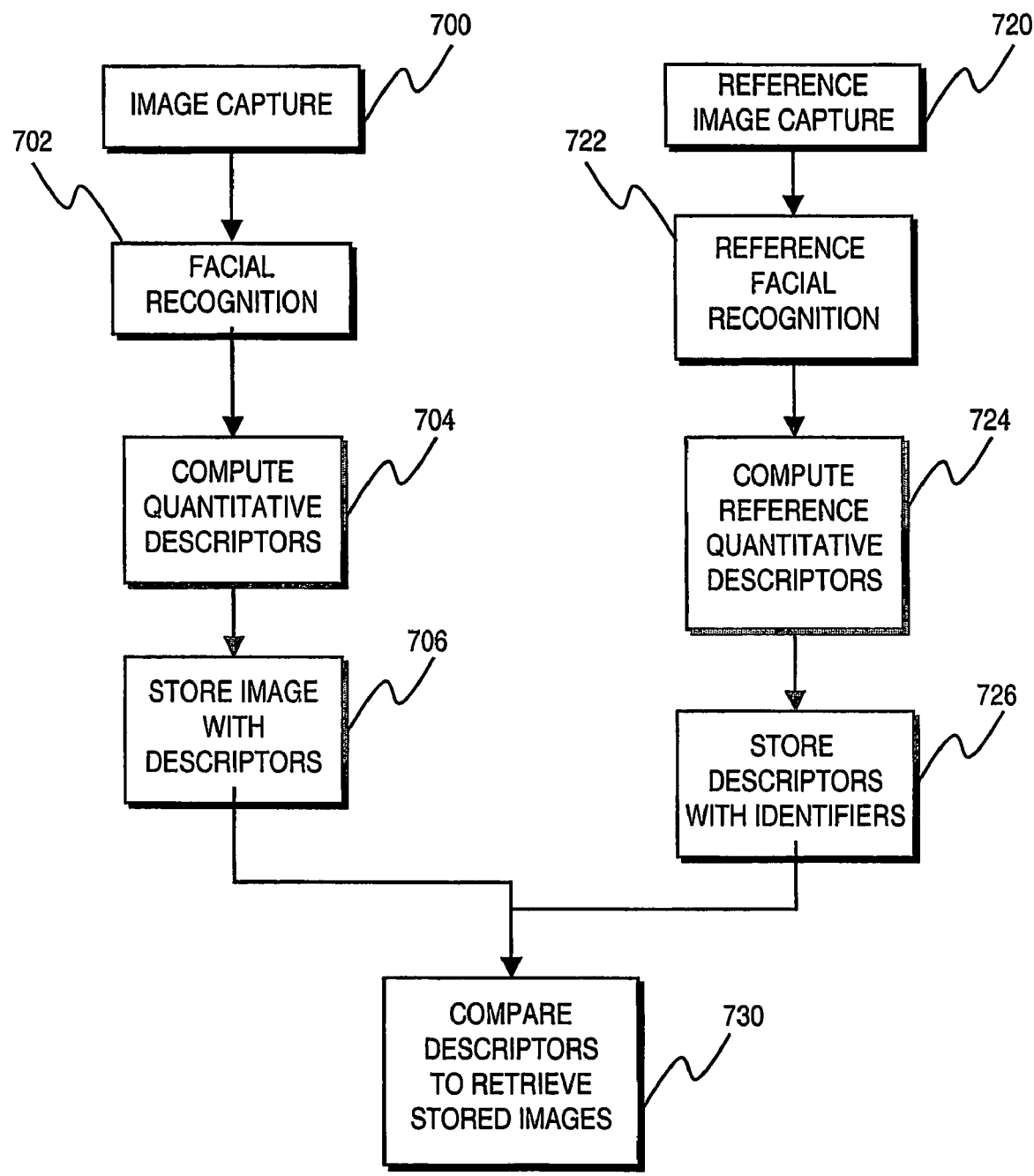
FIG. 28 is a block flow diagram of the association of an image with the patron in the image, in which patron descriptors are stored with images for subsequent retrieval of images associated with a specific patron.

FIG. 28 is a block flow diagram of the association of an image with the patron in the image, in which patron descriptors are stored with images for subsequent retrieval of images associated with a specific patron. In a step 700, images of many patrons within a venue are captured. In a step 702, a facial recognition step is performed, in which quantitative information about the faces or other aspects of the patrons (e.g. clothes colors, makeup—see below) are determined. In a step 704, the quantitative information derived from the facial recognition is used to compute at least one quantitative descriptor. These descriptors could comprise a principal components description of a face, or a quantitative code that includes colors of dress, facial hair distribution, the presence and color of eyeglasses, the color of lips, etc., or combinations of many different characteristics of the patrons in the images. At least one of these descriptors, and preferably all of those descriptors computed, is then stored in association with the image in a step 706.

In a step 720, a reference image of the patron is captured. This image can be captured before the image captures of the step 700, after the image captures of the step 700, or between the first and last images captured in the step 700. Furthermore, the image capture of the step 720 can be performed "outside" of the system. For example, the patron can capture the image on a personally-owned digital camera or scan in a picture, which can then be uploaded to the image retrieval system. In a step 722, this reference image is then put through a facial recognition system with similar recognition characteristics as those used in the step 702, and in a step 724, the quantitative information derived from the reference image facial recognition 722 is used to compute at least one quantitative descriptor. The quantitative descriptors computed in the steps 704 and 724 is preferably be derived in similar ways (e.g. similar facial recognition algorithms, with the descriptors be directly comparable), since they will be used in direct comparisons, as described below. In a step 726, the reference descriptors are stored along with an identifier of the patron (e.g. which can comprise information such as name, email address, mailing address, credit card number). The storage of this information is optional, if the subsequent steps are performed immediately (e.g. if the patron does not wish the image supplier to store information about the patron).

In a step 730, the descriptors from the step 704 and the reference descriptor from the step 724 are compared in order to establish a match between the patron and images in which the patron is represented. Because the descriptors will, in general, comprise many orders of magnitude less amount of information (in bits) than the images themselves, this comparison can be made very quickly. It should be noted that, because the facial recognition programs will generate somewhat different data for every image of a person (depending on facial expression, orientation of face, resolution of images, the number of pixels comprising the face, lighting conditions, etc.), the descriptors generated from different images of the same person will not generally be exactly the same. The algorithms used in making the comparisons of the step 730, therefore, can comprise such steps as computing a mathematical "distance" between the two descriptors (e.g. of a multidimensional map of principal components), tree searches (e.g. does the person have the same colors clothes), range matching, and threshold determination, generally resulting in a confidence level at which the images are of the same person. Additional descriptions of the steps of facial recognition, descriptor computation and descriptor matching will be discussed below.

Supplemental Information

Patron remote identification can be improved by using additional information that is known about or can be determined about the patron. This information can relate to combinations of information given above, to additional identification data carried by the patron, to information available to the system as a whole, and more. This additional information is of particular use when the identification by the means given above are incomplete. For example, a tag may be partially obscured, or the facial recognition could be uncertain (i.e. below the confidence level at which a match is determined). The discussion below is written with particular to reference to facial image recognition as the means of patron remote identification, but the methods can be extended directly to other means of identification.

Figure 23A:
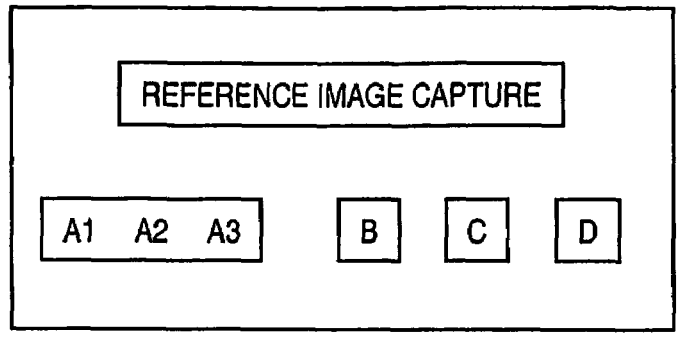
FIG. 23A is a schematic representation of the images stored in a reference image database.

FIG. 23A is a schematic representation of the reference image database obtained at an entertainment venue. There are images for three members of a group, for instance a family, whose members are referred to as A1, A2, and A3. At the time that the reference image is taken, the relatedness of A1, A3 and A3 is noted. This could be either due to manual input from the persons A1, A2 or A3, manual input from a venue attendant, from the presence of A1, A2 and A3 in the same reference image, from comparing the residence or other information relating to A1, A2, and A3, from the similar time or registration of A1, A2 or A3, or through other means. In ths example, three other unrelated individual facial images are in the database—for persons B, C, and D. The facial recognition program to which this database is connected returns a confidence parameter indicating the likelihood of fit of a new image to that of the stored images. Above a predetermined threshold, the person in the new image is considered to be the same as a person in one of the reference images.

Figure 23B:
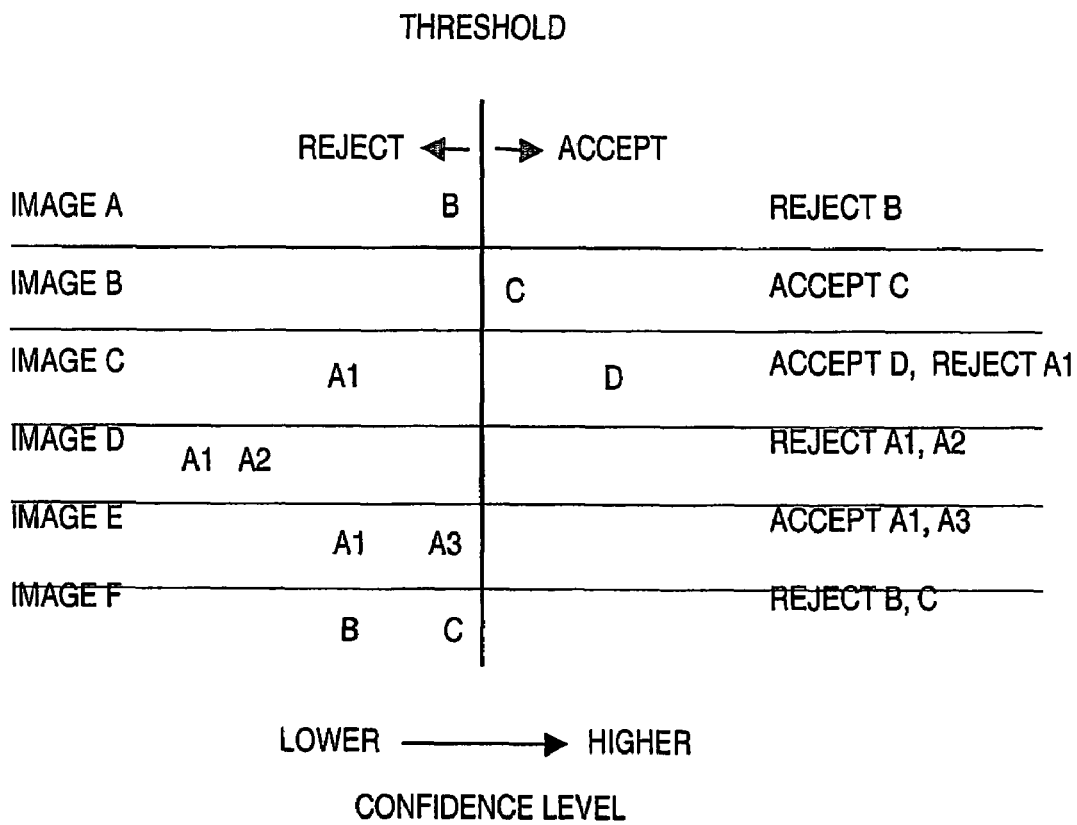
FIG. 23B is a schematic diagram of the confidence levels for matching a person in a set of new images with a person in the reference image database.

FIG. 23B shows the resulting confidence levels for matching a person in a set of new images (images A-F) with a person in the reference image database. In image A, person B is in the image, but because of the quality of the image, because of the orientation or expression of person B, or for some other reason, the confidence level in the match is below the predetermined acceptance threshold. Therefore, the system rejects the identification of B. Conversely, in image B, the confidence in the identification of person C is greater than that of the threshold, and therefore the system registers a match with person B.

In image C, both person A1 and person D are present. While the confidence level for person D is very high, the confidence level for person A1 is well below the threshold, and so for that image, person D is accepted as present, and person A1 is not. In image D, both A1 and A2 are present, but their confidence levels are significantly below the acceptance threshold, and so both are rejected.

In image E, however, both person A1 and A3 are in the image, but person A3 is near to, but still below, the acceptance threshold, and person A1 is significantly below the threshold. However, because of the known relatedness of A1 and A3, their co-presence in the same photograph, even at a low confidence level, provides a "boost" to the confidence level of the associated persons. This boost can be additive (e.g. adding the confidence levels or fractional confidence levels of the individual persons to see if they exceed the threshold), multiplicative (e.g. multiplying each person by a predetermined factor greater than one, when a related person is also present in the image with a confidence level greater than a second predetermined threshold), or other. The presence of three related persons within an image would be generally even more determinative of the identity of the persons within the image. Because of their co-presence in the same image, both persons A1 and A3 are accepted as being identifed.

In image F, persons B and C are rated with confidence levels similar to that of persons A1 and A3 in image E. However, because B and C are unrelated, they are rejected as being identified by the system.

Figure 23C:
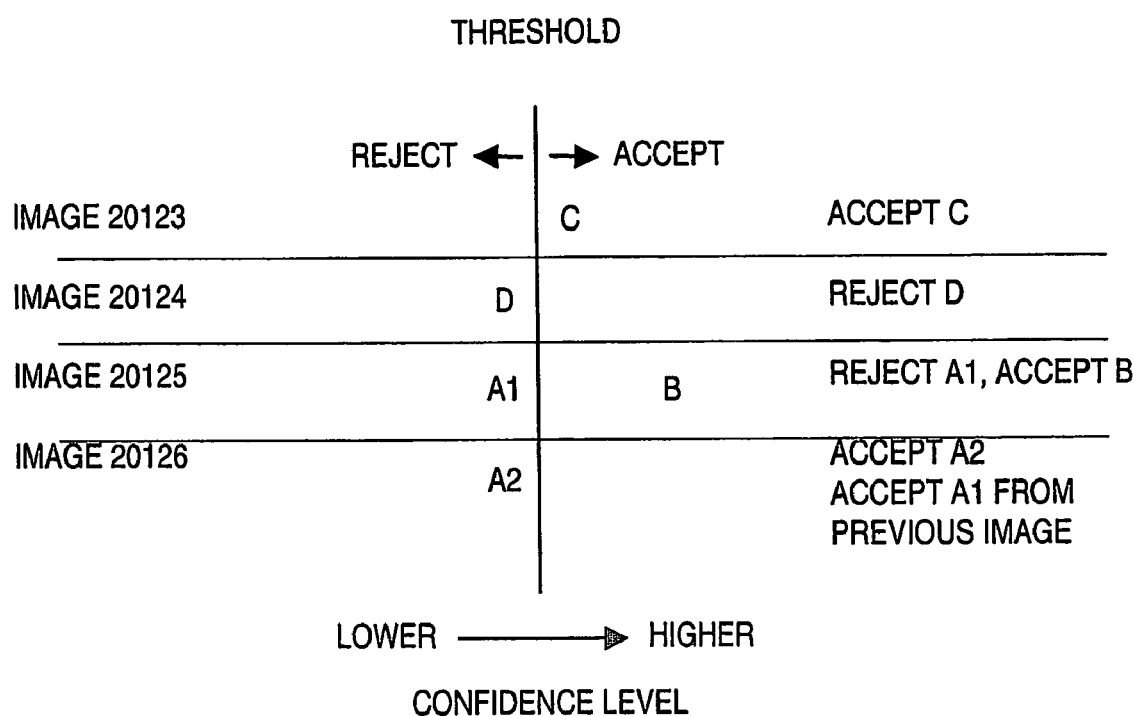
FIG. 23C is a schematic diagram of the confidence levels for matching a person in a set of consecutive new images with a person in the reference image database.

Because persons from the same group may not go exactly together on the rides within the entertainment venue, it is within the spirit of the present invention that co-presence in an image can be extended to include presence in images that are related in time and/or place. FIG. 23C is a schematic diagram of the confidence levels for matching a person in a set of consecutive new images (from image 20123 to image 10126) with a person in the reference image database. In image 20123, the single person within the image—person C—is accepted because the identification confidence level exceeds the predetermined threshold. In image 20124, person D is rejected, because their identification is below the threshold. In image 20125, person B is accepted because of the high confidence level, but person A1 is rejected. In the next image, 20126, person A2 is also rejected because of the insufficient confidence level associated with their image. However, the co-presence of related persons A1 and A2 in consecutive images boosts each of the confidence levels for these people, such that A2 is accepted as identified from the current image, and person A1 is accepted from the previous image (20125).

The co-presence of related persons an be taken on the basis of presence in consecutive images (20125 and 20126), on the basis of closeness in time (e.g. within a predetermined time separation, such as one minute), on the basis of proximity and time (e.g. being located in images from cameras located near to one another or on the same ride, and the presence of the related persons occurring within a predetermined time interval), or other temporal or spatial proximity. Furthermore, while the examples in FIGS. 23B and 23C have dealt with related persons, both below the confidence level of identification, the system can also rate as having been identified a person with low confidence level proximal to a related person with a high confidence level.

It should be noted that the association of two related patrons is meant that the patrons are expected to be in the same image at a greater frequency than would be expected for two unrelated patrons. In general, this method of increasing the confidence level of patrons will work most effectively when the patrons are always or nearly always in the same image together, preferably with greater than 50% frequency, but can also improve results even in cases where they are associated only a few percent of the time (preferably 10% of the time, or less preferably 1% of the time). This might occur, for example, in a group comprising 20 people, wherein the images generally include only two people. In such a case, the association of any two people might be expected to occur about 5% of the time, but the totality of such associations can give rise to a significantly increased accuracy in patron identification.

It should be noted that the people do not actually need to be "related" or "associated" in some specific manner (for example, being members of a group, related as family members, or attending the event together). It can also be simply that they are standing near to one another for an extended period of time, during which their representations are captured more than once on the same image. The image is then simply capturing possibly their physical or "social" proximity, although they may be otherwise formally unrelated.

It should also be noted that this concept of proximity can be extended, as well. That is, if we have three people A, B and C at an event, if A is present in a large number of images of B, and A is also present in a large number of images of C, then the presence of B and C in the same image, even should it be only a single image in the collection, shall serve to increase the possibility of identification of B and C through their relatedness.

Time and proximity can be used to exclude the possibility of the same patron being in two different images. For example, if the images are obtained from different cameras at approximately the same time, and the cameras are not located proximately, then the patron in the two images cannot be the same person. Given that the cameras from which the images are taken will be known, as well as in general the time at which the images are taken, a relative difference in time between the two cameras should be known.

Figures 24A, 24B:
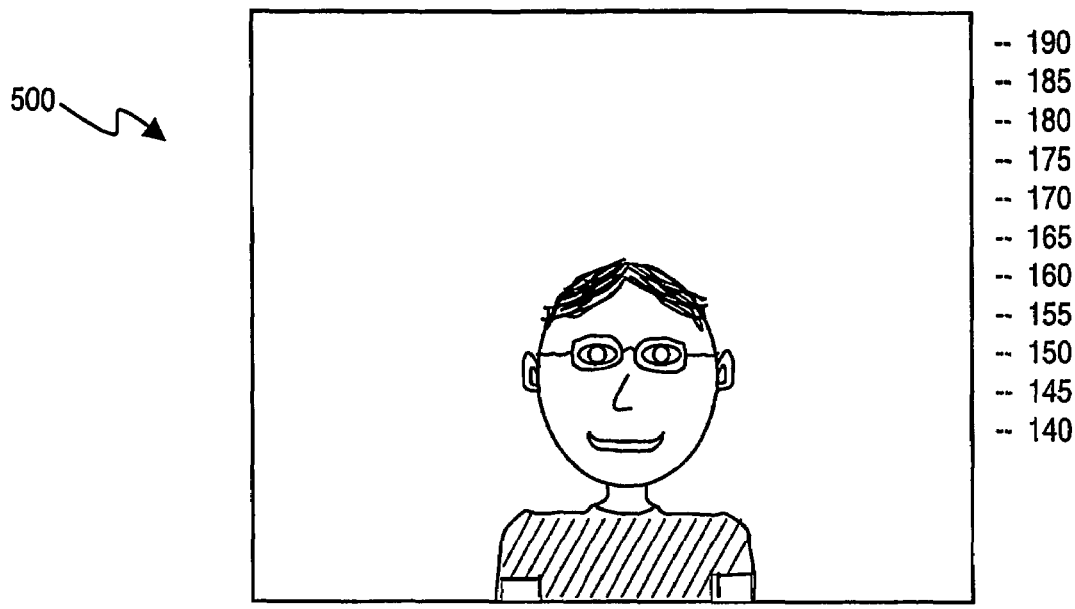
FIG. 24A is a reference image of a patron.
FIG. 24B is a schematic diagram indicating exemplar information contained within a facial database for the fictional patron Alfred Newman.

Other elements or information about the patron can also be used, including additional information obtained from the reference image. FIG. 24A is a reference image 500 of a patron. The facial recognition application will often work with a grey-scale image of the face. There are a number of different algorithms used in conventional facial recognition programs, but generally there is a pre-recognition step in which the face is located, certain elements of the face (eyes, chin, mouth) are identified, and the face sized and oriented. Then, facial specific features are identified, often by a principal components, factor analysis or neural network, that quantitatively characterizes a face according to the most highly distinguishing characteristics. Frequently, a numerical or complex description of the face is generated during the process, which will be termed in this specification the "facial identifier" or facial ID (which corresponds, e.g. to the Facial Identification Record (FIR) of Cognitec GmbH, Dresden). In many facial recognition programs, the facial ID for a face in a new image to be tested is numerically compared with the facial IDs from the reference images in a database.

FIG. 24B is a schematic diagram indicating exemplar information contained within a facial database for the fictional person Alfred Newman. In the facial database, the name and contact information for the person is provided. The facial ID is given in this case as a series of paired hexadecimal numbers indicating the value from 0-128 for each of 16 principal components. This is one form of a facial ID, of which the facial ID can be formatted in a large variety of different forms.

Figure 24C:
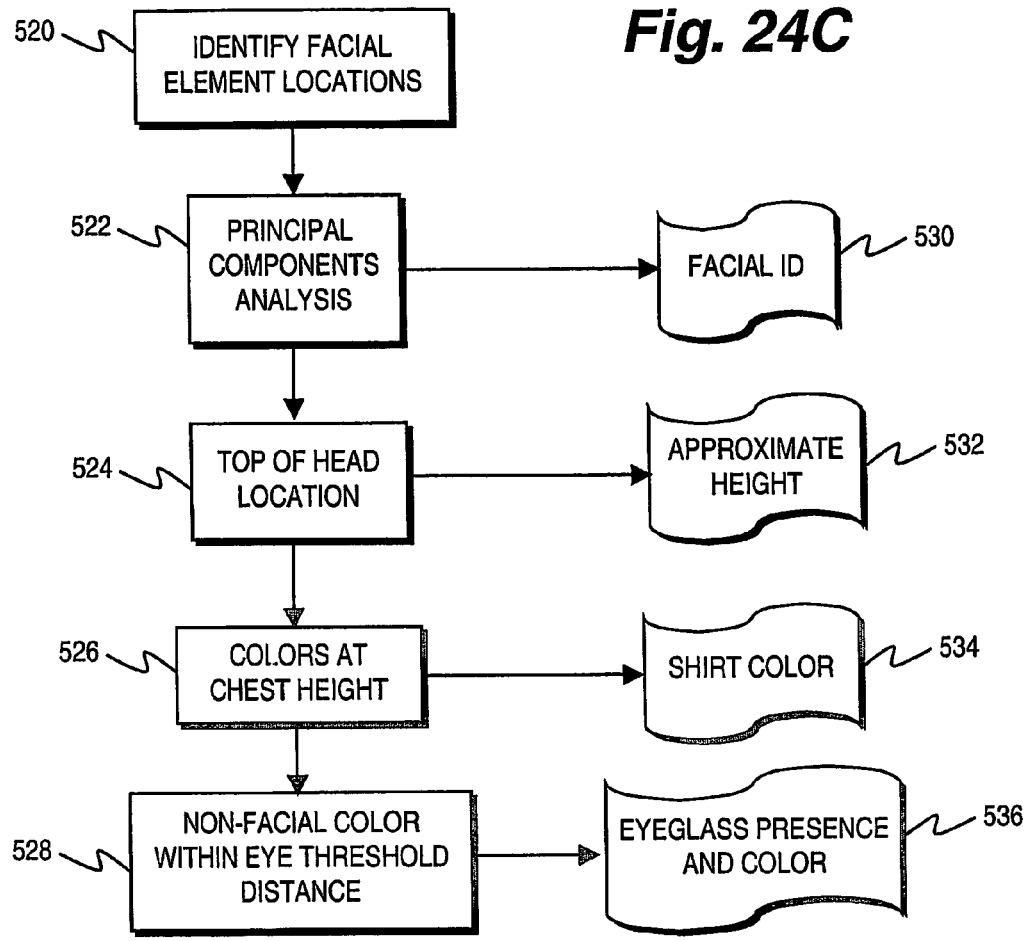
FIG. 24C is a block flow diagram for obtaining information from a test image.

FIG. 24C is a block flow diagram for obtaining information from a test image. It should be noted that the sequence of steps after the step 520 can largely be varied without affecting the outcome of the analysis. In a step 520, the overall locations of the face and locations of facial elements are obtained, as described above. Then, in a step 522, a principal components or other facial recognition method is used to obtain a facial ID, which is stored in a step 530.

From the image in FIG. 24A, it can be seen that additional information can be obtained. Such information can include the person's height, obtained from the position in the image of the top of the person's head in a step 524, with the height being stored in a step 532. It should be noted that in most facial recognition programs, the shape of the person's head is estimated, with such estimation being somewhat independent of the presence on the person's head of a hat or the fashion of the person's hair. Thus, the person's height is generally estimated on the computed location of the top of the person's skull. The program can also search from non facial skin tone colors arrayed around the eyes, indicating the presence of eyeglasses. From this information, the use of eyeglasses and the color of eyeglasses can be inferred, as in a step 528 and the information stored in a step 536.

From the image, other information can be straightforwardly obtained, including the presence or absence of eyeglasses, the color of the eyeglasses, makeup color, jewelry, facial hair distribution, hair color, and skin tone. Some of the characteristics will be permanently or relatively permanently (i.e. over a period of many days to weeks or months) associated with the person. Other characteristics that are associated with a person are expected to change on a daily basis, such as clothing, makeup or jewelry.

For example, a shirt color can be inferred in a step 526 by looking approximately a head's length below the location of a chin and stored in s step 534. Pixels from that location can be sampled, and the two most common distinct shirt colors stored for later retrieval. In many instances, the reference image will be taken on the same day at which the person visits the entertainment venue, such as a party, a bar mitzvah, a company picnic, a sports event or convention. In such cases, the temporary information would assist in identifying or validating an identification. In the database of FIG. 24B, these temporary characteristics, along with optional confidence measures, are stored along with the date of the reference image. These transient characteristics will be used for person identification only for the date at which the reference image was obtained, and the shirt color will then be purged from the database thereafter. Thus, the facial recognition system can utilize both durable characteristics of the person (e.g. their facial metrics) as well as transient characteristics (e.g. clothes, hair, hat).

Figure 24D:
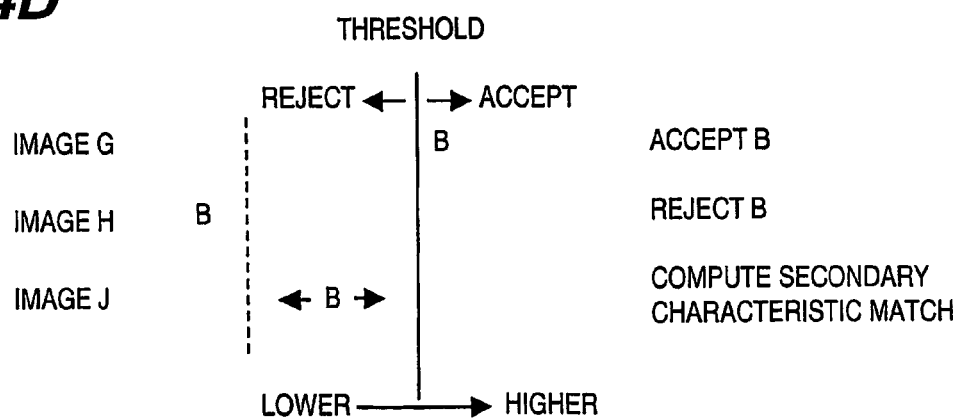
FIG. 24D is a schematic diagram of the confidence levels from matching a person in a set of new images with a person in the reference image database, using associated characteristics other than only strictly facial features.

FIG. 24D is a schematic diagram of the confidence levels from matching a person in a set of new images with a person in the reference image database, using associated characteristics other than only strictly facial features. In image G, the presence of person B is indicated with a confidence level greater than the acceptance threshold, and so the presence of person B is verified. In image H, the presence of person B is indicated, but with a confidence level below that of the acceptance threshold, and furthermore less than a predetermined secondary threshold, indicated by the vertical dashed line. In such cases, on the basis of facial recognition alone, the absence of person B is indicated.

In image J, the presence of person B is indicated with a confidence level below that of the acceptance threshold, but above that of the predetermined secondary threshold level. In such case, ancillary characteristics, stored in the steps 532 through the steps 536, can also be examined. For permanent characteristics of height, a mismatch in height between the test image and the reference image will generally result in a low confidence level for the presence of B. However, mismatches of transient characteristics (shirt color or eyeglasses) will generally not greatly affect the confidence level of B's presence, since it is possible that the patron has removed their glasses or has put a sweater over their shirt (or conversely, removed a sweater that was in the reference image). However, a match between the reference and test image on a transient characteristic will generally improve the confidence level in B's presence. After adjusting for the ancillary characteristic match, rejecting or accepting for the presence of B can then be made against the threshold values.

It should be noted that the weighting given for the shirt color, presence of eyeglass, etc., can be weighted by the confidence of the system in assessing the characteristic. For example, if the system has difficulty in assessing the color of the patron's hair color (e.g. the person is wearing a hat or scarf), the associated confidence can then be used to weight the extent to which the confidence level on B's presence is affected by the match or mismatch in hair color—the higher the confidence in the hair color, the more the adjustment of the confidence level in B's presence or absence.

In general, only a single reference image is obtained for a particular patron, from which a single facial ID is obtained. It is optimal for the facial ID to be close to some statistically average (e.g. mean or median) facial ID that would be obtained from many different images. However, it is possible that the reference image may not be prototypical of the patron, and give rise to facial ID that is far from the average facial ID. Two methods of correcting this potential issues are discussed below.

Figure 25A:
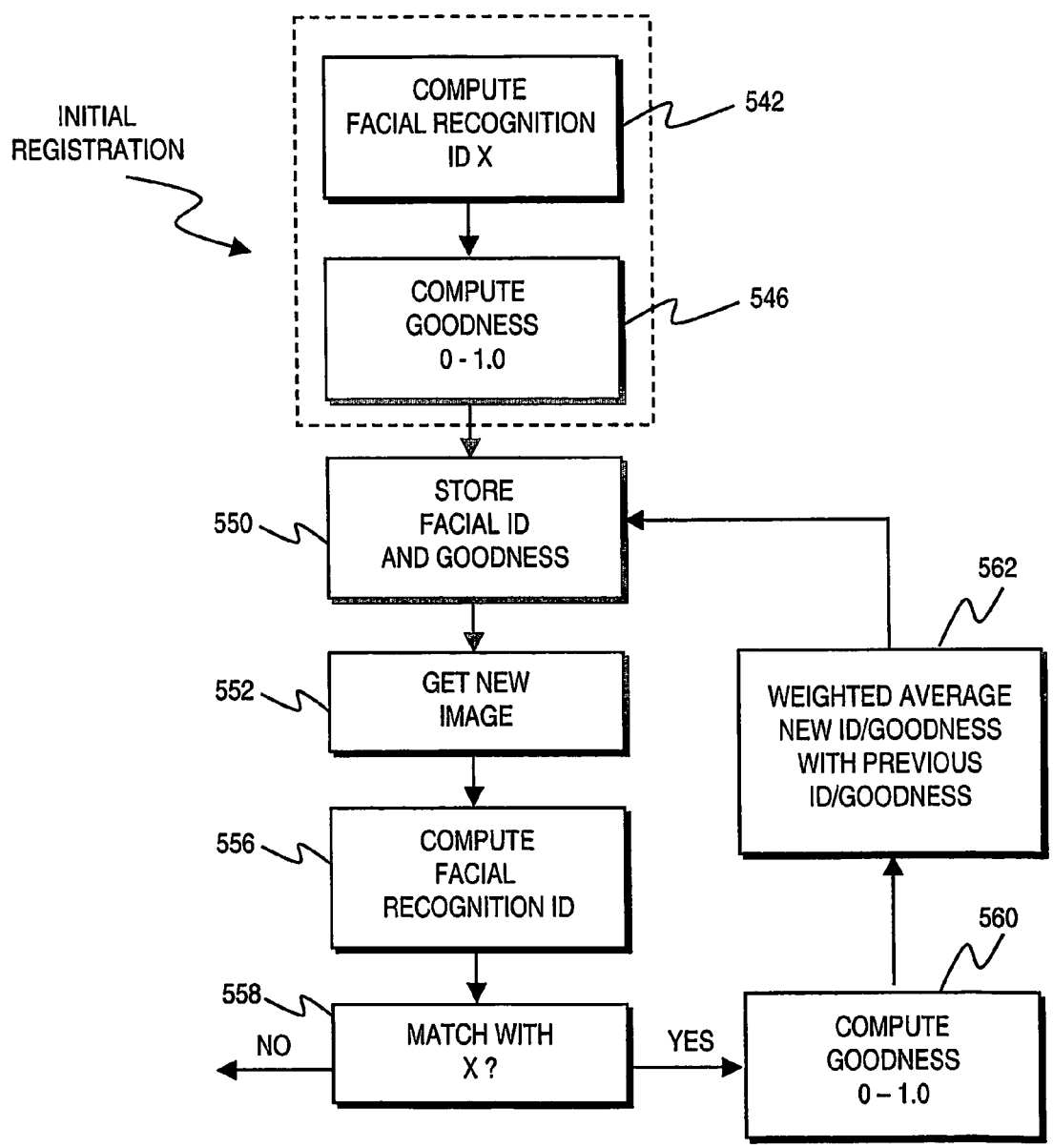
FIG. 25A is a block flow diagram that uses new images of a patron to improve the facial ID of that patron.

FIG. 25A is a block flow diagram that uses new images of a patron to improve the facial ID of that patron. During the initial registration of a patron, a step 542 computes a facial recognition ID for the patron X, and synchronously or subsequently also computes a goodness value in a step 546. The goodness value, nominally between 0.0 and 1.0 but which can be between any two predetermined values, indicates the extent to which the image is of sufficient quality, the extent to which the lighting is sufficient, the extent to which the face is angled away from the camera, the extent to which the face fits prototypes used in principal components or other types of analysis, or other factors affecting the reliability of the facial ID. In a step 550, the facial ID and associated goodness are stored in a facial recognition database.

Subsequent to registration, other images are captured in steps 552, some of which images contain representations of the patron X. For the facial representations within the images, in a step 556, facial recognition IDs are computed. In a step 558, it is determined whether the facial IDs in the image captured in the step 552 is sufficiently similar to that of the facial ID stored in the step 550 for the patron X—that is, if the representation of patron X is deemed to be within the image. If so, a goodness value is determined in a step 560 similarly to the step 546. In a step 562, a new facial ID is computed through the weighted average of the previously stored facial ID and the new facial ID. The weighting for the average can be varied (linear or geometrical), and can use powers of weighting other than one. Furthermore, certain facial recognition programs provide alternative means for registering new people using multiple reference images, or for adding new reference images to a previously registered person, and these means could be used for this purpose, as well. The result is a new facial ID, different from either the previously stored or new facial IDs, as well as a new goodness factor that is similarly weighted. In the step 550, the new facial ID and goodness values are stored in the facial recognition database. Alternatively, the database can store simply the facial ID with the maximum associated goodness factor.

The result of the method described in FIG. 25A is to converge, over time, on a more reliable facial ID. It should also be noted that the weighting of the previous and new facial IDs will further take into account the number of IDs that were involved in generating the previously stored facial ID. For example, if the system had already used four images in computing the stored facial ID, a new facial ID will be given roughly only a one-fifth weight relative to the stored facial ID (depending on the associated goodness factors). Expressed numerically with linear weighting, if one of the stored principal component values is $PC_S$ with a goodness of $G_S$ and is computed from a composite of $I_S$ images, whereas the new image has a comparable principal component value of $PC_N$, goodness of $G_N$ and comes from the single image, the weighted principal component value $PC_W$ can be computed from $$PCW=[(PCS*GS*IS)+(PCN*GN)]/[(GS*IS)+(GN)]$$

Figure 25B:
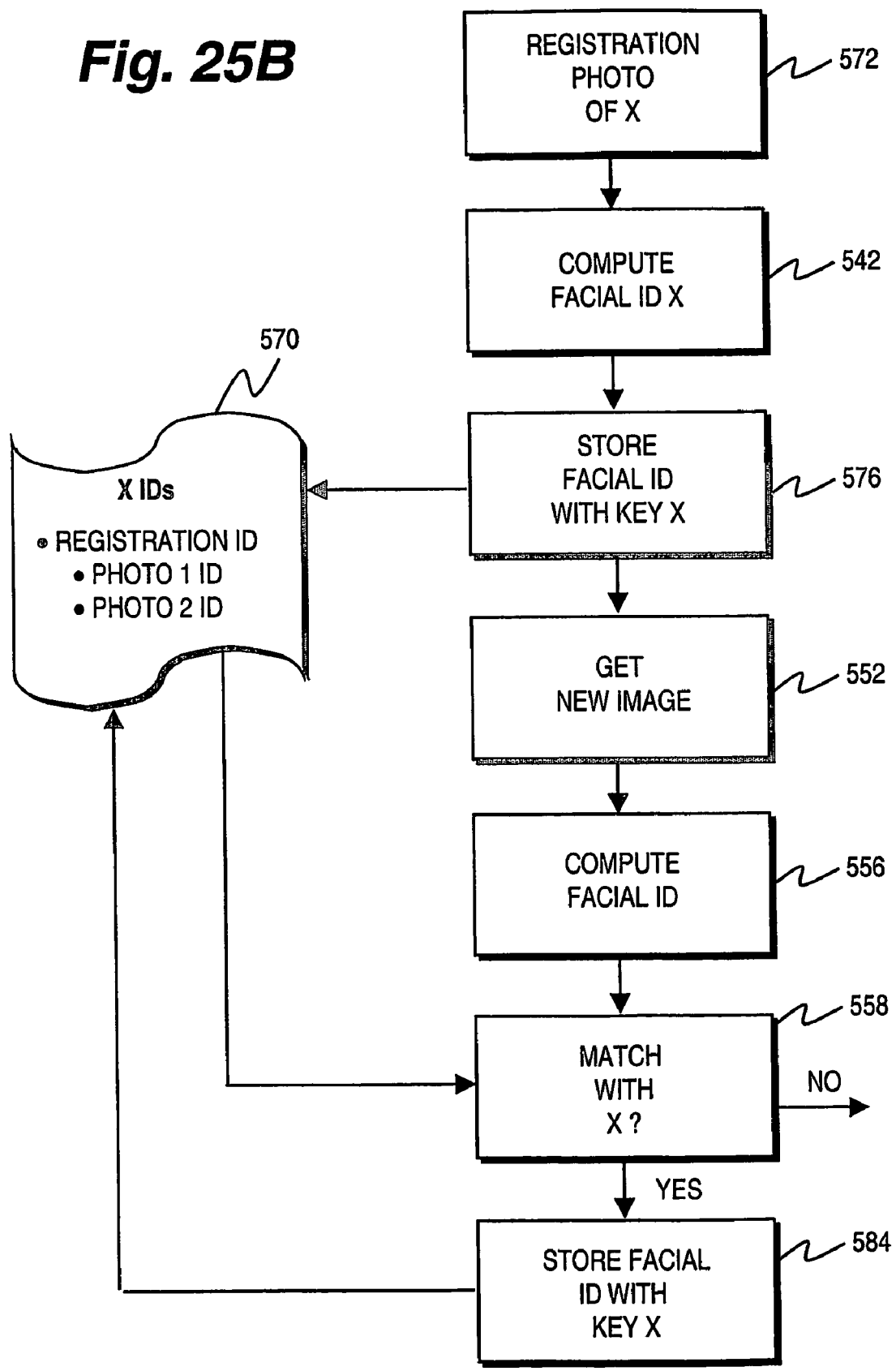
FIG. 25B is a block flow diagram that compiles all facial identifiers of a patron for subsequent identification.

FIG. 25B is a block flow diagram that compiles all facial IDs of a patron for subsequent identification. In a step 572, a registration photo of the patron X is captured, and in the subsequent step 542, a facial ID for the patron X is computed. In a step 576, the facial ID for X is stored in the database in a record 570 that stores all of the IDs for patron X. It should be noted that these facial IDs can alternatively or additionally store the IDs in a list of IDs for search purposes, with a pointer to the record for X (such as shown in FIG. 24B). A new image is captured in the step 552, after which a facial ID is computed in the step 556. In the matching step 558, the new facial ID is compared with all of the stored IDs for X in the record 570 (or which can be compared with a list of IDs for all patrons). If a match of sufficient closeness is made with any of these facial IDs, the new facial ID is stored in the database record 570 (or in the list of all IDs) for use in subsequent searches. The method of FIG. 25B has the advantage that the facial IDs of a given patron will vary from image to image, and in the matching step 558, the new image facial ID can be compared with the known range of patron facial IDs. This improves the chances that a correct match will be made with a patron, especially if the registration image is of inferior quality (e.g. image quality, movement in image, distorted expression on the patron face, parts of the face obscured).

The Step of Image Distribution 39

The patron 43 will access the stored photographic images at image distribution stations 77, which may be physically integrated into kiosks 75 or alternatively be located in a building. The distribution station 77 will generally incorporate a means to identify the patron 43 by incorporating an integral remote identification device 51. Once the patron 43 is identified, the images corresponding to the patron 43 may be retrieved from the image storage device 71, and the images projected onto the viewing screen 85 for the patron to review. The viewing screen 85 could either be a standard computer screen (e.g. cathode ray tube, or an active or passive matrix display) configured for the purpose, or could be a standard or projection television screen. At the distribution station 77, the patron could perform certain actions such as:

printing an image, manipulating the image to produce special photographic effects such as adjusting contrast or color, cropping, enlarging, etc., adding or subtracting content to the image, such as images of theme park mascots or written information about the time and date or ride name, adding an image to or deleting an image from an "album" to be produced, printing an image on a particular memento (for example, a mug, a certificate, a greeting card, a T-shirt or other clothing), sending the image to an electronic address (for example, a FAX machine using telephone communications or an electronic mail Internet address) of the client's choice, generating a digital copy of the photographic images on either standard computer storage means (diskette or CD) or standard digital photographic formats (e.g. the Kodak PhotoCD format), providing photographic slides for the client, or providing photographic negatives for subsequent printing by the client.

In a standalone embodiment, the distribution station 77 could include means for accepting money from the client, using one or both of a cash payment slot or credit card payment slot. Furthermore, the image could be printed within the distribution device, and deposited with the client through the image distribution slot 87.

Multiple images of a patron 43 could be collected and packaged as an album. Also, if patrons are visiting the entertainment venue in a group, their photographic images could be collected together into a single album, even if their paths within the venue are divergent. This may be handled by allowing multiple patrons within a group to carry tags bearing the same digital identifier, so that requesting images corresponding to a single identifier would retrieve images from all group members. Alternatively, each patron could bear a different identifier, but the image storage device could then contain additional information about which patrons belong to a given group, so that image retrieval could be performed on a group basis.

Figure 6A:
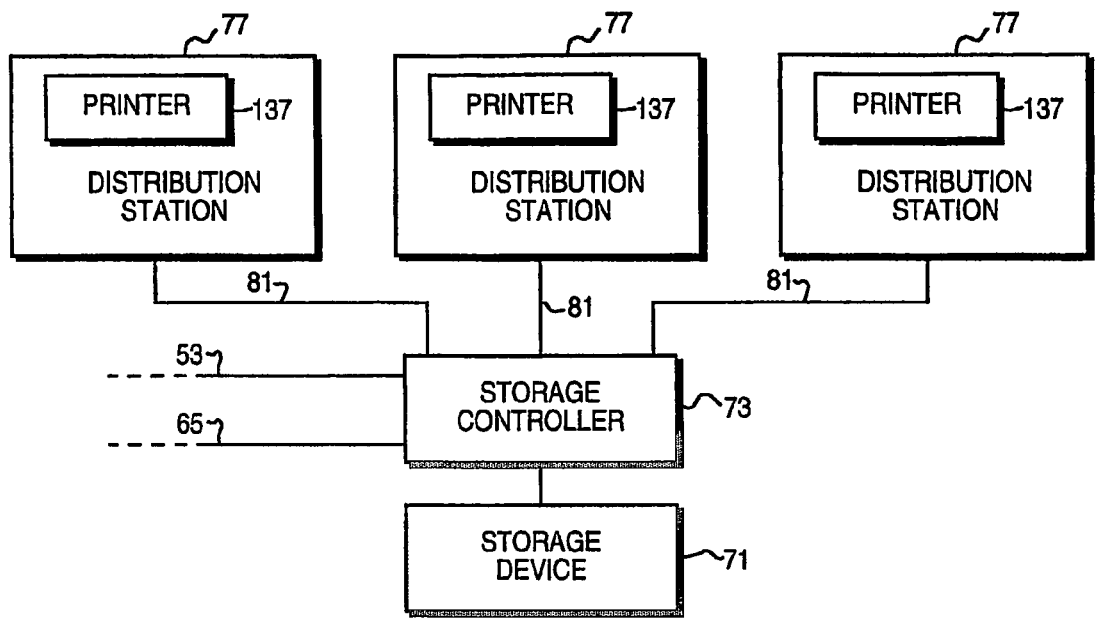
FIG. 6a and FIG. 6b are block schematics of two different methods of integrating printing into image distribution in a person-specific imaging system.
Figure 6B:
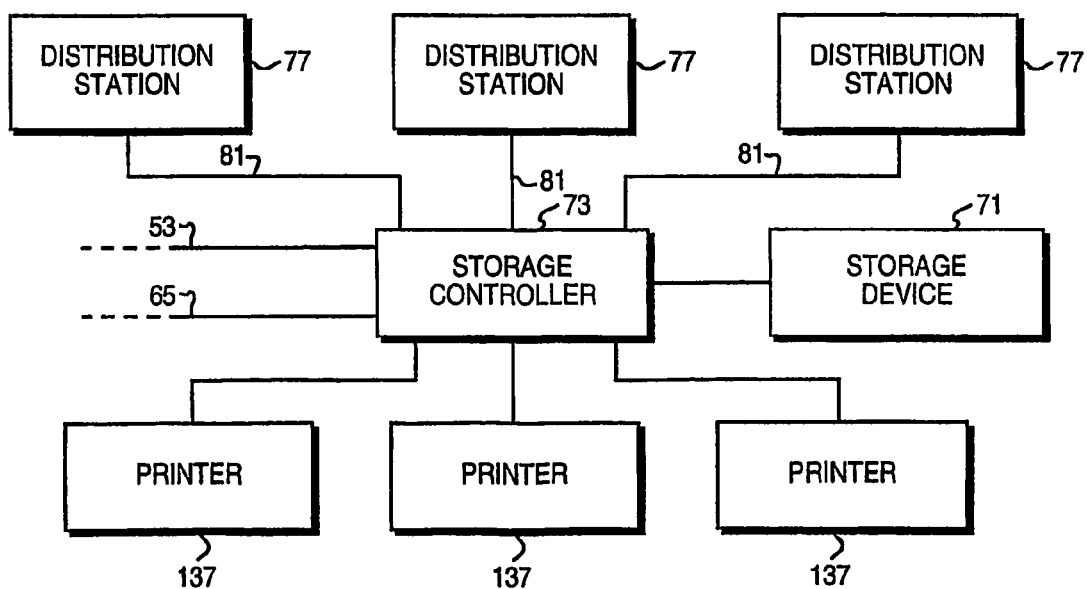

The sites of client interaction and the distribution of materials may vary. FIG. 6a and FIG. 6b are block schematics of two different methods for integrating printing into distribution. FIG. 6a denotes the distribution scheme as shown in FIG. 2. Data from the remote identification reader 52 is received over identification transfer wire 53, and the image is received through image transfer wire 65, where these two pieces of information are transferred by the storage controller 73 to the storage device 71. Distribution stations 77 are connected to the storage controller by the distribution cables 81. Within each distribution station 77 is a printer 137 for the production of a printed image for delivery to a patron 43 at the distribution station 77. The distribution cable 81, it should be noted, must allow for bi-directional communication, in which requests for images are sent from the distribution station 77 to the storage controller 73, and images are sent from the storage controller 73 back to the distribution station 77.

FIG. 6b denotes an alternative distribution scheme in which the printers 137 are not located at the distribution station 77. In this case, the distribution station 77 is used only for patron 43 interaction, where images are reviewed and selected. Requests for printing are sent from the distribution station 77 to the storage controller 73. The storage controller 73 retrieves the requested image from the storage device 71, and then routes the image to a suitable printer 137 for printing. The suitability of a particular printer 137 may be determined by the characteristics of the printing output specified, such as the size of the print, or the substrate on which the print is made (ceramic mugs, metallic films, fabrics or posters). Alternatively, the printing resource may be chosen on the basis of its availability. This distribution scheme effectively utilizes printing resources, which can be fully occupied with requests from a large number of distribution stations 77, allowing for economies of scale. For instance, photographic image albums might be best produced on high-volume machinery, which may have advantages of higher speed and lower cost, and may additionally have special features, such as automatic binding.

In many cases, printing may be performed at times distinct from patron 43 interaction at the distribution station 77. For example, the patron 43 may choose images at the distribution station 77, and the images may be transferred to the appropriate medium (paper, T-shirt, or mug) at a later time for delivery to the patron 43, either later in the day or on a different day, possibly through mail delivery.

It should be noted that image distribution may be effected by alternative means that do not involve specialized hardware such as the distribution station 77. For example, images corresponding to a patron may be compiled in rough or size-reduced format, such as a photographic proof sheet, which could be sent to the patron 43 at home. The patron could then select image for purchase, and order these images via telephone, mail order, or Internet transaction. In this embodiment, however, the duration over which the images will have to be stored may be weeks or months, necessitating an inexpensive and accessible means for long-term image storage. It should be noted that since a database is generally maintained which associates which patron 43 corresponded with which tag 49 or which code stored on a tag 49 on a specific date or at a specific time (e.g. step 138 in FIG. 3), images stored for considerable periods of time can still be associated with the corresponding patron 43.

Re-creation of Identifier for Retrieval of Identified Images

If the image identification is performed via facial recognition, the patrons's face—always present with the patron—can be used to recreate the facial recognition identifier (facial ID) with which the image is associated in the database. After the patron has left the entertainment venue (and is, perhaps, at home), the images can still be retrieved.

One method of performing facial ID recreation is for the patron to send an image of themselves, either as an electronic document over the Internet (e.g. a JPEG file), via a FAX image over telephone or Internet communications lines, via a streaming image, or even to send in a photograph of themselves by mail. The distribution system could then compute a facial ID for use in retrieving images of the patron.

For smaller events, such as weddings and parties, the patron can scan through unselected images (e.g. sequential or random in time) until an image with their own face appears. The patron can select the image, and then select the representation of their own face from the image—for example, by clicking on their face with a cursor. This facial image can then, as described above, compute a facial ID for use in retrieving additional images of the patron.

This process can be accelerated by the careful selection of images for the patron to scan. For example, images with larger numbers of faces will confer a higher probability of comprising the representation of the patron. Furthermore, it is of no particular use to present an image to the patron in which all of the faces in the image have been previously presented. Therefore, the patron should only be presented images in which faces previously unseen are presented.

An algorithm for performing this form of presentation is as follows, with reference to FIG. 29, a block flow diagram of an efficient search algorithm for finding a person in an image collection. In a first step 760, all of the images in an image collection are classified by a facial recognition program to determine the persons whose image is present within each image. The identification is performed to the extent such that persons whose image is present within two different images can be recognized with some reliability as being the same person. For instance, each person can be given a substantially unique ID, and then the each image can be classified by facial recognition according to all persons whose image is represented in that image. In a step 762, the unique IDs associated with each image are then stored either temporarily, such as in random access memory, or can be durably stored in a file or database. It is also convenient for the approximate location and size of the representation of face being identified is also stored.

In a step 764, the first image is presented to the patron, the presented image being that with the largest number of represented faces, determined by searching through the stored unique IDs. The patron determines via visual inspection if the desired person (his own, or a representation of a person for which the patron wishes to obtain images) is present in a step 768. If the patron does not find the desired representation, and it is determined in a step 770 that all images have not been presented to the patron, then he is presented with the image that has the largest number of represented faces previously unseen by the patron in a repeat of the step 766. This process is then repeated until images with all unique faces represented are presented to the patron, at which point the process terminates with failure in a step 772. If the patron has still not found his own representation—perhaps because his own face was not recognized in the first set of images—the process can be repeated using the same criteria applied to images that had net been seen by the patron in the first attempt through the process—in effect repeating the process using images assigned as having the same persons represented, but for which the patron did not recognize the person, either due to a mistake on the part of the patron, or a mistake on the part of the system assigning unique IDs to each person's representation in the image.

If the patron does find an image containing the representation of the desired person, the image is presented to the patron to identify the representation in the image corresponding to the desired person in a step 774. The patron points at the desired person, which can be performed by using a mouse, wherein a button is pressed when the cursor is over the face of the desired person's representation. This step can be skipped when only a single person's representation is present within an image. However, even in that case, it can be useful to have the patron confirm the location of the desired person's representation, since it is otherwise possible that the desired person's representation is in the image, but was not recognized as such by the facial recognition software (e.g. the desired person's representation is too small, blurred, or facing to the side). In a step 776, from the location of the desired person's representation obtained from the step 774, the unique ID associated with that person can be retrieved from the IDs stored in the step 762, given that the approximate location and size of the representation of the face is also stored. Alternatively, the image can be retrieved and analyzed by facial recognition at this point to determine the unique ID of the representation chosen in the step 774. In a step 778, the stored unique IDs for each of the images can be searched to determine those images containing representations of the desired person. These images can then be retrieved either for viewing by the patron or distribution.

Figure 29:
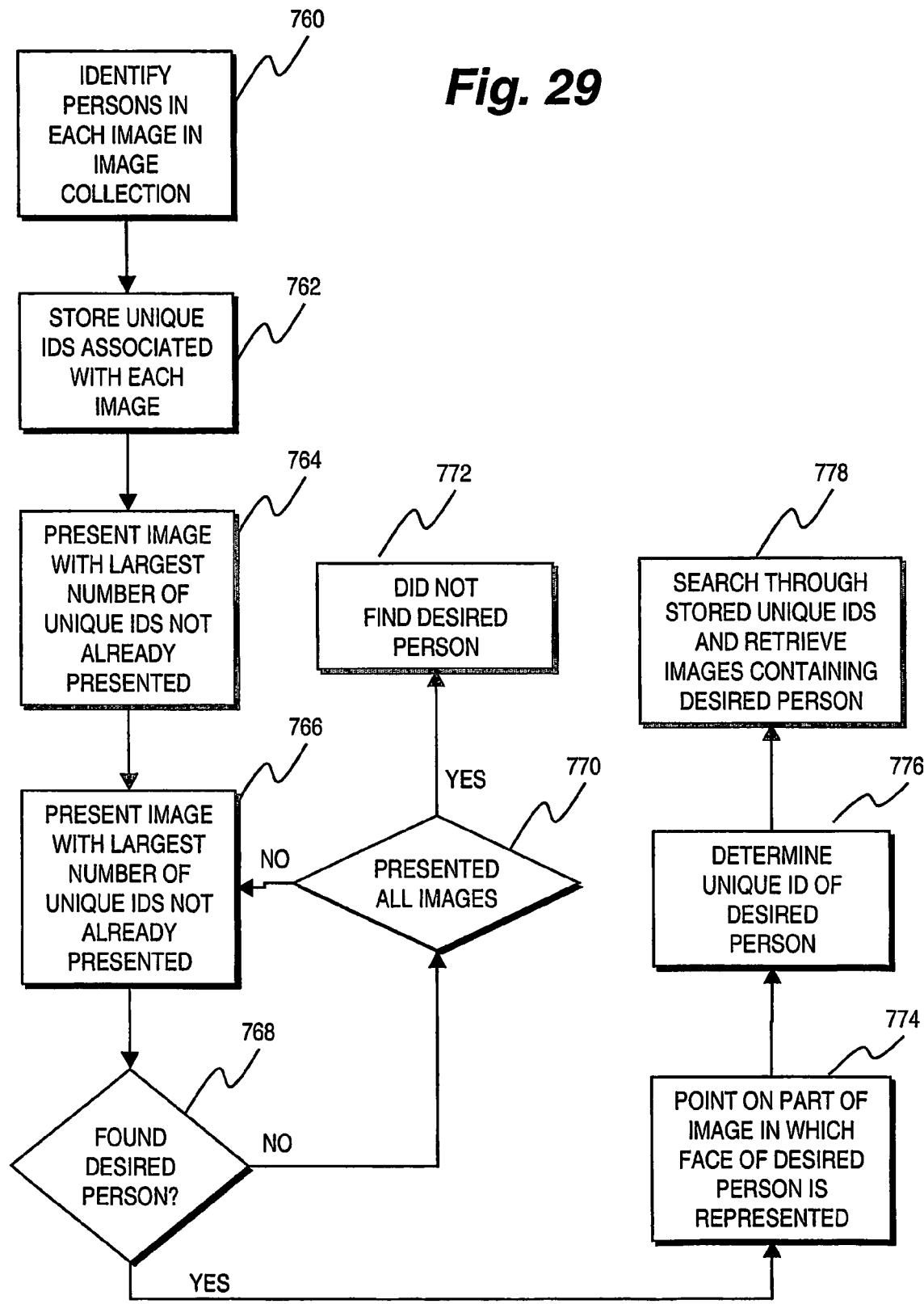
FIG. 29 is a block flow diagram of an efficient search algorithm for finding a person in an image collection.

It should be noted that the separation in time between the image capture of the images sorted according to the algorithm of FIG. 29 and the sorting process can be months or even years. Furthermore, the images can be captured by many different people in many different locations, which can be both public and private, and stored either in a single database, or in multiple linked databases. Thus, this algorithm can be very profitably applied to images stored, for example, in such places as online photo sharing sites and photo archiving sites. These algorithms provide a new way for patron to sort through hundreds or thousands of personal photographs for those that have one or more people.

It should be noted that names can be associated in the database along with the unique IDs that are stored, so that patrons can then search through the database, for example, for those images containing representation of "David". The search can also be performed on Boolean combinations, such as "images containing David and Marty, but not Ed". Given that the facial recognition software can also determine the size of the face, or the number of people in the image, the search criteria can then include the size of the facial image, or the number of people in the image. Searches can also be performed that include search criteria unrelated to facial recognition, such as the date of the image.

FIG. 30 is a user interface for searching an archival image collection. In a box A, the user can select the number of people to be in an image. In general, a first step in facial recognition is locating and blocking the location of a face, and this information can be used to determine the number of faces identified in the image. Radio buttons below allow the user to sort the images that meet the criterion according to the number of people in the image. In addition, because the representation of each face is physically located and sized, the pictures can additionally or alternatively be sorted by the size of the facial representation. In box B, the people whose representations are searched for in the images can be selected through direct input or through the use, as shown in the figure, of pull-down menus. In the example shown, the user has selected in box A that only images with 2 people should be selected, and in box B, has further indicated that the images should include both Pamela and Barbara. It should be noted that the different designations of Brian (i.e. Brian [A], Brian [B], Brian [C], Brian [A11]) represent images in which Brian is represented at different ages, or at all ages, in a manner described elsewhere in this specification.

Figure 26:
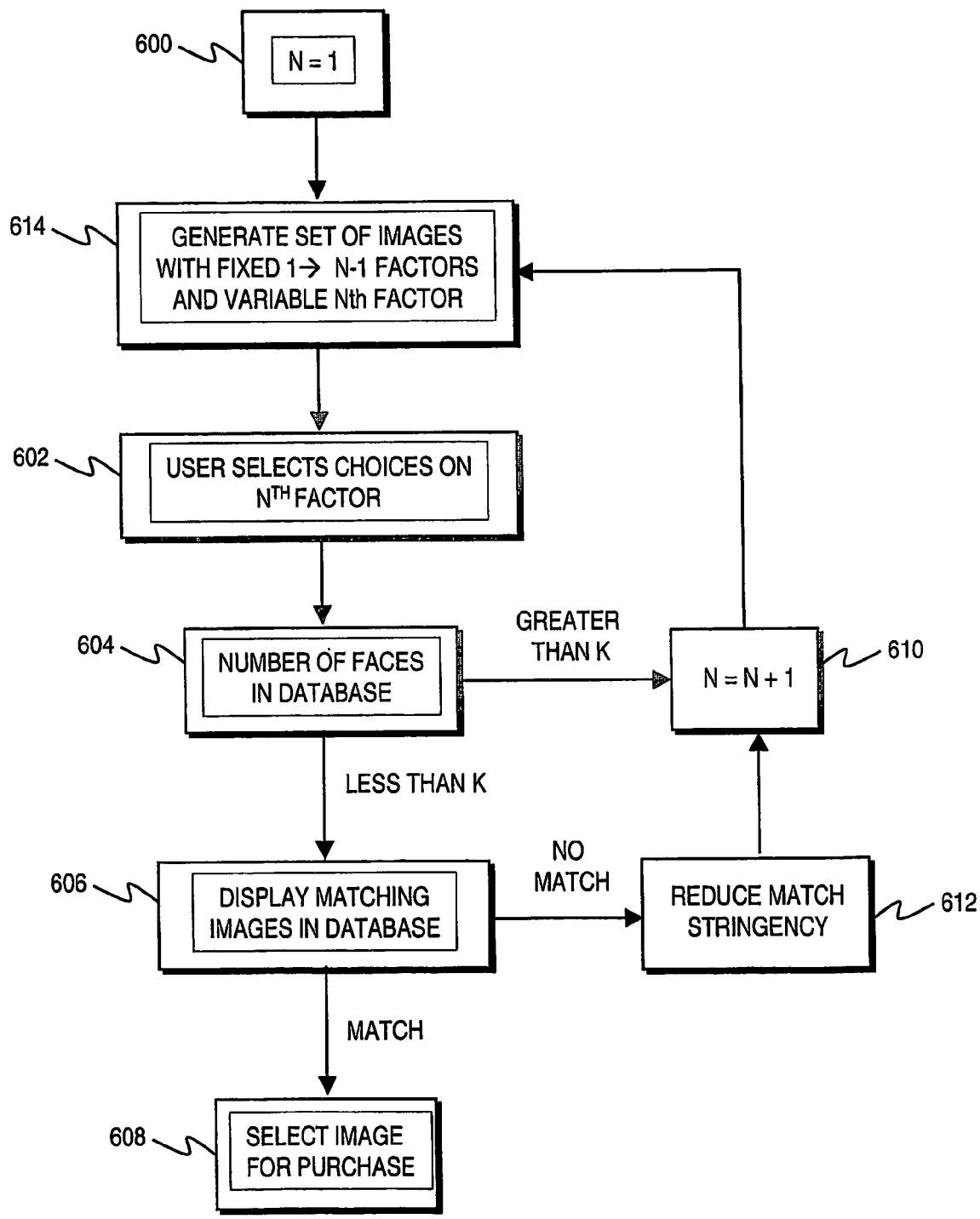
FIG. 26 is a block flow diagram of facial ID generation by the patron.

An alternative means of generating a patron ID is provided in FIG. 26, a block flow diagram of facial ID generation by the patron. In the discussion, it is assumed that the facial recognition program is organized by factors, which can be unitary characteristics (e.g. height to width ratio, distance between pupils), or complex factors (such as principal components). It is further assumed that the factors can be used to create images of faces or parts of faces (e.g. faces missing elements such as ears or mouths) that visually express the factors. Finally, it is further assumed that either the factors can be directly converted into a facial ID, or that the image so composed by the factors can be converted into an ID. Consider, for example, the relational database record of FIG. 24B, wherein the facial ID is 80/AB/62/E7/OD/81/B7/23/AO/06/F2/30/7C/3F/11/2D, where each pair of hexadecimal numbers is the value of a principal component (or factor). Thus, in the present method, the first principal component '80' can be used to draw part of a facial image, and that the combination of the first and second principal components—'80/AB'—could be used to draw a facial image that is even more recognizable.

In a first step 600, a counter N is set to 1. In a second step 614, a set of images are drawn given a range of values for the Nth (in this case, first), most distinguishing, factor. In a step 602, the patron is presented, for example, in a Web page, with the set of images drawn in the step 614, with the instruction to choose the face that most closely matches the characteristics of their own face. From the choice of face, a corresponding value of the factor is obtained. In the step 604, the database is searched for the number of images with approximately that factor value. In the decision step 606, if the number of matches is greater than a predetermined number K, which number will generally be less than 10, the counter N is incremented in a step 610. A set of images is then generated with the previously chosen factor values (for factors 1 through N−1), but now with varying Nth factor. In the step 602, the user chooses from this set of images, with said images being more highly constrained and detailed with an additional factor.

If the number of matching faces in the database is less than the predetermined value K, the images corresponding to the matching facial IDs are displayed to the patron in a step 606. If the patron finds their face representation within one of the images, the image is chosen for purchase in a step 608. If the patron does not find their face within the images provided, then one of the factor values previously chosen must be wrong. In such case, in a step 612, the stringency of the matching process of the step 604 is reduced, the counter N is incremented in the step 610, and the process above of working with yet another factor is repeated, starting with the generation of a set of images spanning the values of the new Nth factor. It is also within the spirit of the present invention that after the reduction in stringency, another match against the database can be made, without the specification of another factor value. In such case, images from the database that have been previously provided to the patron in order to find the patron image (in the step 606), and which have been rejected, are not shown again to the patron.

There are a number of variations in the method above that can be used that are within the spirit of the present invention. For example, instead of the control scheme described above, in which the number of factors used in narrowing down the number of potential images for match is increased until the number of potential matches is below a threshold, the number of factors to be specified can be a predetermined number. Also, the factors can be described in words rather than in drawings. Furthermore, the patron can be given tools to alter the factor values once they have been chosen, should they determine that their earlier estimates of values were incorrect. Additionally, the patron can be asked to enter information for accessory parameters, such as the presence of eyeglasses, height, hair color or other data that is not normally present as part of the facial ID (see FIGS. 24A-D). Such information can be used as part of the matching process to limit the number of images presented to the patron in the step 606.

Figure 32:
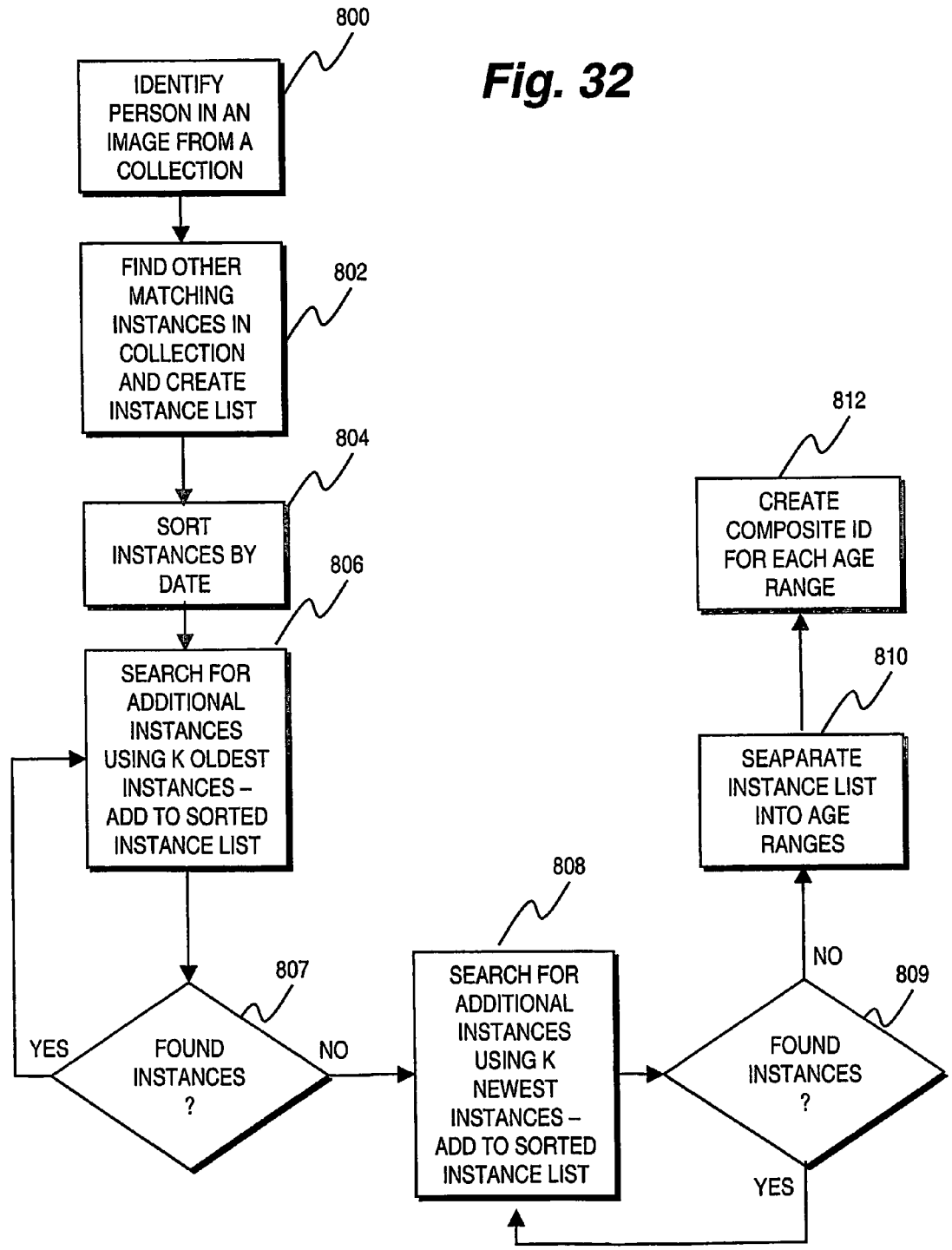
FIG. 32 is a block flow diagram of an algorithm for handling more than one facial ID for a person given images taken over a period of years.

Some of the images within the image collection can include images that were taken over a number of years. In such case, the age of the people within the images will vary considerably, which would involve changes to the facial ID of the person, especially if the person is young (e.g. less than 20 years of age). FIG. 32 is a block flow diagram of an algorithm for handling more than one facial BD for a person given images taken over a period of years. In a first step 800, a person is identified in an image from an image collection, and the facial ID is stored either permanently in a database, or temporarily in a buffer. In a second step 802, other facial representations that match the stored facial ID of the step 800 are identified, and a temporary instance list of all of the instances matching the facial ID is created. The instance list will contain both the facial IDs from each image (or a link to the storage location of the image), as well as the date of the image. In a step 804, the instances within the instance list are sorted on the basis of date. In a step 806, the facial IDs for the K oldest instances are used to search the collection for matching faces. Presumably these matching faces will largely consist of images that were taken at an earlier time than those already recognized, and while these faces in the newly identified images match with the K oldest recognized faces, they may not match well with other, later images. The number K is preferably between 1 and 10, and even more preferably between 2 and 5.

In a decision step 807, if new faces are identified in the step 806, the new instances are integrated into the instance list, sorted by date, and the step 806 is repeated. This repetition is designed to extend the identification of the person identified in the step 800 to the earliest possible date. In the step 807, if no new images are collected, then in a step 808, the K newest instances are used to try to extend the identification to more recent times by matching against the image collection with the K newest or most recent instances. Once again, the new instances are added to the instance list and sorted. In a step 809, it is determined whether new instances were identified in the step 808. If new instances were identified, the step 808 is repeated. If not, no new searches through the image collection are made.

In a step 810, the instance list is separated into age ranges. The age ranges can be chosen to be of equal duration (e.g. one year). Alternatively, they can also be chosen such that the metric distance between facial IDs bracketing each age range are of equal size. Other criteria or algorithms of separation are within the spirit of the present invention, with the proviso that within each age range, the "size" of the age range should be such that all images taken within that age range should be recognizable by the facial recognition software with reference to the facial IDs derived from the age ranges in the subsequent step. In a step 812, the facial IDs of the images so collected are used to create a composite ID for that age range. Although one cannot take new images of people from an earlier time, images from earlier times can be added to the image collection, and so the creation of a composite facial ID for each age range will allow the facial recognition program to most accurately identify facial representations for the image collection.

It should be noted that the algorithm above can also be used for instances where people's facial ID's change for reasons other than age. Such cases could include injuries, plastic surgery, changes in facial hair, makeup, and other permanent or temporary events. It should further be noted that instead of sorting images on the basis of age at which the image was taken (or indexed into the system), that the sorting can be performed on the basis of dissimilarity. For example, instead of separating the images into age ranges, one can separate the images into overlapping sets of image similarity, and to try to extend this set by looking for images that are similar to the most dissimilar within a group (i.e. outliers). This mode of use would be of particular use in those cases where images from an archival collection are to be indexed, and the date on which the image was taken is not available, precluding sorting on the basis of date.

Part of the comparing of facial IDs in facial recognition software programs is a threshold stringency. If the difference between two facial IDs are below this stringency, then the faces are considered to match, and if the difference is above this stringency, the faces are considered to be different. As the stringency level is increased, there will generally be fewer false positive matches, but this will generally increase the false negative matches. Likewise, as the stringency level is decrease, there will generally be fewer false negative matches, but then more false positive matches. Choosing the right stringency level is very important to make correct matches, and it is likely that for different sets of images, even those within a single image archive, the stringency thresholds might be different, because of differences in lighting intensity, facial expression, the amount the face is looking to the side, etc.

A particularly useful way of organizing a collection of images, taking into account differing stringencies for optimal classification, is the use of cluster analysis. Cluster analysis comprises a number of different algorithms that organize objects into clusters on the basis of a distance metric between the objects. The measures can be Euclidian, squared Euclidian, city-block (i.e. absolute sum of linear metrics), power distance, and other metrics. A power distance metric is generally convenient, in which the power is preferably between 0.5 and 2. The facial ID can generally be decomposed into a series of numerical values, in which the metric is considered therefore to be a multi-dimensional metric.

The linkage rules governing the overlap or joining of clusters can use a variety of linkage rules, including simple linkage, complete linkage, unweighted pair-group average, weighted pair-group average, unweighted pair-group centroid, weighted pair-group centroid, Ward's method, two-way joining, or other methods. These algorithms create clusters in which clusters are related by metric distances, which are generally hierarchical in organization. That is, we can consider all images to be in the same cluster if the clustering threshold distance is extremely large (e.g. larger than the metric distance between the two most dissimilar images). Conversely, we can consider all images to be in separate clusters is the clustering threshold distance is smaller than the distance between the two most similar images. Clustering algorithms can either provide a hierarchical organization indicating which images are in which cluster, depending on the threshold distance metric used, or alternatively, a fixed distance clustering algorithm can be applied multiple ties at different thresholds to give similar information.

This information can provide automated means for classifying images according to the people within the images. However, because of differences in facial placement, lighting, size of the facial representation in pixels, facial expressions, and more, a particular person's facial representations can vary to the extent that the faces are placed in different clusters by the clustering algorithm. Indeed, for a collection of images there is not likely to be a single stringency threshold metric for which all images are clustered so that each cluster contains all of the images related to a single person.

In may cases, it is preferable to use a semi-automated process for clustering images, in which an initial stringency threshold is used to cluster the images. This stringency threshold will generally be predetermined, and of such a magnitude that a person's representation is present in more than one cluster (that is, that the stringency threshold is high, causing a larger number of clusters than there are people). At this point, the user is given a reference image from one cluster, and then asked whether an image from other closely related cluster have representations of the same person. If the user responds affirmatively, then the two clusters are merged into a single cluster. It should also be noted that images from more than one cluster can be simultaneously compared to a reference image. By using the clustering algorithms, the number of comparisons that must be made can be significantly reduced from having to classify every image.

It should be noted that this semi-automated cluster analysis can also be used in cases of changing facial characteristics with age, as described in FIG. 32. In this case, however, images in which the age of the face differs are likely to be placed in different clusters, and the user then manually merges the clusters on the basis of visual inspection.

It should be noted that in the case of an online photo sharing system or a personal image collection, it would be inconvenient if facial recognition needed to be performed any time a user wished to select images that included some individual, or that they wished to sort the collection, for instance, on the basis of number of recognizable faces within each image. For this purpose, it is preferable to perform the facial recognition one time, and to then associate the facial identifier derived from the facial recognition with the image. For example, the database record associated with each image could include a list of each face recognized within the image, the spatial coordinates of the face (e.g. eye coordinates, which also provides some indication of the size of the facial image), and the facial identifier. In addition, the information stored could include additional information (e.g. color of clothes, presence of jewelry, and others) that could be used, as described above, to assist in making more accurate identification of people within images. In such cases, retrieval of the images from the collection can then be performed by the user with reference to the facial identifier, rather than manually input index information or date, in manners described elsewhere in this specification.

Device Configuration

In the previous sections, a number of devices performing different steps of the present invention have been shown, such as the remote ID reader 52, the camera 63, the storage controller 73 and the storage device 71. It is within the spirit of the present invention for two or more of these devices to share a common physical enclosure, or even to share common electronics and other components. Because of their natural physical proximity in the present invention, and the requirement for tight functional cooperation, the remote ID readers 52 and the cameras 63 may be partially or totally integrated. This integration may also be convenient for the storage controller 73 and the storage device 71.

Because of the demands for precise timing and cooperation between different devices, as described above, the use of digital computing devices, including dedicated microprocessors and computers, is useful in the operation of many of the devices that participate in the operation of the present invention. For example, the camera 63 may be effectively coupled to a computer, perhaps through the use of a "frame grabber" card (from Data Translation of Marlboro, Mass., or Matrox of Dorval, Quebec, Canada), so that images from the camera 63 can be buffered prior to transmission over the image transfer wire 65. Furthermore, the computer could take input from the remote ID reader 52, and then multiplex the identification with the image data in the manner described in FIG. 5, for transfer to the storage device 71.

It is also understood that the links between devices, including image transfer wire 65, identification transfer wire 53, and distribution cable 81, may include electrically conductive wires and cables, wireless transmission schemes, fiber optic cable, and infrared transmission schemes. The use of such transmission schemes is determined by a variety of issues, including cost, bandwidth, distance, intervening physical barriers, and environmental factors affecting electrical noise.

An Embodiment Employing Videographic Recording

Figure 7:
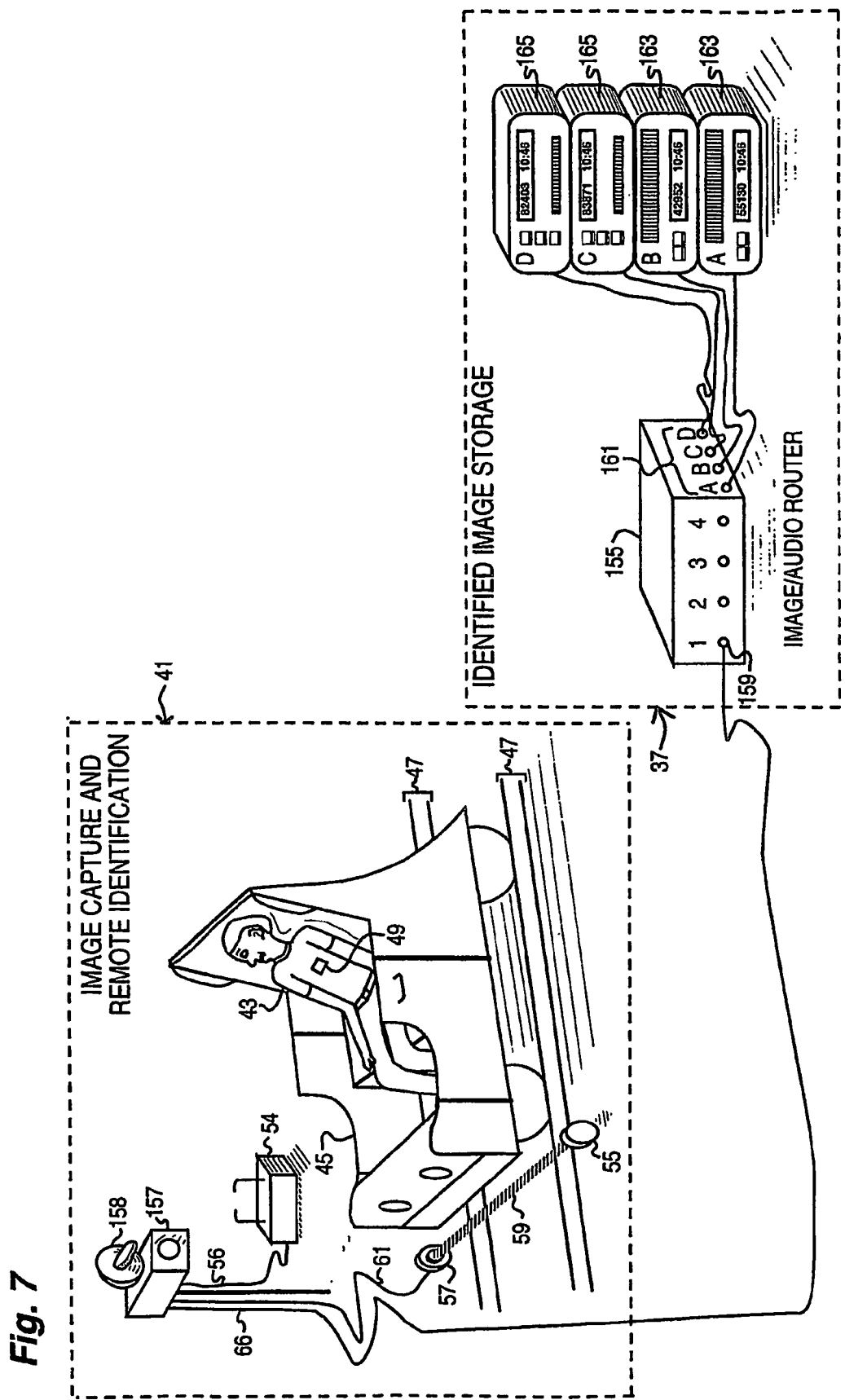
FIG. 7 is a perspective and schematic view of remote identification, image capture and image storage in a person-specific imaging system where video images are stored directly in an output format.

FIG. 7 is a pictorial schematic of an embodiment of the present invention where video images rather than single frame images are captured, and where the images are stored directly in an output format. The step of remote identification 141 is similar to that of FIG. 2 and FIG. 3, discussed above. However, instead of using the digital still camera 63, a videocamera 157 is used instead to capture videographic images.

The term "videograph" is used to refer to videorecorded images comprising multiple image frames of continuous video recording. A directional microphone 158 is connected to the videocamera 157, and transmits its audio input to the videocamera 157. The RFID reader 54 is connected to the videocamera 157 via a local identification transfer wire 56, transferring the identification transmitted by the tag 49 to the videocamera 157.

The output from the videocamera 157 contains videographic images captured by the videocamera 157, the audio signals from the directional microphone 158, and the identifier obtained from the RFID reader 52. These signals may be multiplexed by the videocamera 157 and associated electronics (which may include a microprocessor-based computer) in a manner similar to that shown in FIG. 5. For example, the audio information and identifiers may be placed either in the space between individual lines (rows) of video data, or in the interframe spaces. This multiplexed data is transferred via videographic image transfer wire 66 to an image/audio router 155, which accepts input from the videographic image transfer wire 66 at image input connector 159.

It should be noted that numerous configurations of data collection and transfer are within the spirit of the invention. For example, discrete transfer wires could transfer information individually from the videocamera 157, the directional microphone 158 and the RFID reader 54 to the image/audio router 155, without the need for data multiplexing. Alternatively, the directional microphone 158 could be integral to the videocamera 157. In addition, instead of the multiplexing taking place within the videocamera 157, requiring specialized hardware within the videocamera 157, it might be convenient for a separate local controller to accept input from the various devices (the videocamera 157, the microphone 158 and the RFID reader 54) and perform the multiplexing, prior to transfer over the videographic image transfer wire 66 to the router 155.

A plurality of videorecorders 163 and DVD recorders 165 are connected to the image router 155 through a plurality of router output connectors 161 (A-D), to accept the image inputs and place them on a permanent output device, in this case an analog format videotape for the videorecorders 163 and DVD disks for the DVD recorders 165. The image router 155 takes the identification signal, and decides which videorecorder 163 or DVD recorder 165 to route the image. During a specified period, perhaps for hours, a day, or a few days, a specified videorecorder 163 or DVD recorder 165 would be assigned to a specific patron 43 identifier, and all images tagged with that identifier would be sent to a specific output recording device. For example, the DVD recorder 165 labeled C might be assigned for the period of a day to a patron 43 with a digital identifier 83871, and all pictures with that identification, from any of the many camera sources in a theme park connected to router 155 through any image input connector 159, would be routed to videorecorder C through the appropriate C labeled output connector 161. While only four input and output connections to the router 155 are shown in FIG. 7, the number of connections in a practical implementation could reach hundreds, thousands or more.

It is within the spirit of the current invention for the signals from videocamera 157 to be transferred via videographic image transfer wire 66 either in digital or analog format. Furthermore, depending on the format of the image signal over the videographic image transfer wire 66, the image router may have to include either a digital-to-analog converter (if the videocamera output is digital and the output format is analog, as for a videorecorder 163) or analog-to-digital (if the videocamera output is analog and the output format is digital, as for a DVD recorder 165).

The storage of images in an output format can be practiced as well with single frame image capture. For instance, instead of storing images prior to printing, all images may be printed and stored in association with the patron 43 identity within the image (e.g. printed on the back of the image, or storing the image in a particular slot in a storage rack). Alternatively, the information may be transferred directly to the patron 43 Internet address. However, the method is particularly convenient with regard to videographic images. In such cases, the amount of image data is extremely large, and the required temporary image storage device may be correspondingly expensive, so that recording the images directly on a permanent storage format may be economically more attractive.

Figure 8:
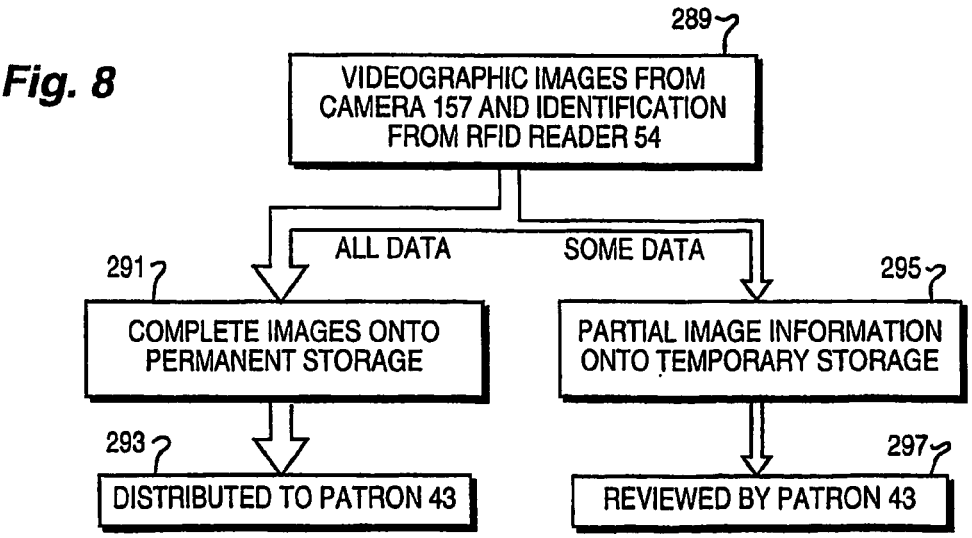
FIG. 8 is a block schematic of data flow in a person-specific imaging system, whereby segments of information are stored in a temporary storage means for the patron to preview.

It should be noted that this embodiment does not generally include a separate means of allowing the patron 43 to pick and choose from among images at a distribution station 77. Instead, because the images pertaining to the patron 43 are stored in permanent format, the patron 43 must simply choose whether or not to purchase the permanent output. FIG. 8 is a block schematic of data flow for an embodiment of the present invention, whereby segments of information are stored in a temporary storage means for the patron 43 to preview the stored images, without requiring all of the information to be easily available from permanent storage. A collection of images 289 from the videocamera 157 and the identification from RFID reader 54 are transferred in their totality to permanent storage. As a collection of permanently stored images 291, this data in its entirety is made available for distribution in a distribution step 293 to the patron 43, but large portions of the image collection 289 may be unavailable for the patron 43 to review prior to the distribution step 293. However, a subset of the image collection 289, perhaps single frames or a short segment from a videotape, are collected as temporarily stored images 295 which are stored on as temporary storage device. These temporarily stored images 295 are made available for the patron 43 in a review step 297, wherein the patron 43 reviews the temporarily stored image subset 295 of the permanently stored images 291 to determine whether to purchase the permanently stored images 291. Once the patron purchases the permanently stored images 291, the temporarily stored images 295 may be overwritten or deleted.

An Embodiment Involving Physical Transfer of Images and Identifiers

Figure 9:
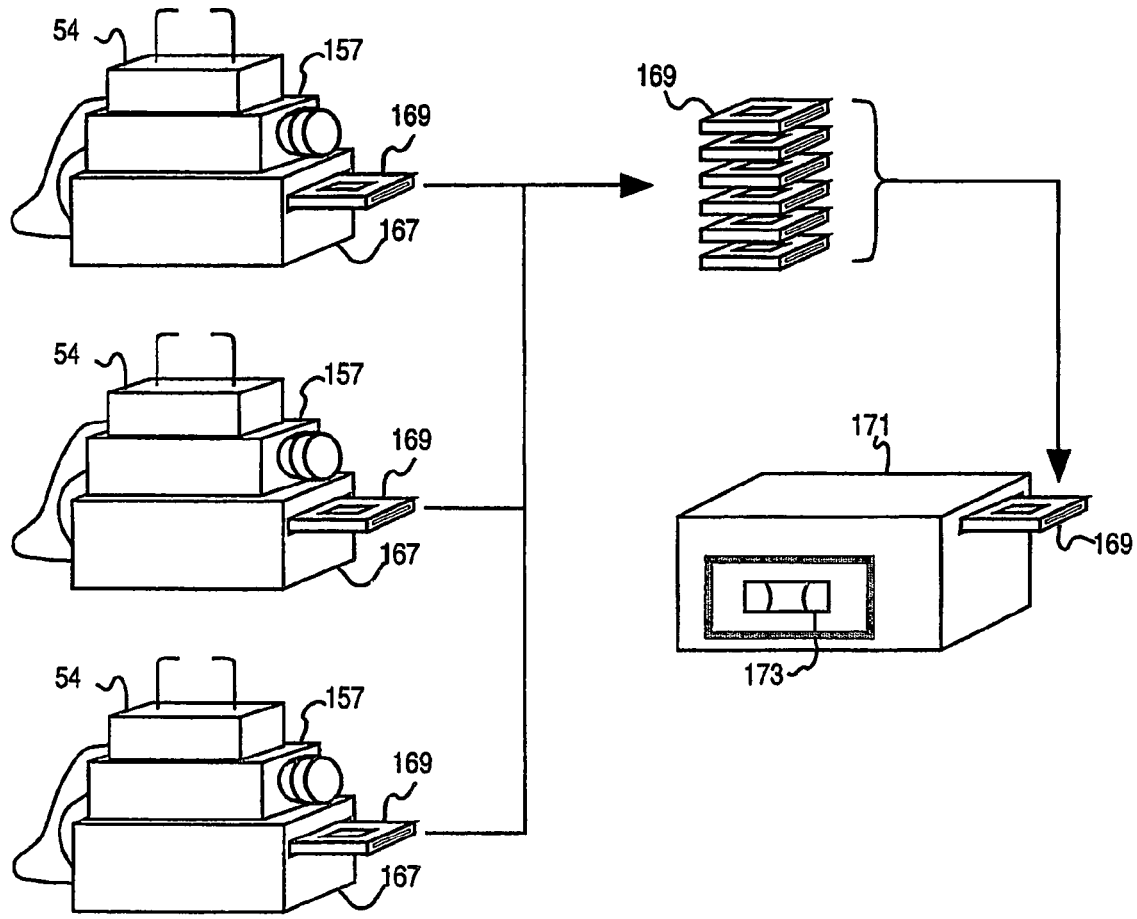
FIG. 9 is a perspective and schematic view of remote identification, image capture and image storage in a person-specific imaging system utilizing temporary storage devices local to image capture and remote identification means, wherein the stored information is physically transferred to a central identified image storage device.

The previous embodiments of the present invention involve the electronic transfer of data from the image capture and remote identification means to a common identified image storage device. In certain venues, the electronic communication between distant sites may be expensive or inconvenient. FIG. 9 is a schematic of an alternative system configuration utilizing storage devices local to image capture and remote identification means, wherein the stored information is physically transferred to a central identified image storage device. Multiple videocameras 157 and their associated RFID readers 54 are each connected to a local temporary storage device 167. The temporary storage device 167 utilizes a removable storage medium 169 on which both the image information from the videocamera 157 as well as the identification information from the RFID reader 54 is stored. The removable storage medium 169 may comprise a removable magnetic disk, a magnetic tape, or other such medium which may store electronic information and be physically transported separately from its recording electronics.

At intervals of minutes or hours, the removable storage medium 169 is removed from the temporary storage device 167 and physically transported to a central storage device 171, where the information from other removable storage media may be collected. At this point, the information from the removable storage medium 169 is transferred to a central storage medium 173 containing the information from a plurality of removable storage media 169.

It should be noted that other such configurations are within the spirit of the physical transfer of data described above. For instance, instead of consolidating the information from a plurality of removable storage media 169 onto a single central storage medium 173 as shown in FIG. 2, a plurality of central storage devices 171 may be employed, each of which reads the information from a removable storage medium 169 for use in the distribution of images to patrons 43. For example, in a central printing or videotape or DVD production facility, requests for images corresponding to individual patrons 43 could be transmitted to multiple central storage devices 171, which would then send the images to the appropriate printer 137, videotape recorder 163 or DVD recorder 165.

Data Formats and Data Flows

Analog Data

A variety of image, audio and identifier formats and corresponding transfer protocols are envisioned in the present invention. FIG. 10*a* is a block diagram indicating a flow of data that employs transfer of the audio and image data in the analog state. Analog image data 179 and analog audio data 181 are captured of the patron 43. These data are multiplexed into a single data format of audio/visual analog multiplexed data 183. There are a number of forms of such analog multiplexing possible, and a common form is to encode the analog image data 179 in an amplitude modulated form, while the analog audio data 181 are encoded in a corresponding frequency modulated form. This is often used, for instance, in the transmission of television signals. This multiplexing may conveniently be performed by generally available circuitry at the location of the videocamera 157 and the directional microphone 158 of FIG. 7.

The analog multiplexed data 183 could then be transferred by coaxial cable, wireless transmission, or some other suitable transmission means to the image/audio storage router 155. The remote identifier in general is a digital identifier 185 that would be transmitted over a separate wire or transmission means to arrive at the appropriate storage location. To store the identifier along with stored audio/visual multiplexed data 189, the digital identifier 185 may be encoded by the physical location of storage. For example, if the identifier 185 corresponding to audio/visual multiplexed data 183 indicates that the audio/visual data 183 is for a given patron 43, then the data would be stored at a location, for example the videotape recorder 163 or a DVD recorder 165 corresponding to that patron 43. A given storage location would be exclusively used by the patron 43 for their images during their stay at the entertainment venue. The identifier 185 is no longer kept in either digital or analog format, but is encapsulated as a location encoded identifier 187 based on the location at which the analog stored audio/visual data 189 is stored. All data transferred to that location corresponds to a single patron 43, and therefore the multiplexed data 185 corresponding to a given patron 43 can be retrieved simply by going to the recorder 163 or 165 corresponding to that patron 43.

It should be noted that the analog image data 179 could optionally originate as digital image data 175, and be converted by a D/A converter to the analog state. Likewise, the analog audio data 181 could originate as digital audio data 177, and be converted by a D/A converter to the analog state. Furthermore, the digital identifier 185 could be converted into an analog format, where it could be transferred directly with the corresponding analog multiplexed data 183. For example, the identifier 185, now in analog format, could be transferred with the analog image data 179 in amplitude modulated form as interframe analog data.

Digital Data

Figure 10B:
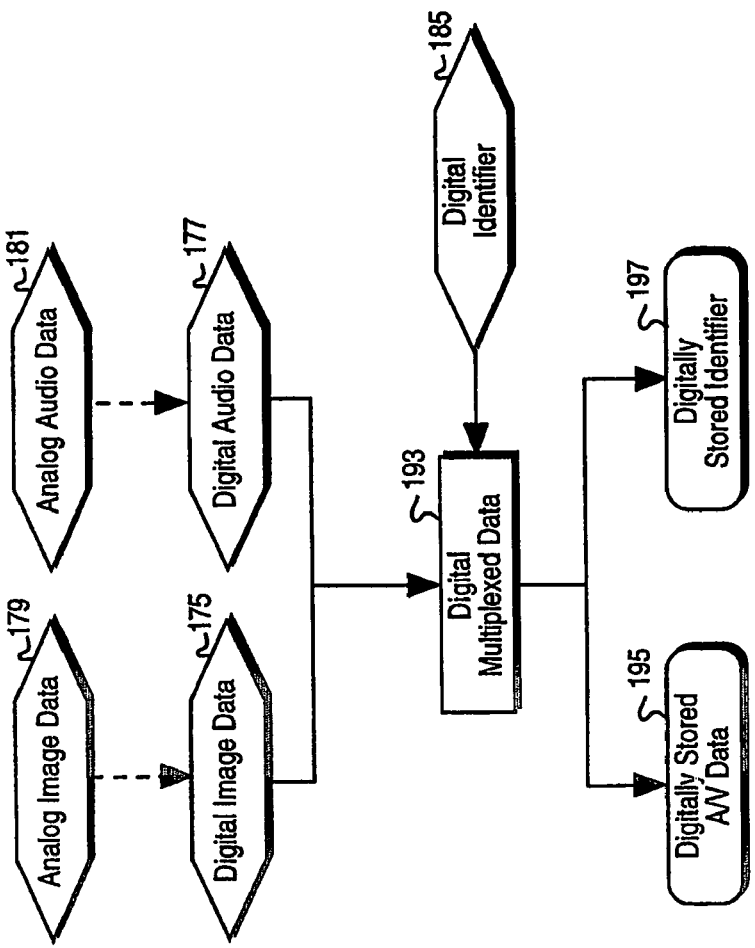
FIG. 10b is a block diagram indicating flow of data in a person-specific imaging system that employs transfer of the audio and image data in the digital state.
Figure 10A:
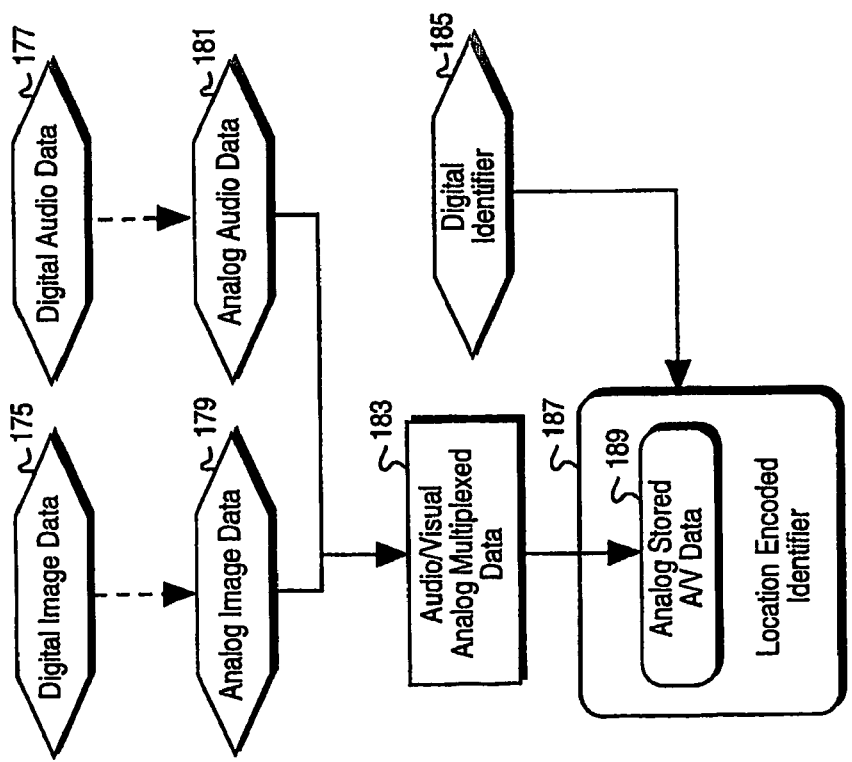
FIG. 10a is a block diagram indicating flow of data in a person-specific imaging system that employs transfer of the audio and image data in the analog state.

FIG. 10*b* is a block diagram indicating a flow of data that employs transfer of the audio and image data in the digital state. The digital image data 175 and the digital audio data 177 are captured of the patron 43. These data are multiplexed along with the digital identifier 185 into a single data format of digital multiplexed data 193 comprising audio data, visual data, and identifier data. This multiplexing may be similar to that of the single image multiplexed data shown FIG. 5, with provisions made for the encoding of audio data. For instance, a large, continuous block of audio data might accompany each image transferred. Alternatively, smaller fragments of audio data, even single bytes or double bytes of audio data, might be placed at the end of each horizontal line of image data. With images transferred at a conventional 60 frames a second, and 250 or more horizontal lines per frame, this provides sufficient data bandwidth to pass an audio signal of acceptable quality. This multiplexing may conveniently be performed at the location of the videocamera 157 and the directional microphone 158 of FIG. 7.

The digital multiplexed data 193 could then be transferred by digital transmission wire, wireless transmission, or some other suitable transmission means to a digital storage means, where the audio and visual and identifier data could be stored in a multimedia database as separate digitally stored A/V data 195 and a digitally stored identifier 197.

Transmitting and storing digital data has certain potential advantages. For example, digital data may be highly compressed at its source, reducing the amount of data transfer. Furthermore, the data can be transferred with correcting noise reduction technologies. Also, once the data is stored in a digital format, modifications to the images using standard digital techniques can be easily applied.

It should be noted that the digital image data 175 could optionally originate as analog image data 179, and be converted by an A/D converter to the digital state. Likewise, the digital audio data 177 could originate as analog audio data 181, and be converted by an A/D converter to the digital state. Furthermore, given the large volume of audio and visual data, after transfer of the digital data to the storage means, it may be useful to convert the data to analog format using suitable D/A converters, and to store the data in analog formats as shown in FIG. 10*a*.

Placement of the Remote Identification and Image Capture Systems

In the previous embodiments, the image capture system and the remote identification system are located at fixed positions, and are activated as the patron comes within range or view of these systems. In certain cases, particularly when the patron is conveyed through a ride, it may be difficult or inconvenient to place either the remote identification system or the image capture system in a fixed location. For example, if the range of the tag 49 carried by the patron 43 is small, the remote identification reader 52 may not be easily placed close enough either to activate the tag 49 or receive its identification signal. Furthermore, if the conveyance is moving, the duration of a videograph taken from a fixed location may be of too short a duration, and may require the videocamera 157 to pan in order to keep the patron 43 visible for an acceptably longer period of time. As an alternative to a fixed placement, the remote identification system or the image capture system may be placed on the ride car 45.

Figure 11:
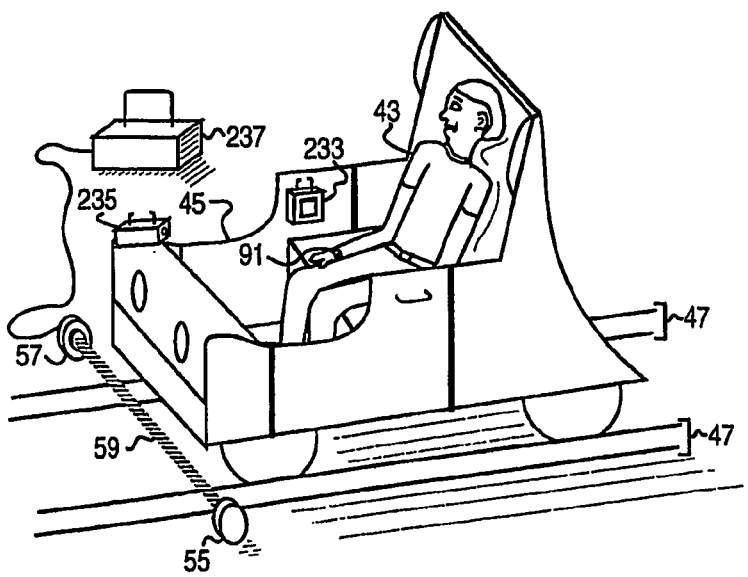
FIG. 11 is a perspective and schematic view of remote identification and image capture in a person-specific imaging system wherein the remote identification means and the image capture means move substantially in concert with the patron.

FIG. 11 is a perspective view of a system wherein the remote identification system or the image capture system move substantially in concert with the patron 43. The patron 43 is carried on the amusement ride car 45. The patron 43 wears an RFID transmitter 91 on a wrist bracelet, which is stimulated to transmit by mobile remote identification reader 233, which also receives the identification signal from the RFID transmitter 91. A mobile videocamera 235 is also mounted on car 45, and is placed so that the car 45 occupant is always within its field of view. In order to meet this requirement, the remote videocamera 235 may employ a special lens with a wide field of view.

Because the mobile remote identification device 233 and the mobile videocamera 235 are located on the car 45, the identifier and the images from these devices, respectively, must be able to be transferred to fixed ground locations. This may be accomplished by a variety of means. For example, in FIG. 11, both the mobile remote identification device 233 and the mobile videocamera 235 function as transmitters, which transmit their data to a fixed receiving station 237, which receives both videographic image data and identifier data. Reception is induced when the car 45 interrupts the path of the infrared light beam 59 emanating from the infrared transmission device 55 and received at receiver 57. In order to reduce the different simultaneous sources of information that must be received by the fixed receiving station 237, the mobile remote identification device 233 and the mobile videocamera 235 may be connected by a wire, so that the identifier can be passed to the mobile videocamera 235 for incorporation into a multiplexed data format for transmission to the fixed receiving station 237 in one data transfer.

Alternatively, data from the mobile remote identification device 233 and the mobile videocamera 235 may be stored on the car 45 in a suitable format (e.g. a videotape), and retrieved at regular intervals in a manner described in FIG. 9.

Embodiments of the present invention have been described in which the camera and the remote identification device are either both fixed in location, or which move in predetermined paths with respect to the patron 43. In certain cases, it may be useful to combine fixed remote identification readers 54 with mobile cameras 235 or mobile remote identification readers 233 with fixed videocameras 157.

Furthermore, it may be useful in cases to have mobile remote identification readers 233 and videocameras 235 that move in variable, not pre-determined paths. For example, in a themed amusement park, patrons may want to have their pictures taken with actors dressed in cartoon or other costumes by roving photographers. The photographer could carry a mobile remote identification reader 233, and capture images with a digital camera which can either transfer the data by wireless transmission or download the data from the digital camera onto a communications network. The photographer would not be required to remain in a fixed location, and could move without restrictions related to the placement of the remote identification device or camera.

In addition, it is not required that the patrons whose images are captured be conveyed by a ride to the site of a camera and remote identification device. For example, in front of a well-known attraction or an aesthetically impressive view, a camera and remote identification could be fixedly placed. As a patron moves into position, the remote identification device determines the patron identity, and then the camera captures a picture of the patron with the afore-mentioned view in the background. If the patron wishes to pose, instead of having a candid image captured, image capture could require a patron-initiated command, such as pressing a button that would activate the camera after a fixed delay.

Product Characteristics

Image Modification

Images obtained from the methods of the present invention may be modified for the interest and entertainment of the patron, so as to induce them to purchase the images. Such modifications can be performed on both static, single-frame images as well as videographic images. While very simple image modification programs can be performed while the image data is in analog format, most sophisticated modifications are most easily performed on images in digital format.

Figure 12A:
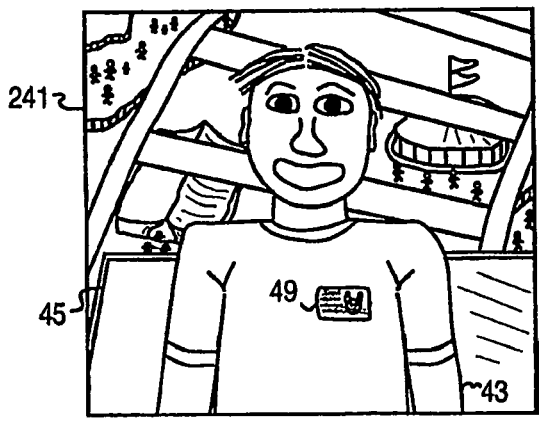
FIGS. 12a through 12e are a series of pictorial images demonstrating methods of image modifications that may be employed in a person-specific imaging system.

FIGS. 12*a* through 12*e* are a series of pictorial images including image capture and image modifications. FIG. 12*a* represents a single image from a sequence of videographic images of the patron 43 wearing the tag 49 on an amusement ride, such as a roller coaster. The image is surrounded by the image frame 241. The image includes parts of the car 45 on which the patron 43 rides, as well as background scenes from the amusement park. While this image may be of sufficient interest to the patron 43, the following images and descriptions will demonstrate how modified images may be created.

Figure 12B:
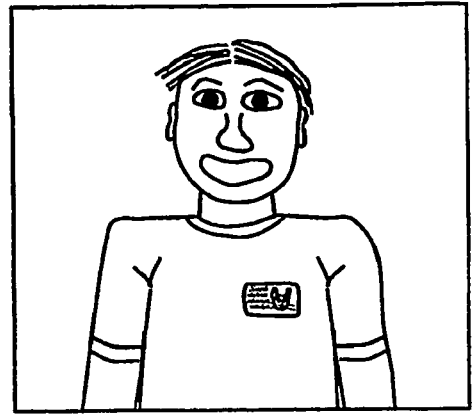

In FIG. 12*b*, the background elements of the image, including the car 45, have been eliminated from the image. This subtraction may be done by one or more of the following techniques. Firstly, because the mobile videocamera 235 which captured the image will generally be fixed in position with respect to the car 45, regions representing the car 45 are located in the same pixel locations in all frames throughout the day, and their images may therefore be eliminated from the frame. Secondly, the other background images are changing rapidly compared with the images of the car 45 and the patron 43, and these may be eliminated. The background images can also be eliminated on the basis that they may be somewhat out of focus given their distance from the mobile videocamera 235 relative to the patron 43 and the car 45. In addition, the location of the patron's 43 face in the frame can be easily established using feature recognition programs mentioned above, and the body may be roughly estimated relative to the face, and then conventional edge detection programs can be employed to determine the extent of the patron's body. Pixels not corresponding to the patron are given predetermined color values that are reserved for background, which will be referred to hereafter as the reserved color value, whereas those pixels corresponding to the patron retain their original pixel color values.

Figure 12C:
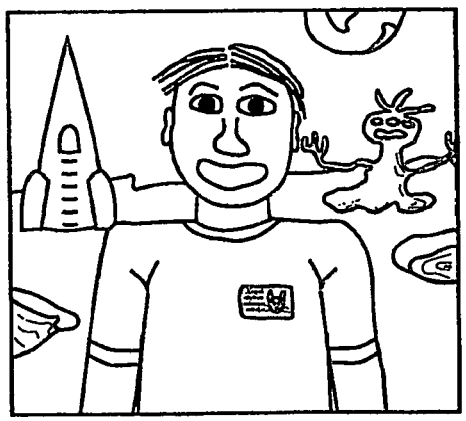

FIG. 12*c* demonstrates an example of the placement of the patron's image, extracted from the background as in FIG. 12*b*, into an unrelated background. In this case, the patron's image of FIG. 12*b* is placed on a background of a hand-drawn cartoon, in this case, a fantasy picture of another planet, including an alien. The contortions of the patron's face, taken out of context from the amusement ride, provide for entertainment. This is performed by merging the bit images of the cartoon and the patron's face, wherein pixels from the cartoon image take on the color values from FIG. 12*b* if and only if the color is not the reserved color value, and if the pixel has the reserved color value, it is replaced with the cartoon pixel color value.

Figure 12D:

FIG. 12*d* provides an example modification of the patron's image by replacing pixels corresponding to the patron with unrelated image pixels. In FIG. 12*d*, the patron's image is altered to place the image of a scar on the patron's cheek, images of earrings on his ears, the image of a patch over his eyes, the image of a bandanna on his head, and the image of a torn shirt on his body. Furthermore, the image is placed in a filmed background from a sailing ship, in order to give the impression of the patron as a pirate on a pirate ship, using the methods of FIG. 12c. In order to perform the transformation of the patron's image, the patron's facial features (eyes, ears, nose and mouth) are analyzed using conventional facial recognition software, which locates and orients the features. Pixels representing the various facial modifications (scars, earrings, patch, and bandanna) are scaled and rotated according to the dimensions and placement of features, and then replace the pixels representing the corresponding regions on the facial and background images. Similar transformations can be performed for the image corresponding to the shirt, or alternatively, images recorded from an actor in appropriate clothes could be part of the background image, and only those pixels corresponding to the patron's head could be placed into the image. By this latter method, the image would correspond to that of the patron's head on another person's shoulders.

Figure 12E:
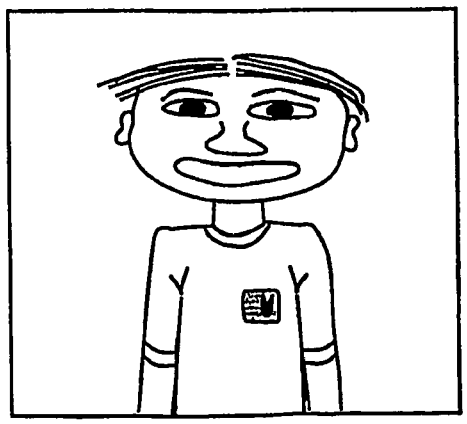

In FIG. 12e, the patron's image is removed from the background, as in FIG. 12b, and then the image is altered by distortion. In FIG. 12e, for example, the head is widened, and the body is narrowed. Such distortions are well known in the art of digital imaging and image modification, and generally involve not only the movement of specific pixels, but also the merging of pixel color values to ensure that the resulting images are smooth and without edge effects.

It should be realized that a wide variety of modifications may be made to the image according to the methods of the present invention, including:
- modifying images to improve image quality (for example, altering image contrast or brightness),
- placing images from different recorded images into the same image so as to create the impression that various people or objects are together, or that the patron is located in a different environment,
- interspersing sequences of images with other sequences of images so as to create an impression of time flow and connectedness of action, and
- modifying the audio output by changing the frequency content or coupling audio output from one recording with an image from another recording.

Furthermore, more than one modification technique may be applied to the same sets of images in order to produce the desired effects.

Use of Facial ID and Associated Information

Figure 27:
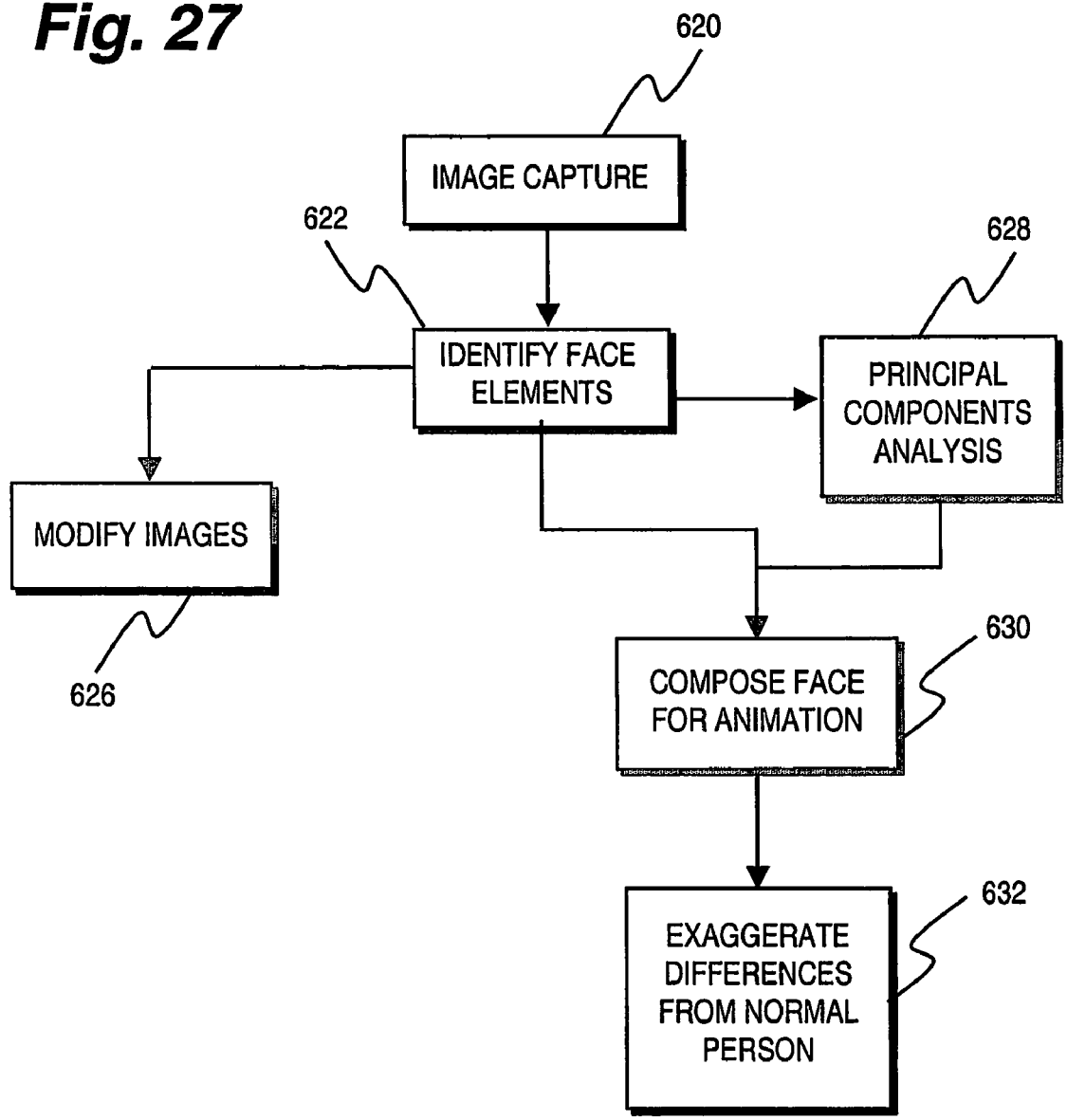
FIG. 27 is a block flow diagram of a image modification using facial IDs and other associated information.

The use of facial recognition identifiers (facial IDs) and other aspects of facial recognition allows for other methods of modification. FIG. 27 is a block flow diagram of a image modification using facial IDs and other associated information. In a first step 620, an image of a patron is captured, which image is desired to be modified. In a step 622, the location and orientation of the face, as well as the location of facial elements such as eyes and mouth, are determined. This step 622 is normally performed in a facial recognition program, and the information can be derived therefrom. In the most simple form, this information can be used to modify the images in a step 626. For example, a pirate scar can be placed on the face at a given location on the face relative to the identified facial images. Such location of facial elements can maintain a relatively constant location on the face when the face is moving in the frames of a videograph.

In a more advanced form of modification, the information from the principal components analysis (in a step 628) that is often part of a facial recognition analysis can also be used. Given both the location of the face and a principal components analysis, an animated face corresponding to the patron can be generated in a step 630. That is, the principal components described facial elements that combined give an image similar to that of the patron from whom the facial ID was generated. Such an animated face can be substituted for the patron's face in a modification. Such modifications can, furthermore, be improved by the use of associated information that is not normally associated with the principal components analysis, such as eyeglass shape and color, hair color, etc.

Furthermore, by exaggerating the values of the principal components analysis from an average value, exaggerated facial figures, corresponding to caricatures, can be generated in a step 632. Either all of the values can be adjusted away from average values, or only certain values that are determined to have an aesthetic effect in caricature generation.

Figure 31:
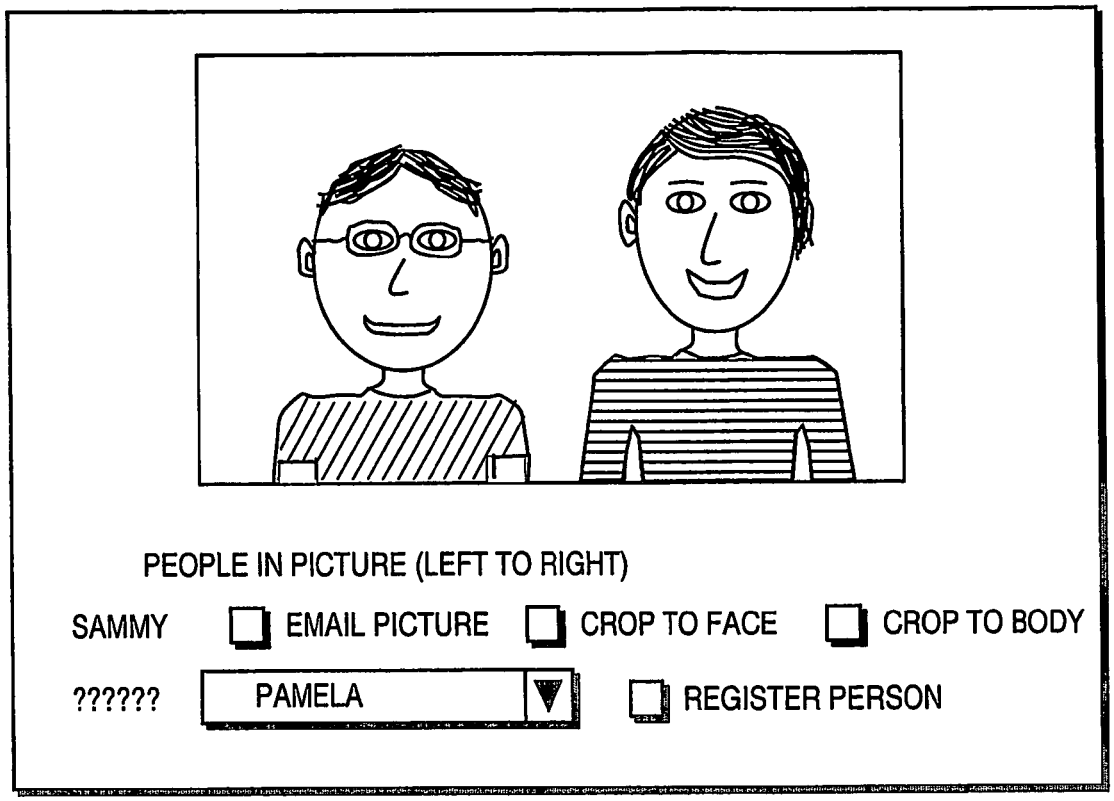
FIG. 31 is a user interface for image modification and handling using facial recognition.

FIG. 31 is a user interface for image modification and handling using facial recognition. A central box contains that image under consideration. Below the image is a list of people whose representations have been identified in the image. As shown, the person on the left is identified as "Sammy", while the person on the right is unidentified (that is, his identification is noted by a series of question marks). The user can then either choose the name of a person already registered for the collection (e.g. if the facial recognition program was unable to correctly associate the representation in the image with a facial ID in the database), or to newly register the person. When the "Register Person" button is chosen, this would open a dialog box asking for the person's name and other information (e.g. email address or other contact information).

For Sammy, two options are given to the user. In a first option, the user can, by picking the button or checkbox as shown, have the image sent automatically to Sammy, given that Sammy's email address is registered in a database along with Sammy's facial ID. Alternatively, the user can crop the image to Sammy's face or body. Cropping to the face comes directly from information that is generally made available from the facial recognition software as part of the facial recognition process. To crop to the body, the image can crop from the face approximately 3-5 times the width of the face (centered on the face) and vertically approximately 6-8 times the height of the face, starting from approximately one-half to 1 fold the height of the face from the top of the face downwards. The cropping stops if it encounters an edge of the image.

Product Formats and Substrates

The method of the present invention creates images that may include both single image frames as well as videographic images, as well as accompanying audio traces. These images and audio traces may be unaltered recordings, or may have been modified according to methods such as those described in the previous section. The images may be produced in a number of different output formats and placed on a variety of substrates to improve their attractiveness to patrons, so as to induce them to purchase these images. The manner and variety of these formats and substrates are described below.

FIG. 13a is a block schematic of a distribution system for single images which incorporates a variety of different output devices. In general, single images will be stored as digitally stored image data 196 on a digital storage device 71 such as an array of hard drives. Connected to the image storage device 71 is a communications bus 199 over which image data is transferred selectively to a number of different output devices. The devices include the printer 137, which outputs printed images either as a paper image 209, or a plastic sheet image 213. Multiple paper images 209 may be collected and bound together to form an album 223.

Alternatively, the image data 195 may be transferred to a fabric printer 201 for placement on a fabric substrate such as a T-shirt 215 or a cap. The image might also be transferred to a ceramic transfer device 203 for placement on a ceramic mug 217, statuette, or other memento.

The images need not necessarily be converted into a physical format, but may be placed in an electronic storage format. For example, the image data 195 might be transferred to a Photo CD mastering device 205, which outputs a Photo CD 219, such as in the Photo CD format developed and distributed by Eastman Kodak (Rochester, N.Y.). Alternatively, the image data may be transferred to an Internet server 207 where it can be transmitted to the Internet address of the patron 43 as an attachment to electronic mail 221.

FIG. 13b is a block schematic of a distribution system for videographic images stored as analog data and which incorporates different output devices. An analog videograph storage device 218 contains analog stored videographic data 189) as described above. This data may be transferred directly to the videotape recorder 163, where it is placed on a videotape 229.

Alternatively, the analog data 189 may be transferred to either the Internet server 207 or the DVD mastering device 165 for transfer as electronic mail 221 or on a DVD disk 227, respectively. However, since the Internet server and the DVD mastering device generally handle digital data, the analog data 189 must first be converted from the analog format to a digital format by A/D converters 225. Although shown in FIG. 13b as two A/D converters 225, these may be replaced by a single A/D converter which is switched between the different output devices.

FIG. 13c is a schematic of a distribution system for videographic images stored as digital videographic data 195 on a digital videographic storage device 220, which incorporates the same output devices as shown in FIG. 13b. As before, the image data are transferred to the Internet server 207, the DVD mastering device 165 and the videotape recorder 163 for the production of the electronic mail 221, the DVD disk 227 and the videotape 229. However, because the data is retained as digitally stored videographic data 195 on the digital storage device 165, the data can be directly transferred to the Internet server 207 and the DVD mastering device 165. However, since the videotape recorder 163 accepts analog data input, the digital data 195 must be converted first to analog format by a D/A converter 231.

Active Integration with Environmental Venue Operations

The previous embodiments of the present invention can be integrated seamlessly into the normal operations of entertainment venues, such as theme and amusement parks, so that image capture does not intrude on the entertainment that the patron obtains on the rides or at the activities of the venue. Indeed, the patron may well not be aware that image capture is taking place during the activity. The following modes of use of the present invention, however, provide active integration of image capture and remote identification into rides and activities, where the patron is both conscious of image capture, and actively participates in interaction with picture taking and review.

Reviewing Images as Entertainment

FIG. 17 is a perspective view of a review monitor 273 for use in entertainment venue waiting lines. It should be noted that at many theme parks, especially during times of heavy use, patrons may wait for many hours in line waiting for their turn on a ride, at a show, or in an activity. During this time, they are generally not well entertained. The review monitor 273 is attached to a fixed object, in this case a horizontal pole 271 used as a barrier in crowd control. A number of straps 275 are used, but may be replaced by a wide variety of different placement fixtures. The review monitor 273 is placed on a line in such a way that it is visible to patrons 43 waiting in line, generally at moments when they are not otherwise entertained. The integral remote identification reader 51 integrated into the review monitor 273 senses the tag 49 worn by the patron 43 (not shown), and transmits the identity of the patron 43 to a central controller, such as the image controller 73 of FIG. 2. The image controller 73 places a number of images on the screen for the patron 43 to review. A plurality of buttons 277 may be placed on the review monitor in order to allow the patron 43 to select images to view. Information or directions may be communicated to the patron 43 either through words written on the screen, or through audible speech transmitted by the speaker 79 built into the review monitor 273.

Communication between the image controller 73 and the review monitor 273 may be mediated by a number of different means, including wireless transmission, fiber optics and digital or analog transmission over electrically-conductive wire. In FIG. 17, the horizontal barrier pole 271 is hollow, allowing the placement of wire and cable through the cable and to the monitor.

The review monitor 273 need not have a means of selecting images for purchase, although this could be easily arranged to have the equivalent of the distribution station 77 to be housed in the waiting line. However, the natural movement of patrons 43 within the waiting line generally inhibits decision-making. The review monitor, however, entertains patrons 43 waiting in line with images of themselves, still or videographs, perhaps modified as described above (see FIG. 12). Furthermore, the images inform the patron about which images are available for purchase, so as to increase the chances that the patron 43 will approach a distribution station 77 for image purchase.

In order to keep patrons in the waiting line moving, rather than staying to view their images, the review monitor 273 may display images of a given patron 43 for only a limited duration, and then present a blank screen until a new tag 49 identifier is detected by the integral remote identification reader 51. Since many of review monitors 273 may be in line, the patron 43 may have many opportunities for viewing their picture.

Image Capture and Display as Entertainment

The act of picture taking, especially where the result is a modified image of the patron 43, can be very entertaining. The next two embodiments of the present invention integrate the act of taking and reviewing images an intrinsic part of the entertainment process. FIG. 18 is a top-perspective view of a waiting line in which image capture, modification and review are used to entertain patrons 43. Numerous patrons 43, each with an RFID bracelet tag 91, are in a waiting line, bordered by horizontal poles 271 similar to that shown in FIG. 17. Their direction of motion is shown by arrows on the left and right. At a U-bend in the waiting line, the poles 271 are arranged to form a pocket 279 in which the patron 43 closest to the pocket 279 steps. The RFID reader 54 is placed in front of the pocket, so as to identify the patron 43 in the pocket. The digital camera 63 sits on top of a large monitor 281, and captures an image of the patron 43. An entertainment venue operator 283 stands next to the pocket 279 in order to operate the system, and will generally press a button 285 located on a console in order to activate the image capture.

After the image is captured, it is modified to provide entertaining modification of the patron's image, as described above. The operator 283 may choose among different modifications using the console 287. This serves both to provide ever changing modifications to entertain the patrons, and furthermore may allow the use of modifications appropriate to the age or gender of the patron 43. As the modifications are made, they are displayed on the large monitor 281. The monitor 281 is of such a size, as well as being placed at such a height, that it is visible to many patrons 43, so that patrons 43 may view a variety of these transformations. The size of the monitor 281 may also be of such a size that views of multiple modifications may be displayed, or alternatively, that views of both the unmodified and the modified images be displayed for entertainment effect.

As patrons 43 leave the pocket 279 and face away from the monitor 281, their attention may be propelled forward by the placement of review monitors 273 (as described in FIG. 17) for review of the just-created images, as well as other images created at other times in the entertainment venue. Given that waiting lines in some theme and amusement parks may extend to two or more hours, such image capture and display systems may be located at numerous turns in the waiting line, in order for patrons to have multiple opportunities for viewing others and themselves during this extended period. Furthermore, the image modifications used in a particular line may be chosen to have a theme consistent with that of the ride for which people are waiting.

The use of the remote identification methods (involving the RFID bracelet 91 and the RFID reader 54) is necessary to allow the patron 43 to purchase the images at some time later. Because of the requirements of maintaining movement in the waiting line, the patron 43 will be unable to purchase the printed images while waiting in line. Thus, the remote identification methods associate the patron 43 with the image, and permit the sale of the image to be made at a later time, as described above (see, for example, FIG. 2).

Alternative Embodiments of Optical Symbology Identification

Color Schemes for Optical Symbology Recognition

Images of the natural world are quite complex and unpredictable, making it difficult to find an optical identifier. The difficulty is enhanced by the uneven lighting and camera response. For instance, in many optical systems, colors are captured by red, green and blue light sensitive pixels, and the response in each color is given as a byte value ranging from 0 to 255 intensity. However, pure black and pure white identifiers would not be given as 0 and 255 respectively in red, green and blue as expected, but generally, the range of intensities will be compressed over some smaller range. Furthermore, if the incident illumination is not purely "white", the ranges for the red, green and blue intensities will be different from one another. Thus, it can be difficult not only to interpret the colors on an identifier tag, but it is generally difficult to detect the tag altogether.

The present invention teaches an identifier tag that incorporates standard colors in a fashion that the colors are very unlikely to appear together in natural settings, and which allow for easier interpretation of non-standard colors. In short, three colors are chosen in which the red, green and blue components of each color shift in predetermined and rare manners, and which provide internal standards for the interpretation of other colors.

FIG. 14a is a perspective view of a sectored colored identifier tag 300. Outside color sectors 302, 304, 306, 308, 310, and 312 surround a central circular sector 314. Three of the sectors are chosen to represent standard colors, and are conveniently three outside sectors spaced evenly around the tag 300, in this case sectors 302, 306, and 310. In the following discussion, colors are indicated by a triplet of red, green and blue values between 0 and 255, placed within square brackets. Thus, [24, 51, 213] is representative of a color with a red value of 24, a green value or 51, and a blue value or 213. In this context, it means that a red value of 255 is perfectly reflective of the red light detected by a standard camera, and a red value of 0 is perfectly absorbing of the same red light.

The three sectors 302, 306 and 310 are chosen so that for each sector, one of red, green or blue has a color value of 255, another has a value of 127 and another has a value of 0. For each sector, a different color has the value of 255 than any other sector, a different color has the value of 127 than any other sector, and a different color has the value of 0 than any other sector. For example, in FIG. 14, sector 302 has the color [255, 127, 0], sector 306 has the color [0, 255, 127], and sector 310 has the color [127, 0, 255].

A possible arrangement of standard colors for the sectors 302, 306, and 310 are given in FIG. 14b, a table of colors. As can be seen, in this example, sector 302 has color [255, 127, 0]. The transition to sector 306 incorporates changing all three colors in a predetermined sequence (red 255 goes to 127, green 127 goes to 0, and blue 0 goes to 255). Thus, in identifying a tag in a "sea" of colors, the software program can pick out two characteristics of a tag. Firstly, that there be three color sectors 302, 306 and 310, each of which satisfy the demands of FIG. 14b, and that the colors, in the correct clockwise orientation, satisfy the transitions.

In practice then, the software algorithm searches for three points that satisfy the following tag identification criteria:
1) are at 120 degree orientations with respect to a central point;
2) that the radius of the points is within a predetermined range of pixels;
3) the for each of the points internally, the red, green and blue points are related as in FIG. 14b; and
4) that the order of the transitions for the three colors is as given in FIG. 14b.

It should be noted that the range of color values will generally be restricted to much lass than 255 for the different colors, and so a threshold value may be used. For example, instead of requiring the color for sector 302 to be [255, 127, 0], the algorithm can rather require that the red value be at least a predetermined threshold A more than the green value, that the green value be at least a predetermined threshold B more than the blue value, and that the red value be at least a predetermined threshold B more than the blue value. In many applications, the values of threshold A and threshold B is conveniently less than 30, and the value for threshold C is conveniently less than 50, and even more preferably for the values of threshold A and threshold B to be less than 10, and the value for threshold C to be less than 25. Lower threshold values take into account that the tag may be in shadow, where the dynamic range of color values may be small.

Similarly, when analyzing the transitions, such as from sector 302 to sector 306, that instead of requiring the red value to go from 255 to 127, the algorithm instead requires simply that the value decrease, or alternative decrease by a certain predetermined threshold value. The predetermined threshold value for decreasing or increasing will generally be smaller for a lesser transition (e.g. 0 going to 127 or 255 going to 127) compared with a greater transition (i.e. 0 going to 255 or 255 going to 0). Transitions with a difference of 127 can use thresholds equivalent to transition threshold A and B, above, and transitions with a difference of 255 can be distinguished using a threshold equivalent to transition threshold C.

This tag construction has a number of advantages. Firstly, in most settings, the only pixel arrangements that satisfy this strict color coding will be the tag, reducing the number of false positive tag identifications. Secondly, the colors show up so rarely, that while searching through a scene, only rarely will the program need to check through all four tag identification criteria. Because so many potential tags are eliminated by an early criterion, the performance of the algorithm is significantly accelerated.

Finally, it should be noted that the tag internally comprises a series of color standards. For each of red, green and blue, this method determines tag standards for 0, 127 and 255 color values. These can be used in identifying the color values of the other sectors, correcting for lighting intensity and lighting bias (e.g. incident light that has more blue than red).

It should be noted that the specific colors for the three sectors can be changed within the spirit of the present invention, and that the order of the sectors can similarly be changed. For example, instead of standard colors [255, 127, 0], [127, 0, 255], and [0, 255, 127], an alternative set of colors [0, 127, 255], [127, 255, 0], and [255, 0, 127] could be used. Also, the clockwise and counter-clockwise transitions can also be changed without departing from the spirit of the present invention (that is, instead of colorwise order of transitions A to B to C, the order could be made A to C to B). Indeed, the number of identifiers that can be specified can be increased by a factor of two by imputing a binary bit of information related to the clockwise or counterclockwise orientation of the standard colors (e.g. the bit equals zero when the colors are clockwise, and the bit equals one with the colors are counterclockwise). Also, the number of identifiers could be increased by another factor of two depending on which of the two sets of standard colors specified in this paragraph above are used. The use of both the order of transitions and which colors are used can result in an increase in the number of colors by a factor of 4.

The non-standard sectors 304, 308, 312 and 314 of the tag can be of a variety of different colors. If each sector color is limited to red, green and blue color values 0, 127 and 255, then each sector can encode 27 colors (24, if the standard colors are not allowed). Thus, the remaining sectors 304, 308, 312 and 314 can encode 244 of identifications, or 331,776 unique identifiers. This number of identifiers can be adjusted according to the type of event being photographed. For example, with small events, it might be preferable to use fewer identifiers constructed by allowing the remaining sectors 304, 308, 312 and 314 to adopt red, green and blue values of 0 and 255 only, or to have a smaller number of sectors (e.g. by eliminating the central sector 314). In addition, instead of using standard colors with color values of 0, 127 and 255, in this case the standard colors can be restricted to those with values 0 and 255. For example, a set of standard colors [0, 0, 255], [255, 0, 255], and [255, 255, 0] can be alternatively used.

To increase the number of identifiers, the number of sectors can be increased, for example by increasing the number of radial sectors from 6 to a larger number (e.g. 7). An alternative method is to somewhat enlarge and split the central sector as shown in FIG. 14c, a perspective view of a sectored colored identifier tag 320 with two internal sectors 322 and 324. This arrangement provides an additional colored sector, thereby increasing the number of identifiers by a factor of 24. It should also be noted that, as described above, changing the identity and the clockwise order of the standards can increase the number of tags by a factor of 4.

An additional means of increasing the numbers of identifiers is to determine via image analysis the orientation of a line 326 separating the sectors 322 and 324. Depending on the standard color sector 302, 306, or 310 that the line 326 intersects the middle of, a value of 0, 1 or 2 can be assigned, thereby increasing the number of identifiers by another factor of 3.

Less Obtrusive Tags

The sectored pattern of the tag 300 in FIG. 14a is highly limiting to the design of the tag 300. It should be noted that the tag 300 needs to be displayed prominently, and that not each person in the event may want a tag of this orientation or design, or with colors that may clash with their clothing. The present invention includes two means of addressing these issues.

In a first manner, the shape of the color identifiers does not need to conform to a circular pattern. As mentioned above, the relative orientation of the colored sectors does not need to conform specifically to the four tag identification criteria above. FIG. 15 is a perspective view of an identifier tag in which the colors hidden within a peacock design 340. The peacock design 340 is comprised of a body and head 342, which can be uniform in color and shape among all of the peacock 340. The tail is here comprised of three feather bases 344, 346, and 348, which are given standard colors are described in the previous section. The feather tips 350, 352, and 354 are given identifier colors, which are used to establish the peacock design 340 identifier. The number of feathers can be increased to increase the number of identifiers, or to use the body of the peacock as an additional color.

It should be noted that a single image could be provided for the peacock body and head 342, as well as the standard colors of the three feather bases 344, 346 and 348. Then, each tag could be given a unique identifier by affixing a circular tag from among the 24 remaining colors (i.e. from mixing three red values, three green values and three blue values, and optionally removing the three standard colors). The advantages of this scheme are that it is not necessary to print as many identifier tags as there are participants, but only a single tag and separately circles with the 24 remaining colors. The tags can be assembled by placing three different colored circles on the peacock design 340. Thus, to all of the event participants, instead of tags that all have different colors, the overall impression is that of a similar tag.

It is clearly within the spirit of the present invention that there are many different patterns, designs, shapes and configurations for constructing tags, and that the tags may be constructed from separate colored elements affixed to a common element.

The broad range of colors available from mixing all possible combinations of red, green and blue values chosen from values 0, 127 and 255 may not be pleasing in their match with the rest of the tag, with each other, or with clothing that event participants may be wearing. In order to reduce the number of colors present within the tag, only a subset of colors may be used. For example, as described above, the tag 300 of FIG. 14a accommodates 331,776 identifiers, which is far more than will be attending most events. In such cases, certain color values (e.g. red 255), color combinations (e.g. a 255 of one color with a 0 value of another color) or color intensities (e.g. colors with a summed red, green and blue values of less than or equal to 255).

Tags Incorporating Reflective Inks

Figure 16:
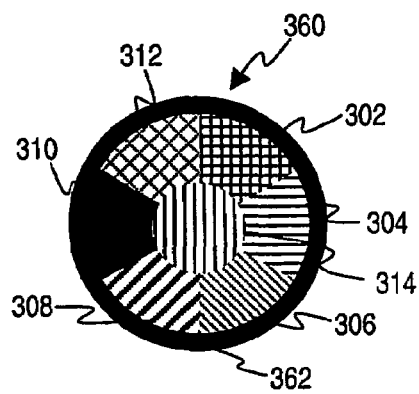
FIG. 16 is a perspective view of a sectored colored identifier tag that incorporates a reflective border.

An alternative method of identifying a tag within a natural background is to use reflective ink that makes the tag "stand out." An example of the use of such a tag is demonstrated in FIG. 16, a perspective view of a sectored colored identifier tag 360 that incorporates a reflective border 362. The reflective border 362 is printed using a highly reflective ink, such as an ink containing microspheres (see, for example, 3M Reflective Ink, 3M Inc., St. Paul Minn.). The microspheres have the property that they reflect light incident from all directions. Thus, the border 362 will be among the brightest objects in any photograph taken with flash illumination. Thus, an algorithm for finding the tag is to scan for the pixels highest the values simultaneously among all three colors, and then use standard image analysis routine to determine which of the pixels form a round border 362. Analyses as described above can be used to determine the value of the identifier from the sectors 302, 304, 306, 308, 310, 312, and 314. The identifier can be supplemented by a binary code within the reflective border 362. For example, if the reflective border is interrupted so that it forms a series of dots and dashes, it can encode additional identifier data.

Figure 17A:
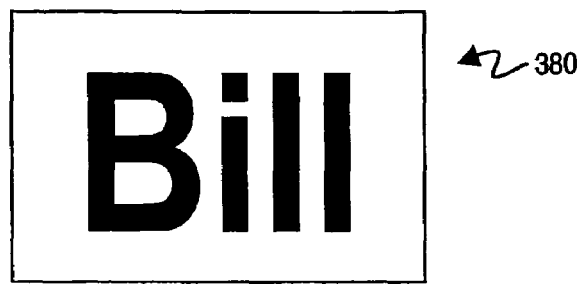
FIG. 17a is a perspective view of a reflective tag as viewed under normal illumination.

The use of reflective ink, however, can be used as well for cases in which the number of identifiers needed is relatively small, and the code can be a binary code. FIG. 17*a* is a perspective view of a reflective tag 380 as viewed under normal illumination. Four types of ink are used in printing the tag:

1) reflective black ink
2) reflective white ink
3) non-reflective black ink
4) non-reflective white ink Under normal diffuse illumination, emanating from a direction substantially different from the viewer, both the reflective and non-reflective black ink appears black. In contrast, both the reflective and the non-reflective white inks appear to be white. Together, the different black and white inks appear to the viewer as a readable alphanumeric code.

Figure 17B:
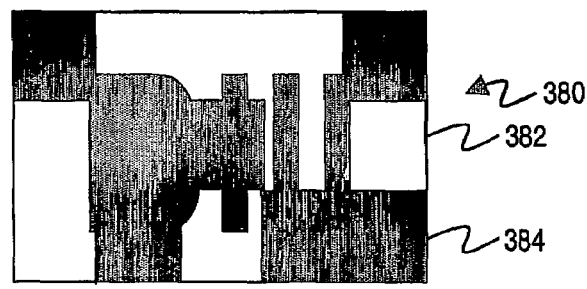
FIG. 17b is a perspective view of the reflective tag of FIG. 17a as viewed under flash illumination whose most substantial component comes from a direction similar to the viewer.

FIG. 17*b* is a perspective view of the reflective tag 380 as viewed under flash illumination whose most substantial component comes from a direction similar to the viewer. In such a case, the reflected light is directed primarily back to the viewer. In this case, the tag 380 is seen as a binary code of squares. A white square 382 is comprised of both reflective black and white inks, whereas a black square 384 is comprised of both non-reflective black and white inks. That is, the appearance of black and white is not a function of the visible color of the inks, but rather their ability to reflect the incident illumination. As can be seen, under flash illumination there may still be some residual appearance of the name "Bill" in the picture, but that the appearance is slight in relation to the black squares 384 and the white squares 382. Altogether, the black and white squares 384 and 382 comprise a binary code. In the case shown in FIG. 17*b*, reading the squares from left to right and top to bottom results in a binary code of "011101001110100", which in a decimal number system corresponds to 14964.

Figure 17C:
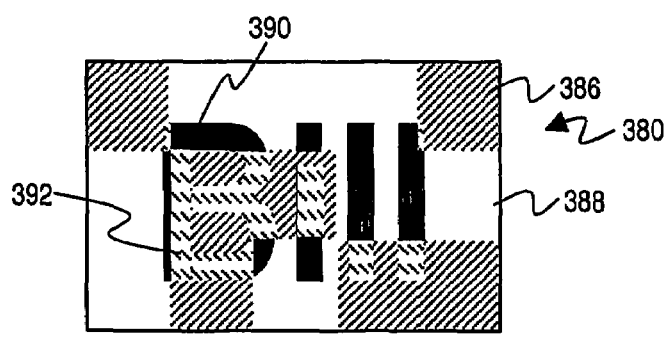
FIG. 17c is a perspective view of the ink layout of the tag of FIGS. 17a and 17b.

FIG. 17*c* is the ink layout of the tag of FIGS. 17*a* and 17*b*, showing the distribution of different inks. The ink layout comprises in this case a white reflective ink 388, a black reflective ink 390, a white non-reflective ink 386, and a black non-reflective ink 392. Areas that appear white in diffuse illumination (i.e. that shown in FIG. 17*a*) are produced using the white reflective ink 388 and the white non-reflective ink 386, while the areas that appear white in reflected light (i.e. that shown in FIG. 17*b*) are produced using the white reflective ink 388 and the black reflective ink 390.

It should be appreciated that there are numerous variations in the methods shown above that are within the spirit of the invention. For example, the arrangement of white and black appearance in reflected light can be made similar to that of a one or two-dimensional bar code, non-binary (e.g. text), or other codes that can be represented in two colors. In addition, the underlying white and black colors can be supplemented with or substituted with other colors. For example, the tag can include many colors of ink, as long as in the region in which the tag identifier is encoded, each color has corresponding reflective and non-reflective inks.

Figure 22:
FIG. 22 is a cross-sectional view of a reflective tag in which the reflective identifier information and the visual appearance of a tag are physically de-coupled.

It can also be that the reflectivity and encoded identifier information and the visual information as seen from a human observer can be physically de-coupled through the use of multiple layers on the tag. FIG. 22 is a cross-sectional view of a reflective tag in which the reflective identifier information and the visual appearance of a tag are physically decoupled. The reflective tag 394 is comprised of two layers, an underlying reflective layer 396 and an overlying visual layer 398. The reflective layer 396 can comprise a reflective layer of a neutral color such as white, in which the tag 394 code (represented, for example, by the binary code of FIG. 17*b*) is laid down with white reflective and white non-reflective ink. The visual layer 398 can then be placed on top, in which relatively transparent inks are used to place the information to be seen in diffuse lighting (represented, for example, by the tag appearance in FIG. 17*a*). Without reflected light, the information in the top visual layer 398 is seen against a white background, but in the presence of strongly reflected light, the code in the underlying visual layer 398 is apparent.

This use of physically decoupled reflective tags 394 is well suited to the use of reflective inks that incorporate microspheres as reflectors, since many of these inks are unsuitable for many forms of printing. Thus, the printing of the reflective ink onto the reflective layer 396 can be done using a process (e.g. screen printing) well suited for those types of inks, whereas the overlying visual layer 398 can be printed using conventional processes (e.g. offset lithography, or inkjet printing). The two layers can then be matched by adhering the layers 396 and 398 with an adhesive, or possibly by simply placing the two layers together into a transparent pouch that could be attached to participant's clothing.

Color Matching for Printer

The tag identification methods above use color combinations to encode tag identifications. It should be appreciated that printing methods are of different sophistication and accuracy, ranging from inexpensive inkjet printers to dye sublimation printers to color laser printers to sophisticated commercial offset lithograhy printing processes. Inputting color values to the printer will not necessarily result in colors detected through the camera that are the same as those commanded to be printed. It is an advantage to have methods for ensuring that the colors output from the printing, in conjunction with the color sensitivity of the camera used to capture images of the tag, are such that a color [0, 127, 255] transmitted to the printer results in a reasonably similar color in the image. That is, if the color to be identified in a camera image is [127, 0, 255], this colors may be unattainable through the combination of printing and imaging technology in use by the photographer. However, by commanding the printer to print other values (e.g. [91, 17, 230]), the resulting image may have a spread of red, green and blue color that can be interpreted as 127 red, 0 green, and 255, as will be described below.

The method of the present invention for achieving this goal is to create a standard color chart that systematically presents a wide range of colors that are produced by a given printer. FIG. 18*a* is a perspective view of a standard color chart 400. The chart is printed on a similar substrate to that which will be subsequently used in printing tags, so that the property of the printed information will be similar in the two cases. The standard color chart incorporates a set of reference marks 402, which can be conveniently placed in the corners of the chart 400, and which allow for setting the topological configuration of the chart in an image made of the chart 400 by a camera. The registration mark 403 in the upper-left hand corner is made darker or otherwise distinguished (e.g. by shape) in order to aid in the upright and rotational arrangement of the chart in the image.

Color boxes 404, 406 and 408 are arrayed on the chart 400, and each box includes a range of colored rectangles within it. Each box 404, 406 and 408 have single color values for a given color, for example the color red. For example, box 404 can have only red values 0, box 406 has only red values 36, and box 408 has only red values 73. Overall, the eight boxes comprising chart 400 will roughly evenly span the range of color values 0 through 255.

FIG. 18b is a perspective view of the box 406. As stated above, all color values within this box will have the red value of 36. Each rectangle in a given column in the box 406 will have a constant green value. In this case, all rectangles in the column 410 will have the green value 0, all rectangles in the column 412 will have the green value 36, all rectangles in the column 414 will have the green value 73, and so on. Similarly, each rectangle in a give row in the box 406 will have a constant blue value. In this case, all rectangles in the row 416 will have the blue value 0, all rectangles in the row 418 will have the green value 36, all rectangles in the row 420 will have the green value 73, and so on. Thus, the rectangle that is in the column 410 and the row 420 will have the color [36, 0, 73].

Altogether, the standard color chart 400 spans the colors that can be output by the printer used in producing the chart 400. A image of this chart is captured by a camera, preferably similar to the camera that will be used to take images of patrons, and which will also be used to identify optically-read tags worn by the patron. This image is input into a computer, and automatic techniques instantiated in computer code then analyzes the image as described below.

The presence of the registration marks 402 and 403 can be established by conventional and well-established image recognition methods. These methods can be supplemented by making the registration marks 402 and 403 have unusual color combinations, such as used in the color schemes used in optical symbology recognition of the tags. Once the registration marks 402 and 403 are identified and located, a geometric relationship can be easily determined that relates a position in the image to the position in the original color chart 400.

A preferred method of choosing printed colors for use with tags is predicated on the observation that getting a large spread in colors is often more difficult in printing. That is, it is often harder to print a color that appears to have a high red value and a low green value, than to get a color with both large red and green values. Furthermore, the colors that have the largest difference between color values will determine the definition of high value and low value to be used, since the ideal values of 255 and 0 will generally not be achievable.

Figure 19:
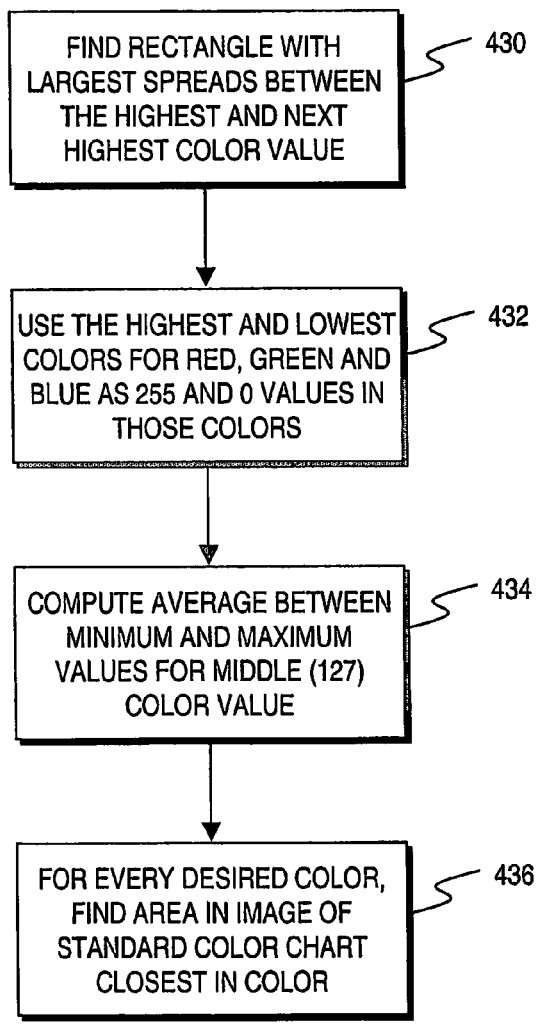

FIG. 19 is a flow diagram for choosing print colors. As prior steps, it is assumed that the standard color chart 400 was imaged by a camera, and the image then placed on a computer for analysis. In a first step 430, all of the colored rectangles in the image of the standard color chart 400 are scanned, and the rectangle with the largest spreads between the highest and the next highest color values are identified. That is, in each pixel or averaged group of pixels, the color with the largest color value is compared with the color of the next largest color value. For each of red, green and blue, the red, green and blue color values from the rectangle with the largest spread in values are stored.

In a second step 432, the largest value from the stored values of the first step 430 is used for each color red, green and blue to represent the value 255, while the smallest value is chosen to represent the color 0. This step 432 ensures that the highest and lowest values of red, green and blue for each desired color are achievable.

In a third step 434, the intermediate value between the 255 and 0 values of the second step 432 are used to represent the intermediate value 127. For example, if the highest red value is 212 and the lowest red value is 28 for the step 432, the intermediate value for red (used to represent the color value 127) is given as ((212+28)/2=120.

For each of red, green and blue, the target color values for the 0, 127 and 255 ideal values have been chosen. In a fourth step 436, all of the rectangles in the image of the standard color chart are checked to see which come closest to the combinations of target color values. It is important to note that for the target color values of 0, 127 and 255, there are only 27 colors to be matched (i.e. all the combinations of values 0, 127 and 255 for the three colors red, green and blue). For each of these 27 colors, the rectangle in the image of the standard color chart coming closest to the ideal is chosen. As a metric of similarity between the rectangle color values and the target color values, the absolute value of differences can be chosen, although other metrics (e.g. the sum of the squares of the errors) can also be used. The output of this method is a mapping of desired colors (generally color value triplets comprising values 0, 127 and 255) to the printer color values that give rise to colors in camera images that are most easily distinguishable as either high, intermediate or low color values in each of red, green and blue. This mapping can be stored in the computer for use whenever the particular combination of printer and camera is to be used.

Error-correcting Codes

There are many ways in which color errors can be introduced into the process. For example, one of the colored sectors may be obscured by clothing, the tag may be bent so that not all of it is visible, the tag may be viewed at an angle, there may be reflections of light obscuring a sector, the tag may be small making for few pixels to determine a color, the image compression may cause image artifacts, etc. It is advantageous to have a mechanism to be able to detect such errors, and if possible to correct those errors. Many such methods for similar goals in binary digital communications are called error-detection codes and error correction codes; some of these codes are called Hamming codes, linear block coding, cyclical redundancy checking, Reed-Solomon codes, etc.

Many of these codes are conventionally implemented for binary information. The color-coding method above, however, is a "base 3" code, in which each piece of information (i.e. each color in each sector) can comprise the values 0, 127, or 255. An error-detecting and correcting code has been established to aid in this case. For this code, one of the sectors, which can be the central sector of the tag 300, contains the error code and is called the error sector. The three other sectors comprising the identifier information are called the identifier sectors.

Figure 20:
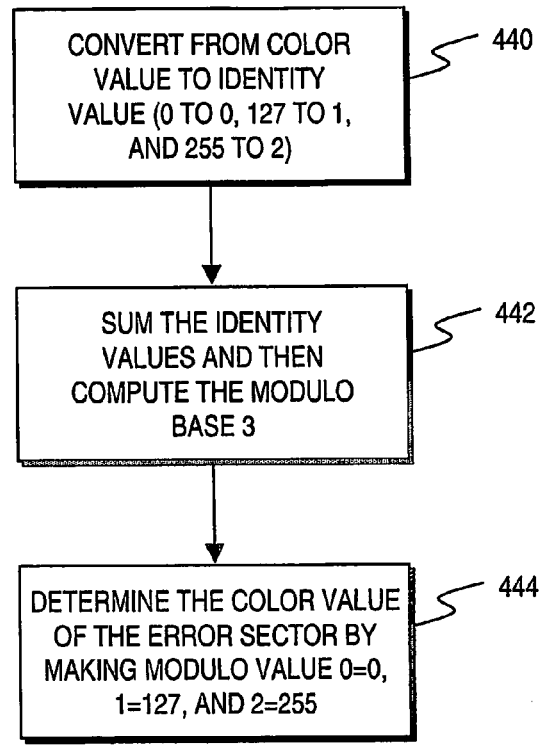
FIG. 20 is a flow diagram for computing an error code for a particular color.

FIG. 20 is a flow diagram for computing an error code for a particular color (e.g. red). In a first step 440, the error code is constructed by considering for the red, green and blue values of the identifier sectors to have identity values of 0 for color value zero, 1 for color value 127 and 2 for color value 255. In a second step 442, the corresponding identity values for the identity sectors are summed and the value modulo 3 is determined. For example, if the red color values of the identity sectors are 0, 127 and 255, then the identity values are then 0, 1, and 2 respectively, and their sum is 3, whose value modulo 3 is 0. In a third step 444, modulo values 0 are converted to color value 0, modulo values of 1 are converted to color values 127 and modulo values of 2 are converted to color values of 255. When the steps 440, 442, and 444 are performed for each of red, green and blue, the color for the error sector is thus computed.

For each error sector color value, there are three possible identity sector color values that could give rise to that error sector color value. The list of such triplet values is provided in FIG. 21, a table of identity sector colors giving rise to error sector values. An example will indicate how this table is used.

Consider a tag in which one of the identity sectors is obscured, or whose observed color is suspect (e.g. one of its color values falls at 62, which is roughly in the middle between the expected values of 0 and 127, and thus cannot be interpreted as one or the other given). The green value for the error sector is 127, corresponding to the central sector values given in the FIG. 21. Inspection of the table indicates that the only values that could give rise to an error sector value of 127 using the method described in FIG. 20 are {0, 0, 127}, {0, 255, 255} and {127, 127, 255}, where the numbers in brackets can be in any permuted order. If the other two known identity sector green values are 127 and 0, the only triplet giving rise to the error value of 127 is the first triplet {0, 0, 127}, and thus the missing value in the obscured sector must be another 0. Indeed, it is a characteristic of the table of FIG. 21 that if the error code is known, and the value of any identity sector is obscured, the value of the identity sector can be retrieved.

There are many error-correcting codes that can be used other than the code described above. For example, the instead of using the red values of the different identity sectors to form the red value of the error sector, the three different color values (red, green and blue) of a given sector can be summed similar to the method of FIG. 20, and the resulting error value be placed in one of the color values of the error sector (e.g. the red value of the error sector containing the code for sector 302, while the green vale of the error sector containing the code for sector 306, and the blue value of the error sector containing the code for sector 310). Other codes can include Hamming, Reed-Solomon, linear block codes and others determined for whatever coding scheme used in the tag construction.

The components that comprise the identification tags, readers, image recorders, image storage devices and image distribution stations will contain many electronic and digital components, which can be customized to provide many different system characteristics and effects. Furthermore, the system components may be used in different combinations and sequences, depending on the application to which they are utilized.

It should also be noted that distribution can refer not only to the physical presentation of a photographic or videographic rendition of an image (such as a photograph printed on paper or other physical substrate), but also to the presentation of images on electronic media, such as a television, LCD or CRT monitor, or projector.

Numerous and varied other arrangements can be readily devised by those skilled in the art without departing from the spirit and scope of the invention. Moreover, all statements herein reciting principles, aspects and embodiments of the present invention, as well as specific examples thereof, are intended to encompass both structural and functional equivalents thereof. Additionally, it is intended that such equivalents include both currently known equivalents as well as equivalents developed in the future, i.e. any elements developed that perform the same function, regardless of structure.

In the specification and claims hereof any element expressed as a means for performing a specified function is intended to encompass any way of performing that function. The invention as defined by such specification and claims resides in the fact that the functionalities provided by the various recited means are combined and brought together in the manner which the claims and specification call for. Applicant thus regards any means which can provide those functionalities as equivalent as those shown herein.

What is claimed is:

1. A method of distributing to a user a specific electronic image comprising a representation of a specific person from among a collection of electronic images containing representations of many persons, the method comprising:
   using a computer for performing the steps of: performing facial recognition analysis on each electronic image in the image collection by which a facial identifier is determined for each face represented within each electronic image;
   associating two or more facial identifiers with the specific person, wherein a first facial identifier and a second facial identifier of the specific person are associated on the basis of the similarities of the first and second facial identifiers, in conjunction with additional information from the two electronic images from which the first and second identifiers are derived, wherein the additional information does not involve facial identifiers;
   storing each electronic image in association with the facial identifier of each person represented within the electronic image;
   obtaining a reference facial identifier from a source electronic image in which the specific person is represented;
   selecting the specific electronic image for distribution on the basis of the similarity of the reference facial identifier to a facial identifier associated with the specific person, wherein the specific electronic image is associated with a facial identifier associated with the person.

2. The method of claim 1, wherein the source electronic image is not within the collection.

3. The method of claim 1, wherein the source electronic image is transmitted via a wide area digital communications network.

4. The method of claim 1, wherein the source electronic image is within the collection, and wherein the user manually chooses the specific person representation from the source image following visual inspection of the image.

5. The method of claim 4, wherein images from the collection are sorted for presentation to the user on the basis of the facial identifiers associated with the images.

6. The method of claim 5, wherein images with the largest number of facial identifiers that the user has not previously been presented are presented to the user, wherein the user can efficiently locate the specific person in the collection of images by inspecting only a subset of the images.

7. The method of claim 1, wherein the step of associating comprises a confidence level that is compared with a predetermined threshold, wherein a confidence level above the threshold indicates the association of a facial identifier to a person.

8. The method of claim 1, wherein the additional information comprises the presence of a representation of the specific person in a first image and the presence of another representation of the specific person in an image consecutive with the first image, wherein the additional information increases the confidence level for associating the facial identifier for the face representative of the specific person with the specific person.

9. The method of claim 1, wherein the additional information comprises the presence of a representation of the specific person in a first image and the presence of another representation of the specific person in a second image captured within a predetermined closeness in time with the first image, wherein the additional information increases the confidence level for associating the facial identifier for the face representative of the specific person with the specific person.

10. The method of claim 9, wherein the additional information comprises the presence of a representation of the specific person in a first image and the presence of another representation of the specific person in a second image captured within a predetermined closeness in time and a predetermined proximity with the first image, wherein the additional information decreases the confidence level for associating the facial identifier for the face representative of the specific person with the specific person.

11. A method of associating a specific person with a specific electronic image within a collection of electronic images containing representations of many persons, the method comprising:

using a computer for performing the steps of: performing facial recognition analysis on each electronic image in the image collection by which a facial identifier is determined for each face represented within each electronic image;

calculating a confidence level for determining whether a given face representation in a first image is associated with the specific person, wherein the confidence level is computed from the similarity of the facial identifier of the given face representation and the facial identifier of a face representation contained within a second image from the collection, in conjunction with additional information from the first and second images;

associating the specific electronic image with the specific person if the confidence level exceeds a threshold.

12. The method of claim 11, wherein the additional information that the second image is consecutive to the first image.

13. The method of claim 12, wherein the additional information comprises that the second image was captured within a predetermined closeness in time to the first image.

14. The method of claim 13, wherein additional information comprises that the second image was captured within a predetermined closeness in time and proximity to the first image.

15. The method of claim 12, wherein the additional information comprises membership of the facial identifier within a first cluster of facial identifiers that has been formed using cluster analysis on facial identifiers from electronic images within the image collection.

16. The method of claim 15, wherein the first cluster of facial identifiers is modified by joining the first cluster and a second cluster using manual input from the user following visual inspection of at least one image from each of the first and second clusters.

17. The method of claim 11, wherein the additional information comprises that the second image was captured within a predetermined closeness in time and proximity to the first image.

18. The method of claim 11, wherein the additional information comprises that the representation of a second person is present in both the first image and the second image.

19. A system for distributing to a user a specific electronic image comprising a representation of a specific person from among a collection of electronic images containing representations of many persons, comprising:

a facial recognizer that generates a facial identifier for each facial representation within each image;

an associator that associates each facial identifier with the corresponding person, wherein the associator determines a confidence level that is compared with a predetermined threshold, wherein a confidence level above the threshold indicates the association of a facial identifier to a person, and wherein the confidence level is computed from the similarity of facial identifiers and additional information that can be derived from two different images in the collection;

a storage device that stores each electronic image in association with the facial identifier of each person represented within the electronic image;

a reference facial identifier, which is obtained from a source electronic image in which the specific person is represented;

and a selector which receives the facial identifiers associated with each image from the storage device and which further receives the reference facial identifier and which determines which image to distribute, wherein the selector selects the specific electronic image for distribution on the basis of the similarity of the reference facial identifier to a facial identifier associated with the specific electronic image.

20. The system of claim 19, wherein the interface and the retriever are connected to a wide area digital communications network for use by the user to specify the specific person.

21. The system of claim 19, wherein the user supplies an electronic image comprising a representation of a face of the specific person.

22. The system of claim 19, wherein the presence of a person in a first image and a second image captured within a predetermined closeness in time to the first image increases the confidence level for associating the facial identifier for the face representative of the first person with the first person.

23. The system of claim 19, wherein the presence of a first and second person in a first image and the first and second person in a second image increases the confidence level for associating the facial identifier for the face representative of the first person with the first person.

24. The system of claim 19, wherein the presence of a person in a first image and the image consecutive with the first image increases the confidence level for associating the facial identifier for the face representative of the first person with the first person.

* * * * *